US012441382B2

(12) United States Patent
Panosian et al.

(10) Patent No.: US 12,441,382 B2
(45) Date of Patent: Oct. 14, 2025

(54) STACKABLE STORAGE CONTAINERS WITH A MAINTENANCE CART

(71) Applicants: Michael H Panosian, Irvine, CA (US); Joshua M Keeler, Irvine, CA (US)

(72) Inventors: Michael H Panosian, Irvine, CA (US); Joshua M Keeler, Irvine, CA (US)

(*) Notice: Subject to any disclaimer, the term of this patent is extended or adjusted under 35 U.S.C. 154(b) by 0 days.

(21) Appl. No.: 18/386,239

(22) Filed: Nov. 1, 2023

(65) Prior Publication Data

US 2024/0149934 A1    May 9, 2024

Related U.S. Application Data

(63) Continuation of application No. 18/385,918, filed on Nov. 1, 2023.

(60) Provisional application No. 63/422,398, filed on Nov. 3, 2022.

(51) Int. Cl.
*B62B 3/04* (2006.01)
*B62B 3/14* (2006.01)

(52) U.S. Cl.
CPC ............. *B62B 3/1472* (2013.01); *B62B 3/04* (2013.01); *B62B 2202/12* (2013.01)

(58) Field of Classification Search
CPC ...... B62B 3/04; B62B 3/1472; B62B 2202/12
See application file for complete search history.

(56) References Cited

U.S. PATENT DOCUMENTS

| | | | |
|---|---|---|---|
| 7,059,617 B1* | 6/2006 | Verna ................. | B62B 5/0083 280/79.3 |
| 2010/0290877 A1* | 11/2010 | Landau ............... | B25H 3/028 414/490 |
| 2011/0005433 A1* | 1/2011 | Pichereau ........... | B65D 19/0016 248/346.02 |
| 2017/0327141 A1* | 11/2017 | Thuma ................ | B62B 3/10 |
| 2021/0031975 A1* | 2/2021 | Brunner .............. | B25H 3/021 |
| 2021/0229717 A1* | 7/2021 | Wolle ................. | B62B 5/064 |

* cited by examiner

*Primary Examiner* — Bryan A Evans
(74) *Attorney, Agent, or Firm* — ARJOMAND LAW GROUP; Farjam Majd

(57) ABSTRACT

A method and a system are disclosed including a stackable storage container. In various embodiments, the stackable storage container includes stacking locks that may be deployed automatically to lock the stackable storage containers together when a first storage container is placed upon the top of a second storage container. A tri-state locking system is used to lock the containers in a stack configuration. Deep chamfers at bottom surfaces and top lids of storage containers allow automatic alignment of the containers. When storage containers are stacked and aligned, a lock status indicator is activated to indicate the state of the stacking locks. The lock status indicator may also have an added function to allow a user to unlock the stacked storage containers to detach and remove them from the stack. The user may not manually lock the storage containers but the user may unlock them manually.

20 Claims, 63 Drawing Sheets

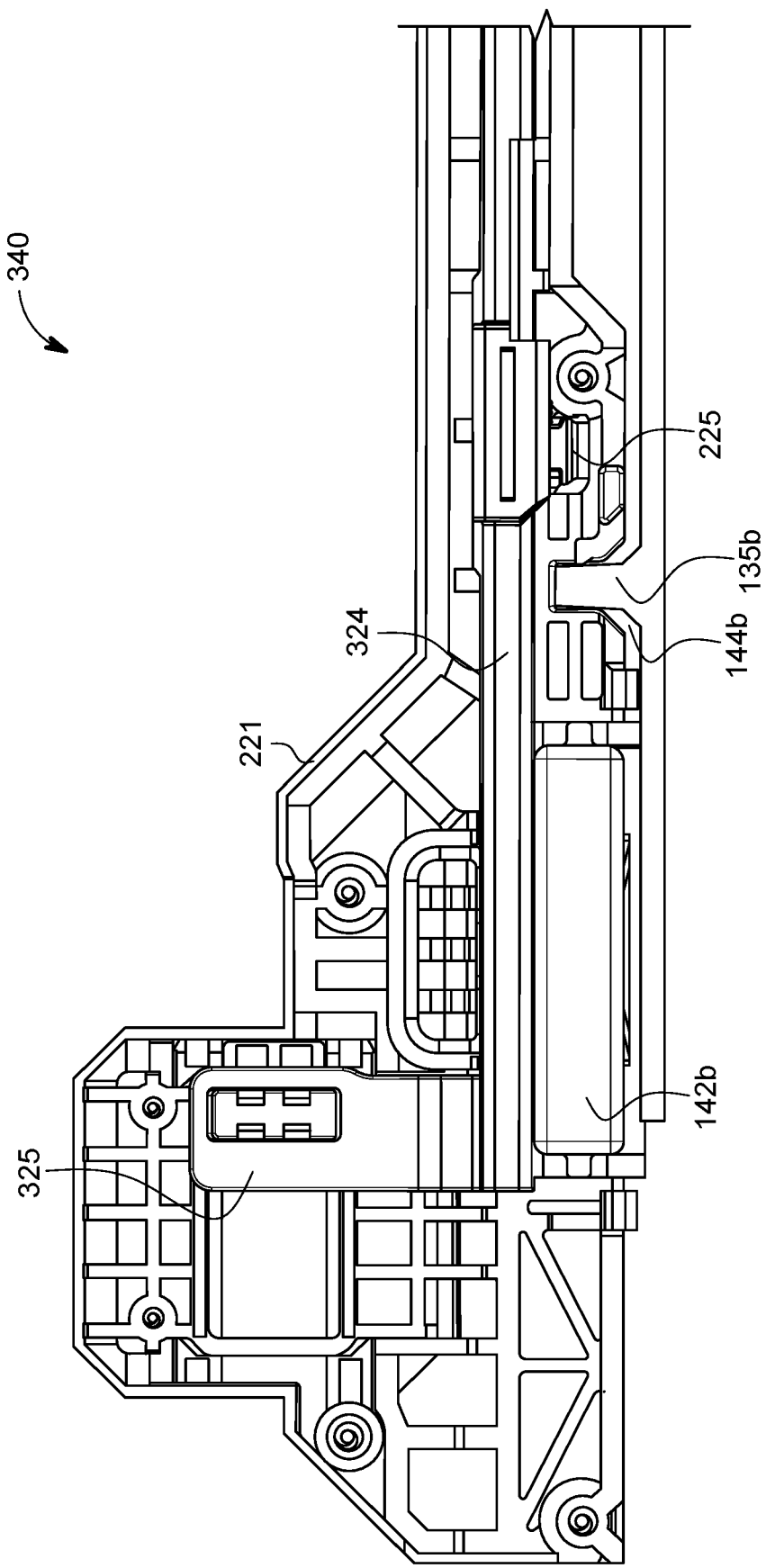

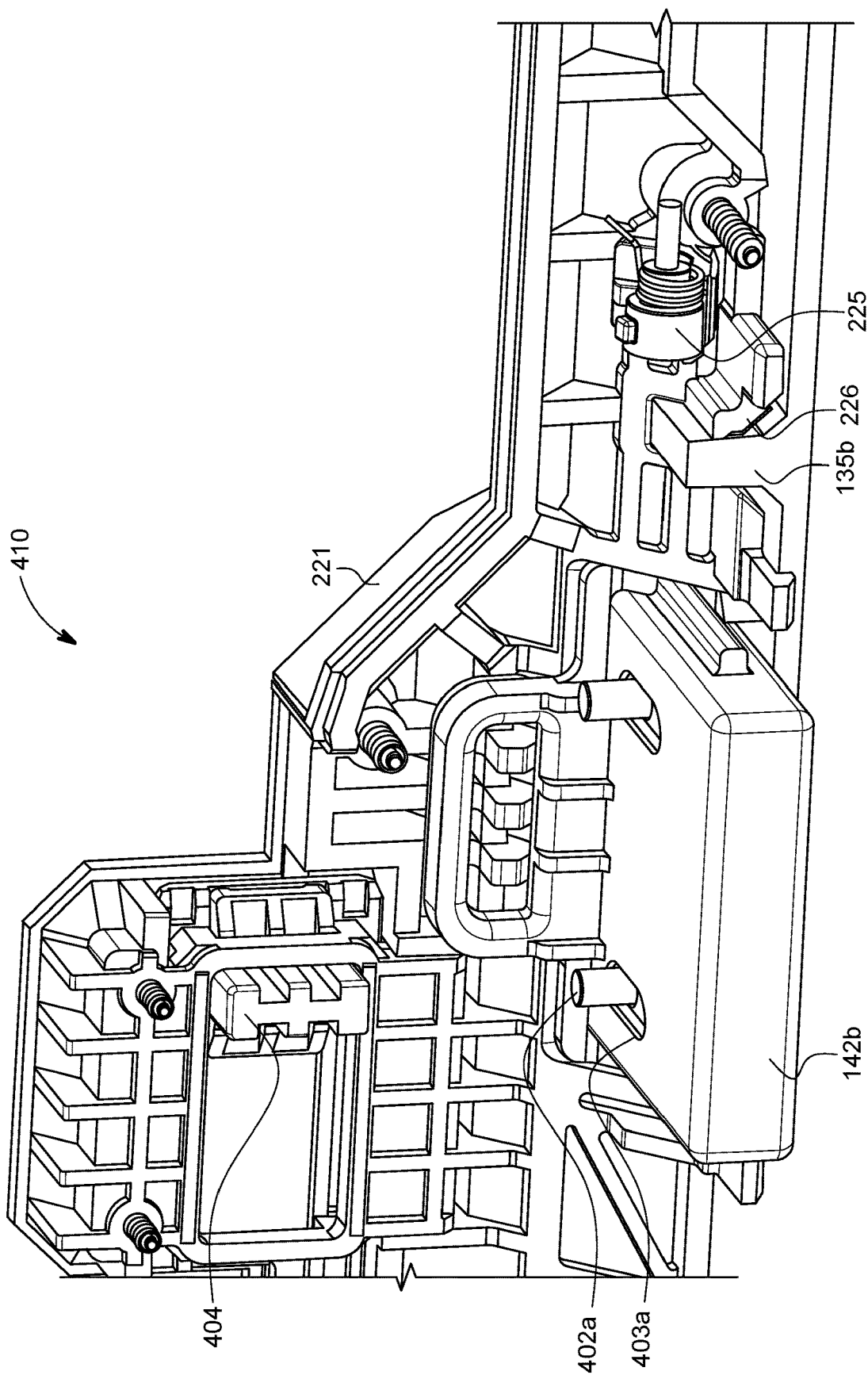

STACKABLE STORAGE CONTAINERS WITH A MAINTENANCE CART

CROSS-REFERENCE(S) TO RELATED APPLICATION(S)

The present application is a Continuation of, and claims the benefit of the filing date of U.S. application Ser. No. 18/385,918, filed on 1 Nov. 2023, entitled "STACKABLE STORAGE CONTAINERS WITH STACKING SELF-LOCK,", under 35 U.S.C. § 120, which in turn claims the benefit of the filing date of the U.S. Provisional Patent Application 63/422,398, entitled "STACKABLE STORAGE CONTAINERS WITH STACKING SELF-LOCK," filed on 3 Nov. 2022, the contents of both of which are hereby expressly incorporated by reference in their entirety, under 35 U.S.C. § 119(e).

TECHNICAL FIELD

This application relates generally to storage containers. More specifically, this application relates to a system of multiple storage boxes that easily stack and automatically lock in place.

BRIEF DESCRIPTION OF THE DRAWINGS

The drawings, when considered in connection with the following description, are presented for the purpose of facilitating an understanding of the subject matter sought to be protected.

FIG. 3E shows the example lock mechanism assembly of FIG. 3B in locked state;

FIG. 4B shows an example closeup view of the back side of the lock mechanism assembly in locked state and with slider removed;

DETAILED DESCRIPTION

Figure 1A:
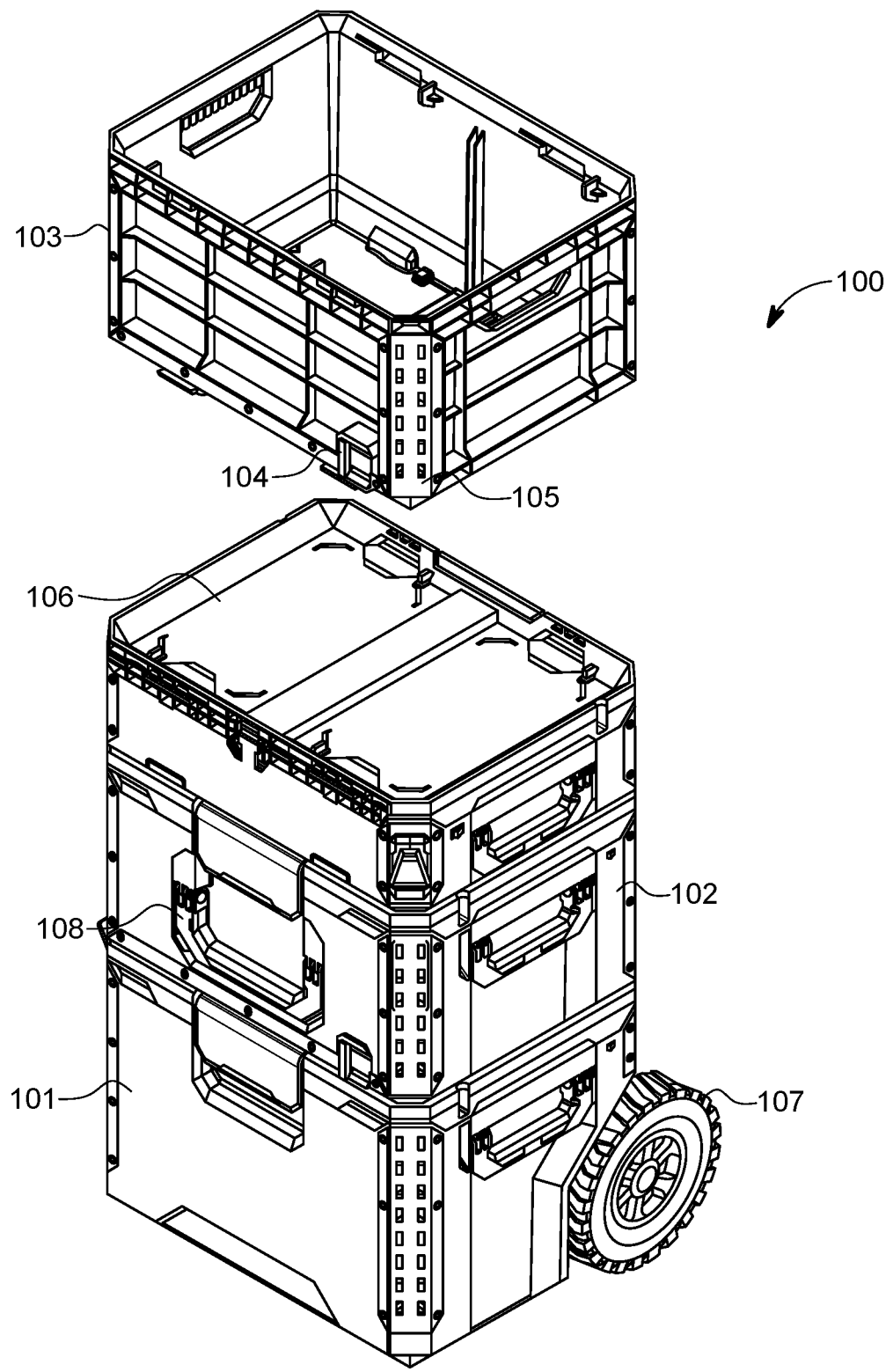
FIG. 1A shows an example stack of multiple storage boxes with sliding lock indicator levers.

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while following description references particular toolbox configurations, it will be appreciated that the disclosure may be used with other types of containers or storage boxes that may be stacked on top of each other or otherwise attached together.

Briefly described, a system is disclosed including a storage container having a body with a top lid, a bottom surface, and side walls enclosing a volume within the body and connecting the top lid with the bottom surface. In various embodiments, the storage container may further include a set of stacking locks that may be deployed automatically to lock the storage boxes together when a first storage container is placed upon the top of a second storage container. The stacking lock is a tri-state lock mechanism. Deep chamfers at bottom surfaces and top lids of storage boxes allow automatic alignment of the first (top) storage container with the second (bottom) storage container. Additionally, protrusions in bottom storage container fit into detent slots that allow automatic locking of containers when placed on top of other containers and help further align stacked containers. A lock status indicator automatically indicates the state of the stacking locks (unstacked-unlocked, stacked-locked, stacked-unlocked) at all times. The lock status indicator may also have an added function to allow a user to unlock the stacked storage containers to detach and remove them from the stack. In various embodiments, the user may not manually lock the storage containers but the user may unlock them manually, as noted above. In various embodiments, the set of stacking locks may include a front set and rear set of locks. The locks may be actuated via various linkages upon alignment of the storage containers.

In various embodiments, a portable storage system is disclosed including a first stackable container having a locking system, and a lock status indicator on the first stackable container that automatically indicates a particular present state, as one of a locked state and an unlocked state, of the locking system of the first stackable container when placed on top of a second stackable container and when removed from the second stackable container.

In various embodiments, a stackable container including a protrusion on a lid of the stackable container usable to stack and lock an upper stackable container and automatically align the upper stackable container with the stackable container when the stackable container and the upper stackable container are misaligned. The protrusion on the lid of the stackable container fits into a self-aligning slot at a bottom of the upper stackable container to help align the two stacked containers.

In various embodiments, a container locking system is disclosed including a lock mechanism assembly having three locking states including an unstacked unlocked state, a stacked locked state, and a stacked unlocked state. The lock mechanism assembly is deployed on a first container and is actuated by a second container stacked on the first container.

In various industrial applications, including construction projects, repair shops, plumbing service providers, auto repair facilities, and the like, a multitude of various hand and power tools are employed. The number and weight of all the tools that may have to be carried to a job site and back or keep organized in a repair shop may become unmanageable without effective storage, causing loss of tools, missing the tools needed for a job, and making it difficult to carry all the tools needed for a project. Tools may be organized based on their type of function or application, based on size or weight, based on being manual or powered, and the like. So, each set of tools may be stored in a separate container to keep them organized and easily accessible. There is a need for an effective, quick, and easy way to attach all such storage containers together, for example, by stacking them, that allows the user to quickly and securely attach and detach the storage containers.

It is to be noted that directions, orientations, and other relative terms such as "front", "back", "top", "bottom", "left", "right", "inside", "outside", "interior", "exterior", "downward", "upward", "front-facing", "down-facing", "vertical", "horizontal", "diagonal", and the like are described with respect or relative to a distinguishing feature of the system or device body itself. For example, if the front part or surface of a system body or an object is identified in the description, then rear or back is defined as the part or surface opposite the front surface, left is defined as the left side when looking into the front surface, and so on. As long as directions are unambiguously identifiable based on the descriptions and figures, how the orientations are defined is immaterial.

It is further to be noted that values of various quantities and parameters, and/or differences between systems or mechanisms or processes, may be expressed as estimated values with reference to another similar quantity or system, using terms such as "substantially," "approximately," "almost," "materially," "nearly," "about," and the like. In many fields, such as engineering, chemistry, finance and others, differences between two similar entities or quantities that are equal to or less than fiver percent (5%) are considered as insignificant, forming a reasonable approximation of the quantity. In the context of systems, insignificant difference is defined as difference between the outputs of the systems being less than or equal to 5%.

I. Stacking Storage Containers

FIG. 1A shows an example stack of multiple storage boxes with sliding lock indicator levers. In various embodiments, stack 100 includes a wheeled base container or box 101, other intermediate boxes 102, a top or upper box 103, each box having a handle 108 and a lock status indicator 104, corner slots 105, and a lid 106. The base box 101 may include wheels 107.

In various embodiments, the boxes are stacked one on top of another and lock together via a lock mechanism assembly, described later. In some embodiments, the lid 106 of each box forms a concave or recessed surface with slanted/sloped inner sides to automatically center an upper box placed on it. The bottom of each box forms a convex surface with slanted/sloped outer sides, matching an angle of the inner slope of the lid 106. The respective slanted sides cause the upper box 103 to move to center of the lid 106 and sit on top of a bottom or lower box. In various other embodiments, the lid 106 may be convex and the bottom of the upper box 103 may be concave to perform the same function of centering the upper box onto a lower box.

It is to be noted that throughout this disclosure, the direction up extends from the wheels 107 towards upper box 103. The direction down is opposite to direction up. The front of the box is the face or side on which the lock status indicator 105 appears and the back is opposite of front. The exterior of a side or panel or bar of a box is the surface that faces away from an interior center of the box enclosed by its sides, and the interior of the side or panel or bar is the surface that faces towards the center of the box. So regardless of the orientation of the stack or individual boxes, the directions disclosed herein are unambiguously specified with respect to the stack or box itself.

As used herein, the terms box, container, storage box, case, chest, enclosure, and other similar terms are used interchangeably, unless otherwise differentiated explicitly or by context.

In various embodiments, the stackable boxes stacked together on a wheeled base, as disclosed herein, create a mobile or portable storage system that allows carrying many tools, equipment, materials, and other objects in a secure and organized manner.

Figure 1B:
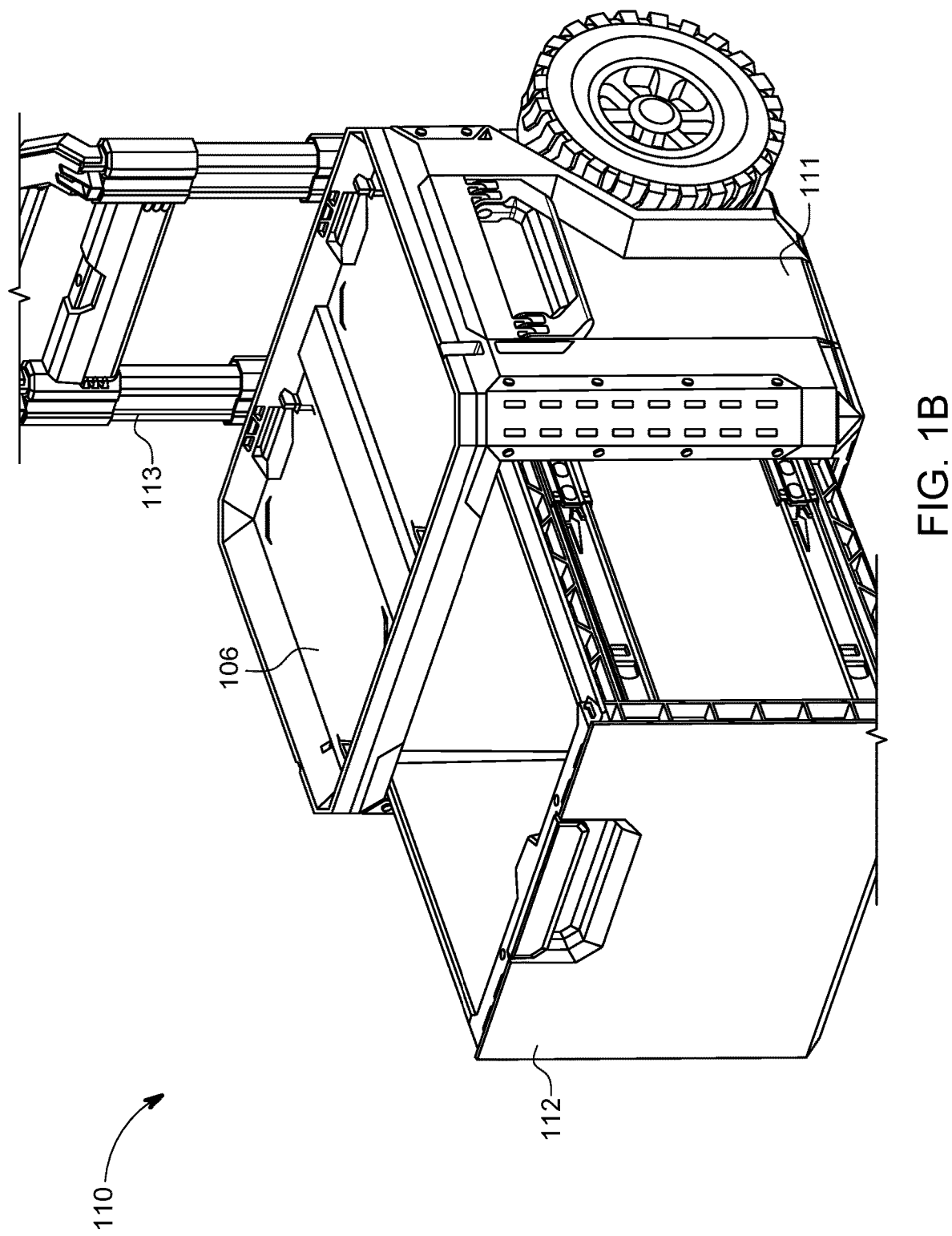
FIG. 1B shows an example base box having a drawer, handle and wheels.

FIG. 1B shows an example base box having a drawer, handle and wheels. In various embodiments, the base box arrangement 110 includes a base box 111 having a drawer 112 an extendable handle 113, and a concave lid 106.

In various embodiments, the base box 111 may have a full size drawer covering the entire inner volume of the base box 111. Access to the internal volume of the base box 111 may be from the drawer when pulled out and/or from the top lid 106. In some embodiments, the top lid may not provide access to the interior of the base box 111, but be used to receive upper boxes.

Figure 1C:
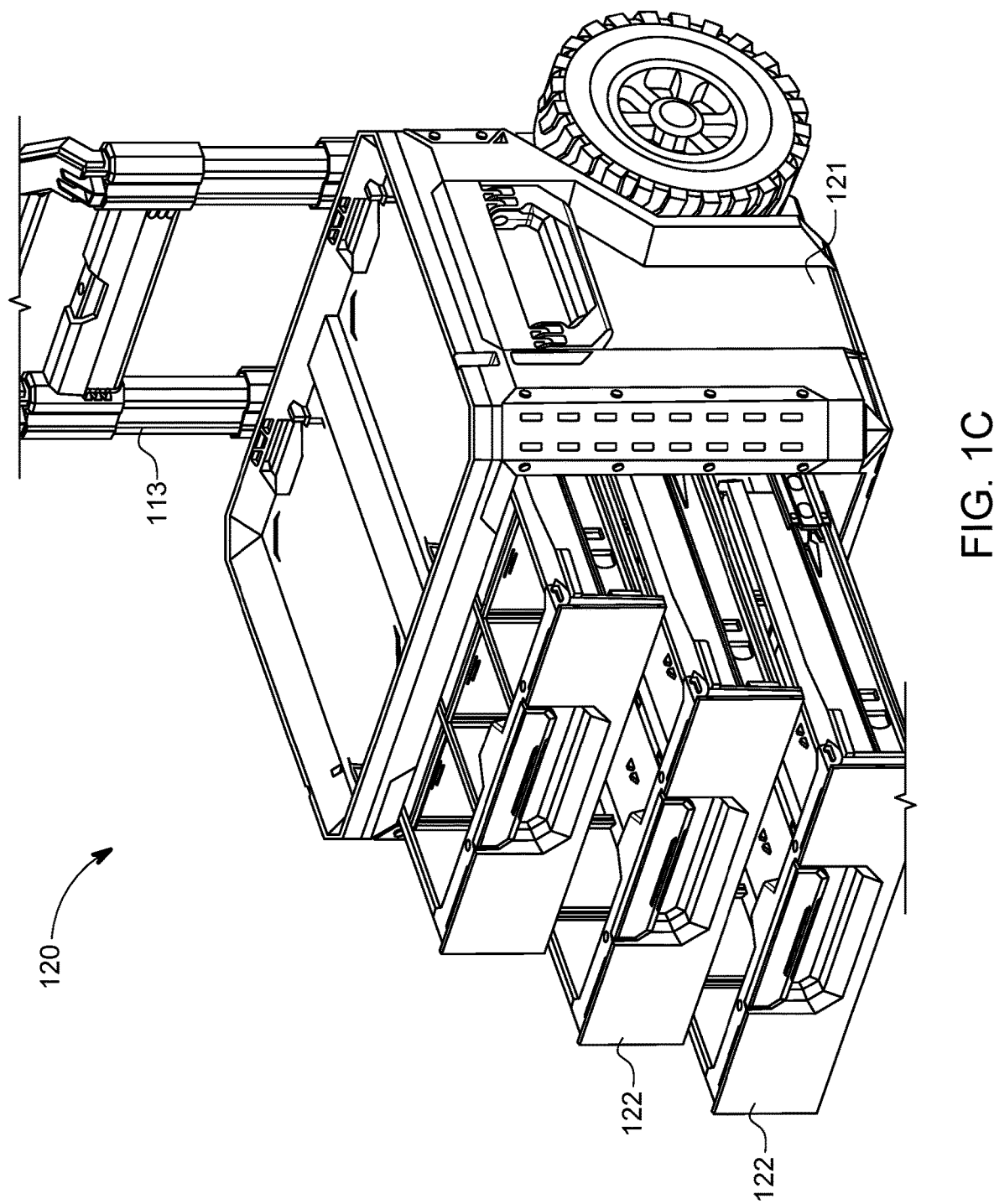
FIG. 1C shows an example base box having multiple drawers, handle and wheels.

FIG. 1C shows an example base box having multiple drawers, handle and wheels. In various embodiments, the base box arrangement 120 includes a base box 121 having multiple drawers 122 an extendable handle 113.

In various embodiments, the base box 121 is similar in use and operation to base box 111 of FIG. 1B.

Figure 1D:
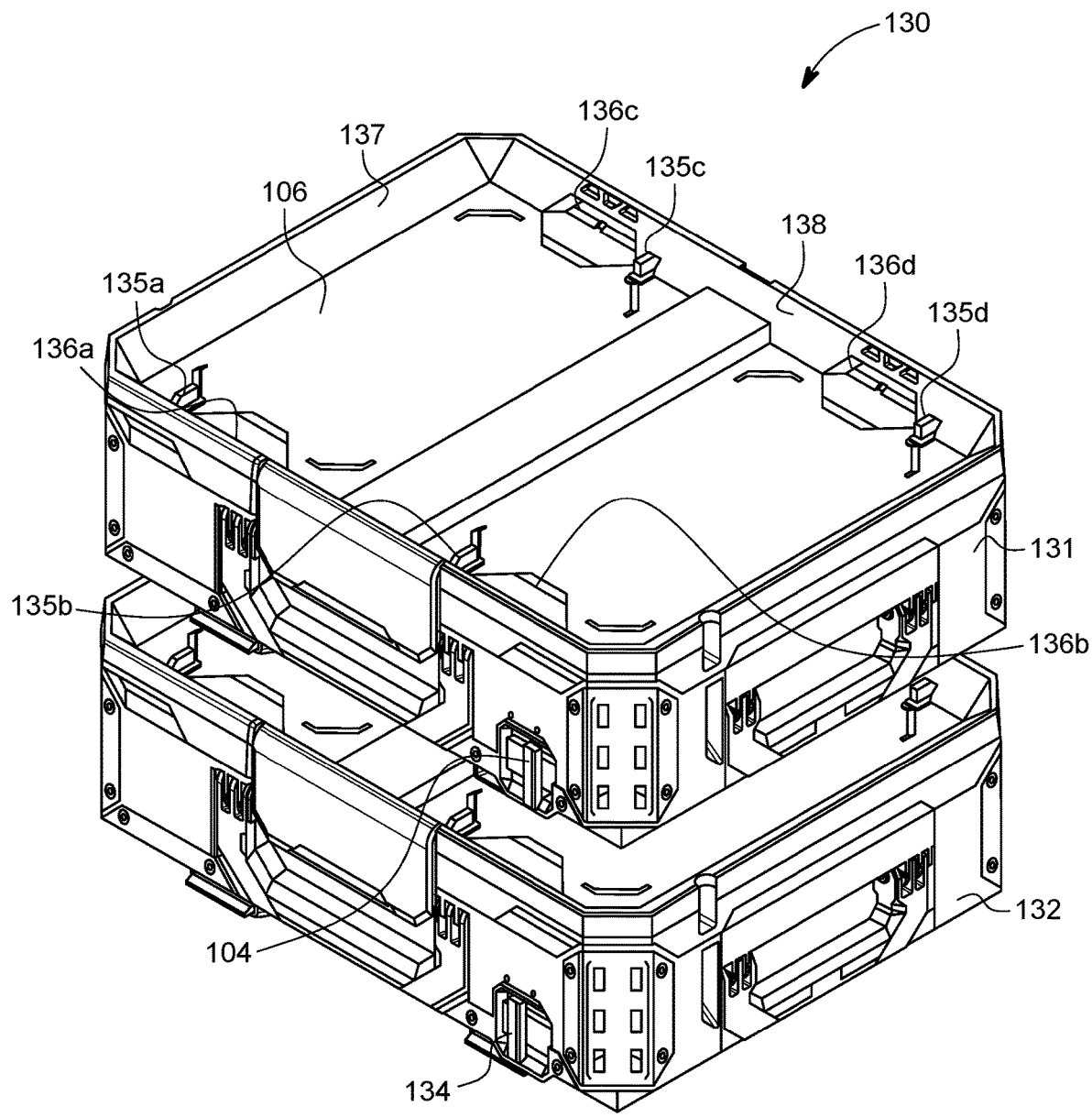
FIG. 1D shows example detached upper and lower boxes.

FIG. 1D shows example detached upper and lower boxes. In various embodiments, the arrangement 130 includes a first, top or upper box 131, a second, bottom or lower box 132, each box in turn including a concave lid 106, lock status indicators 104 and 134, lid protrusions 135a, 135b, 135c, and 135d, front latch or cleat receivers 136a, 136b, rear latch or cleat receivers 136c and 136d, short slanted (or chamfered or beveled) side 137 and long slanted side 138.

In various embodiments, the upper box 131 may be placed on top of lower box 132 to be centered and locked in place to the lower box 132. The details of this stacking operation and also unstacking operation are described later herein.

In various embodiments, the cleat receivers 136a-136b are recessed slots with rigid walls deployed within the lid of the lower box to receive and rigidly hold the latches or cleats extended from the upper box. The recessed slots are substantially shaped and sized to closely fit the size of the latches or cleats they receive.

Figure 1E:
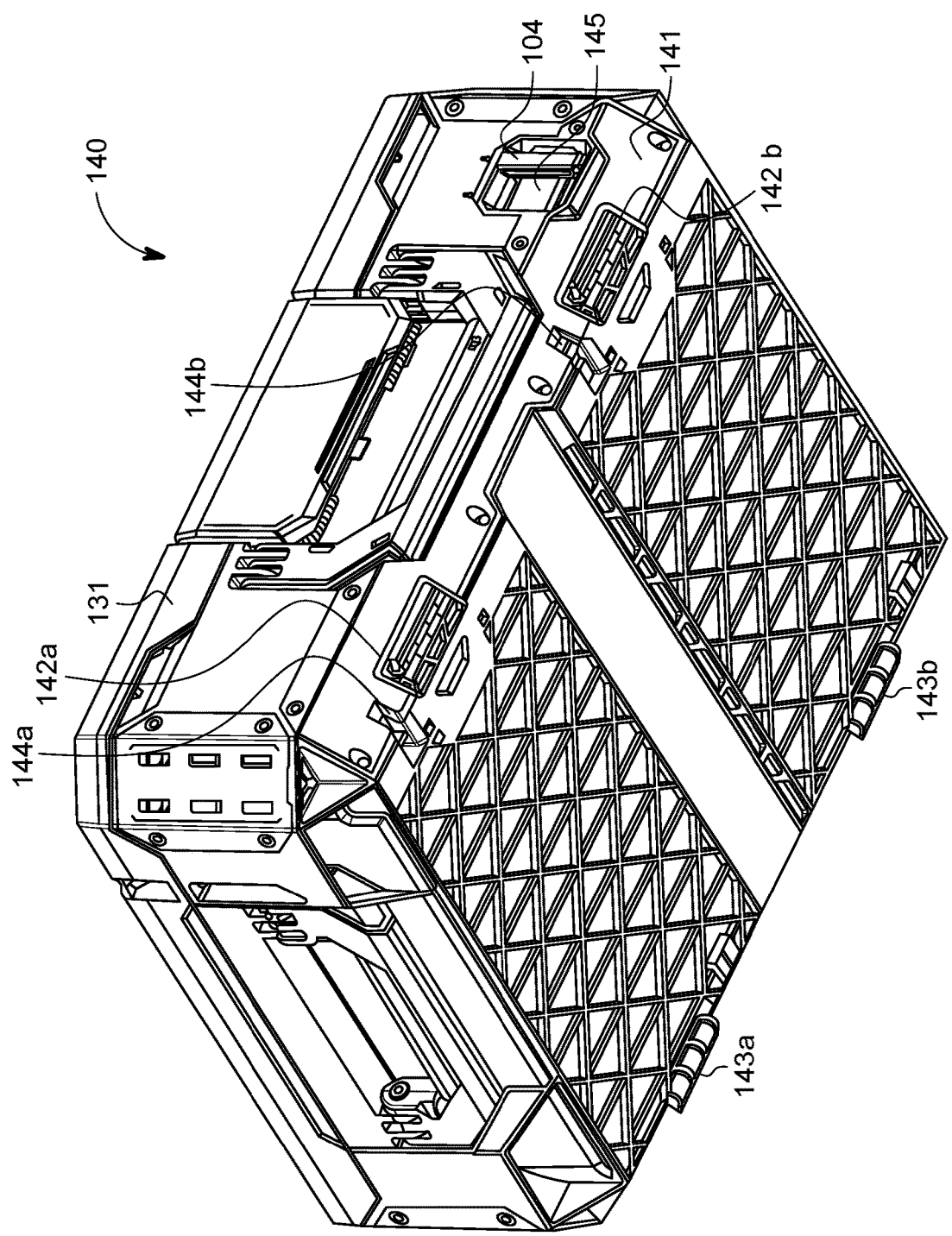
FIG. 1E shows a bottom view of a storage box with locking latches or cleats.

FIG. 1E shows a bottom view of a storage box with locking latches or cleats. In various embodiments, the bottom view 140 includes the upper box 131, the lock status indicator 104, a bottom slanted sides 141, front latch or cleat assemblies 142a and 142b, rear fixed latches or cleats 143a and 143b, detent receptacles or slots 144a and 144b, and indicator sliding path 145.

In various embodiments, when the upper box 131 is placed on a lower box 132, the rear fixed cleats 143a and 143b engage and are received into cleat receivers 136c and 136d (see FIG. 1D), respectively, and the front cleat assemblies 142a and 142b engage and are received into 136a and 136b, respectively. The bottom slanted sides 141, extending around the bottom perimeter of the upper box 131, engage the short slanted sides 137 and long slanted sides 138, forcing the upper box 131 towards the center of the lid of lower box 132 from all directions.

In various embodiments, the lock status indicator 104 indicates the status of the lock between the stacked boxes, as further described below with respect to other figures.

In various embodiments, the parts at the bottom of each box, which are matching or complementary with other parts of the lid or top of another box, may switch places. More specifically, in such embodiments, the convex bottom of the top box and the concave top of the bottom box may be reversed with bottom of the top box being concave to receive the convex top of the bottom box. Similarly the cleats at the bottom of the top box may be switched with the cleat receivers at the top of the bottom box. These embodiments create a stack of locking boxes with reversed locking parts and configurations while performing substantially the same function. Additionally, some of the upper and lower boxes stacked together may be interchangeable.

With reference to FIGS. 1D and 1E, in various embodiments, lid protrusions 135a-135d are arranged to make them symmetrical such that the upper box 131 may be rotated 180 degrees about a vertical axis passing through the center of lid 106, and still be locked onto the lower box 132 the same way. This is because facing opposite directions, protrusions 135a-135d of lower box 132 will match detent slots 144a and 144b. Similarly, front cleat assemblies 142a and 142b and rear cleats 143a and 143b will match cleat receivers 136a-136b, on the opposite site of the lower box 132.

Figure 1F:
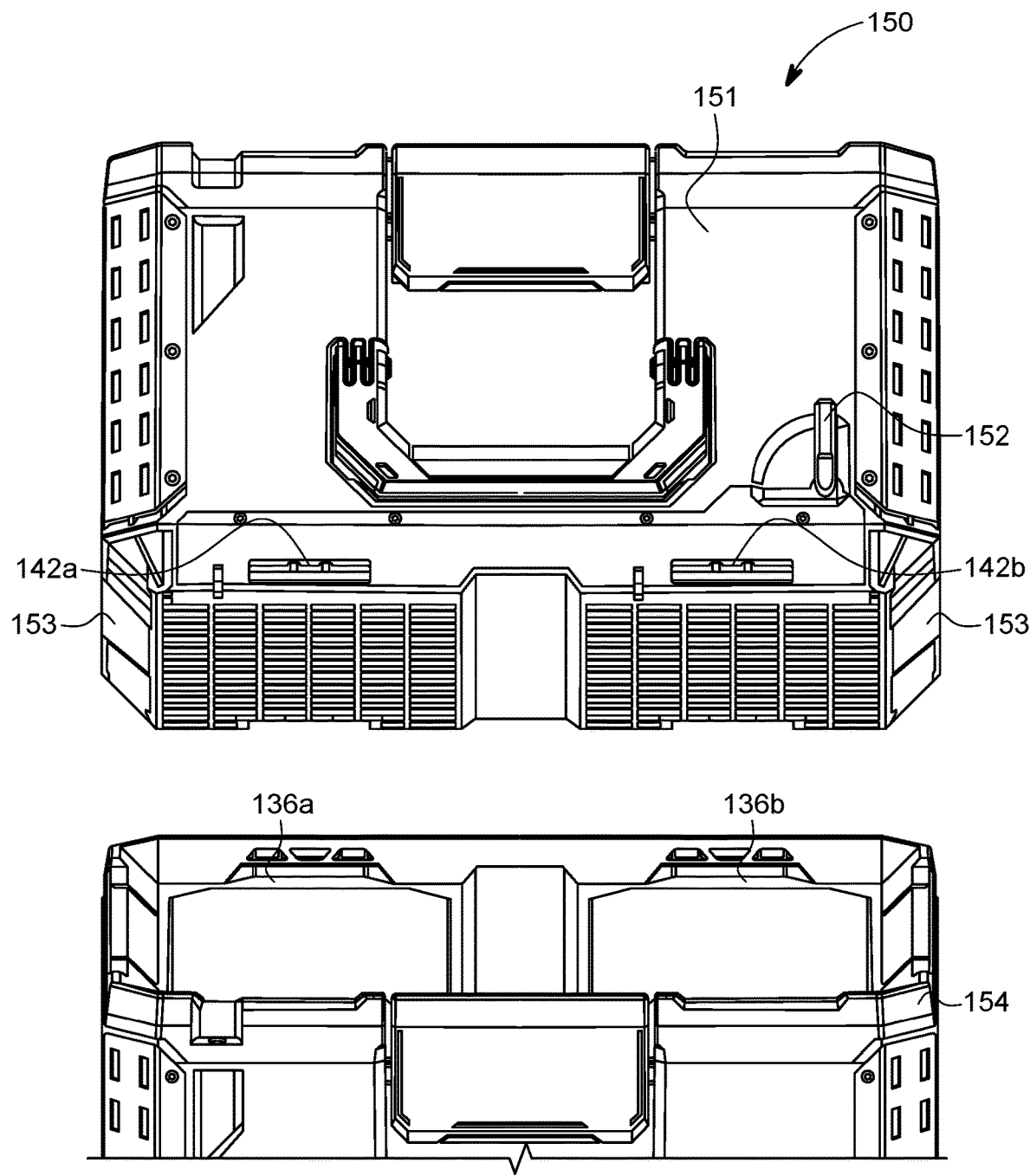
FIG. 1F shows an example storage box with a rotating lock indicator lever.

FIG. 1F shows an example storage box with a rotating lock indicator lever. In various embodiments, the stacking box arrangement 150 includes an upper box 151, cleat assemblies 142a and 142b, bottom slanted sides 153, rotational lock status indicator 152, lower box 154, and cleat receivers 136a and 136b.

In various embodiments, the arrangement 150 is similar in use and operation to upper box 131, but with a different lock status indicator. The lock status indicator 104 on upper box 131 is a sliding bar, while the lock status indicator 152 is a rotational bar. The lock mechanism assembly may also be different in ways described later to work with the rotational lock status indicator. In some embodiments, a vertical orientation of the lock status indicator 152 indicates an unlocked state, while a horizontal orientation indicates a locked state.

Figure 2A:
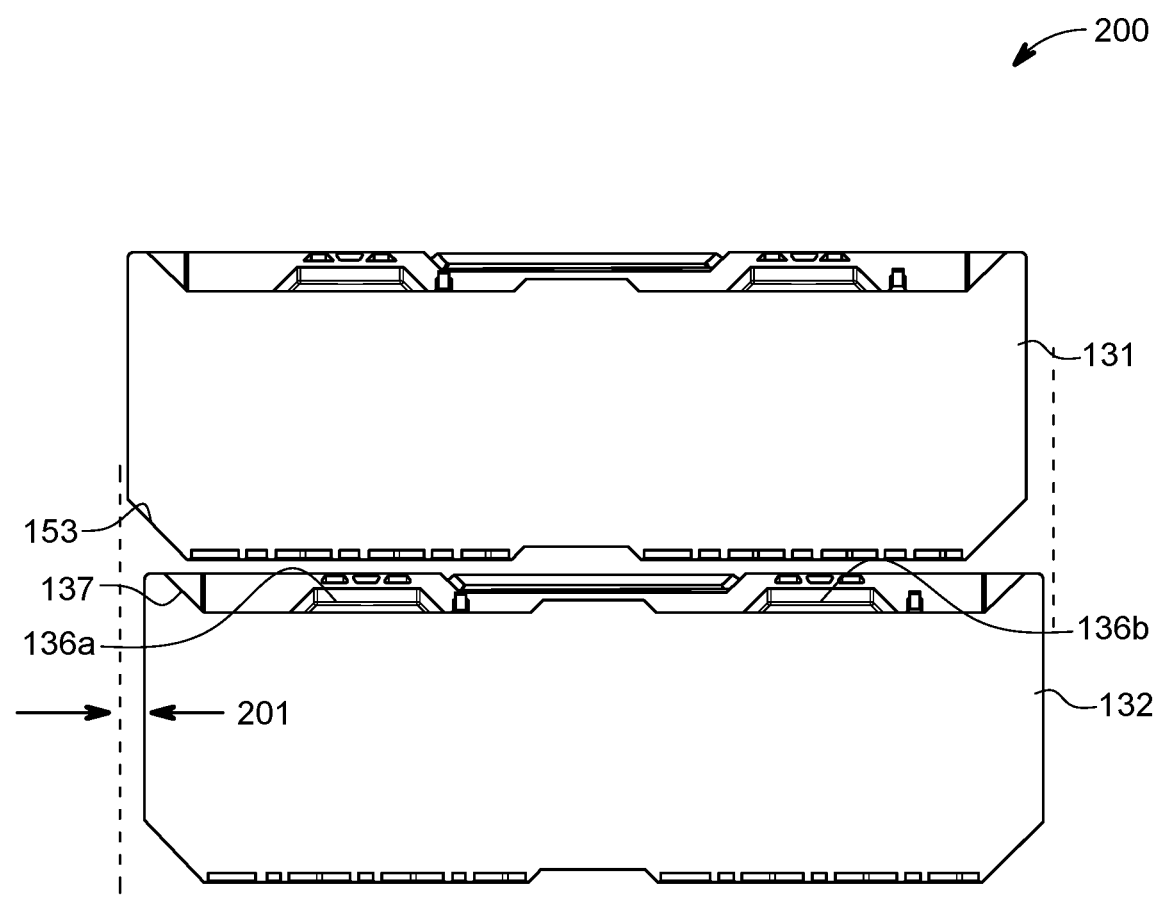
FIG. 2A shows example misaligned upper and lower boxes.

FIG. 2A shows example misaligned upper and lower boxes. In various embodiments, the misaligned stacking arrangement 200 includes an upper box 131 with a bottom slanted side 153, a lower box 132 with short slanted side 137, cleat receivers 136a and 136b, and misalignment gap 201.

In various embodiments, the upper box 131 may be placed on top of the lower box 132 with misalignment gap 201 that results in misalignment of the two boxes in the stack, as shown. The misalignment is automatically corrected when the short slanted side 137 of lower box 132 exerts a force onto bottom slanted side 153 of the upper box 131, pushing the upper box 131 towards the center of lower box 132. The self-alignment of the stacked boxes is further enhanced by the detent slot 144a, as further described below with respect to other figures.

Figure 2B:
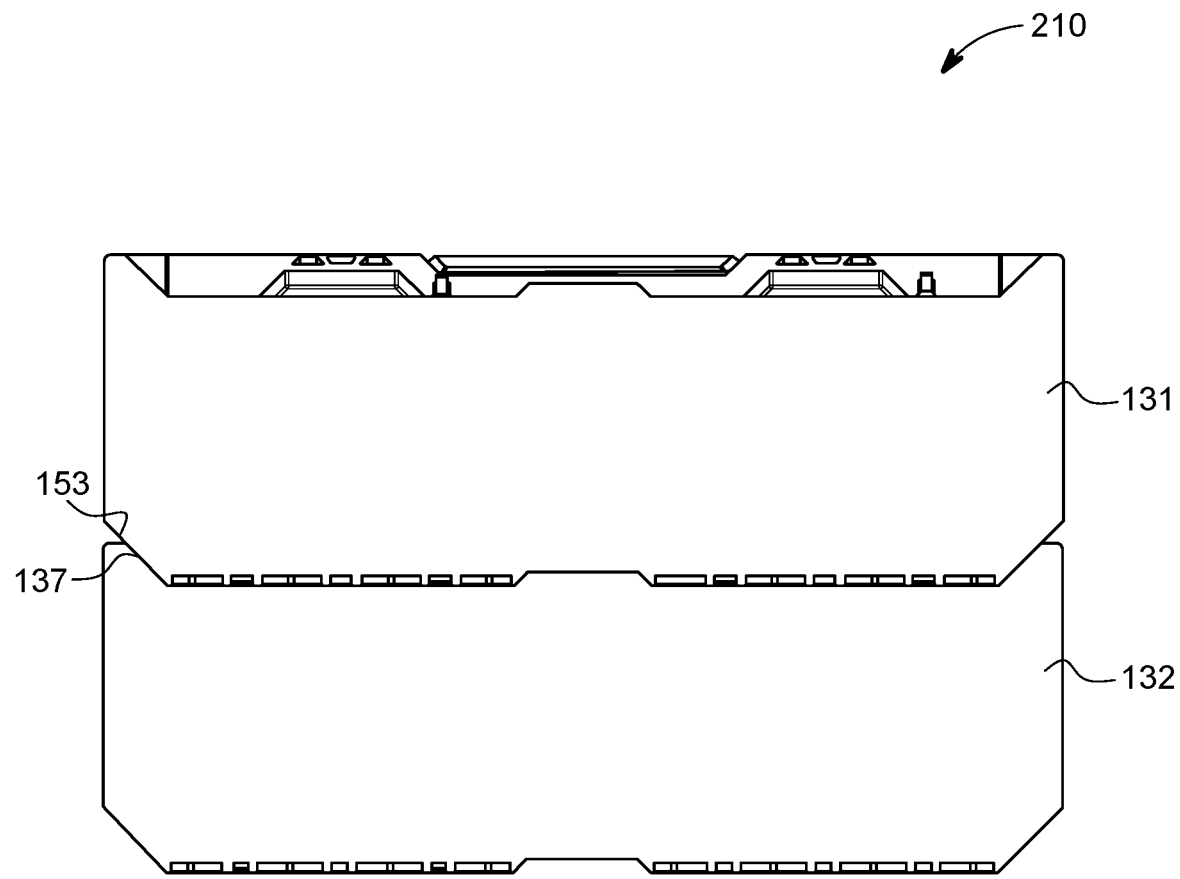
FIG. 2B shows example aligned upper and lower boxes.

FIG. 2B shows example aligned upper and lower boxes. In various embodiments, the aligned stacking arrangement 210 includes the upper box 131 with a bottom slanted side 153, and the lower box 132 with short slanted side 137.

This figure shows that the upper box 131 is aligned with the lower box 132 via the short slanted side 137 of lower box 132 exerting a force onto bottom slanted side 153 of the upper box 131.

Figure 2C:
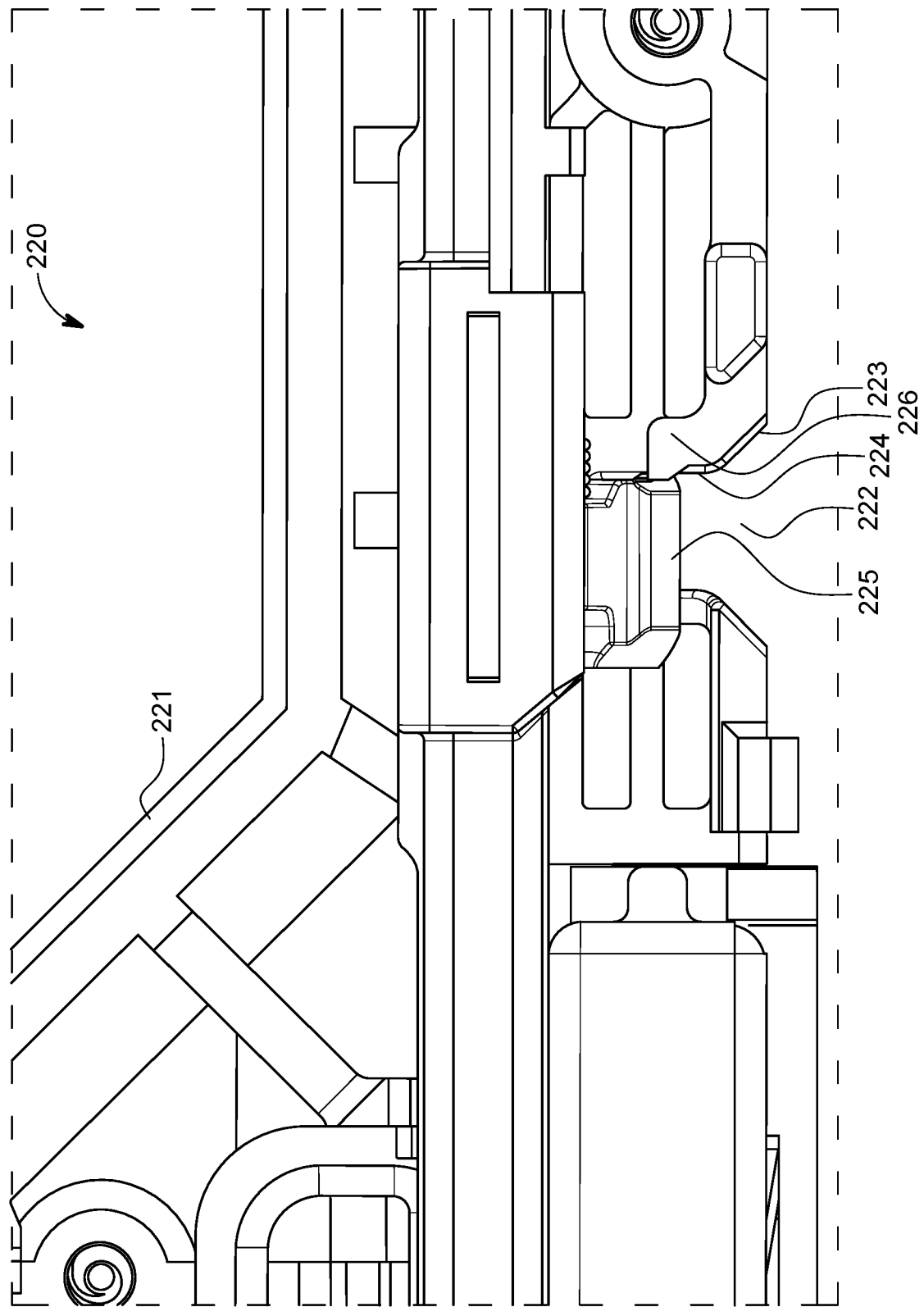
FIG. 2C shows an example closeup view of detent actuation mechanism with no protrusion inserted.

FIG. 2C shows an example closeup view of detent actuation mechanism with no protrusion inserted. In various embodiments, the closeup view 220 includes a lock mechanism assembly 221, a detent slot entry 222 having a slanted wide section 223 and a straight narrow section 224, a detent 225, and a detent stop 226. This figure shows the back side of the lock mechanism assembly 221 facing towards the interior of the box.

In various embodiments, when a box is in an unlocked state (not locked to other boxes in the stack), the detent 225 is exposed and accessible at the detent slot entry 222. The detent is rotationally spring-loaded for its proper operation as further described with respect to other figures below. The detent slot 144b (see FIG. 1E) of an upper box receives protrusion 135b on the lid or top of the lower box and activates automatic locking process of two adjacent stacked boxes, when the upper box is placed on the lower box. In this figure, the detent is shown in the unlocked position. The detent stop 226 stops the detent 225 from moving towards right side of the figure as shown. In this figure, the lock status indicator 104 (not shown) is at the left side of the figure.

In various embodiments, the slanted wide section 223 is wider than a width of the protrusion 135b on the lid 106 of the lower box. The straight narrow section 224 is slightly bigger than the width of the protrusion 135b to snugly enclose the protrusion. The difference in size between the slanted wide section 223 and the straight narrow section 224 serves to automatically align the protrusion 135b with the narrow. When the upper box is placed on the lower box, a slight misalignment between the protrusion 135b and detent slot entry 222 may be corrected because the protrusion 135b may fall within the slanted wide section 223 and be guided into its final resting location within the straight narrow section 224. This action further helps to self-align the upper box over the lower box in addition to the self-alignment action of the short slanted sides 137 and bottom slanted side 153, described above with respect to FIGS. 2A and 2B.

Hence, the self-aligning action of the detent slot entry 222 and the slanted sides of the boxes assist each other to quickly and positively align an upper and lower box in a stack for locking. This arrangement makes detent slot 144b (and 144a) a self-aligning slot in the context of helping align upper and lower boxes when initially stacked.

Figure 2D:
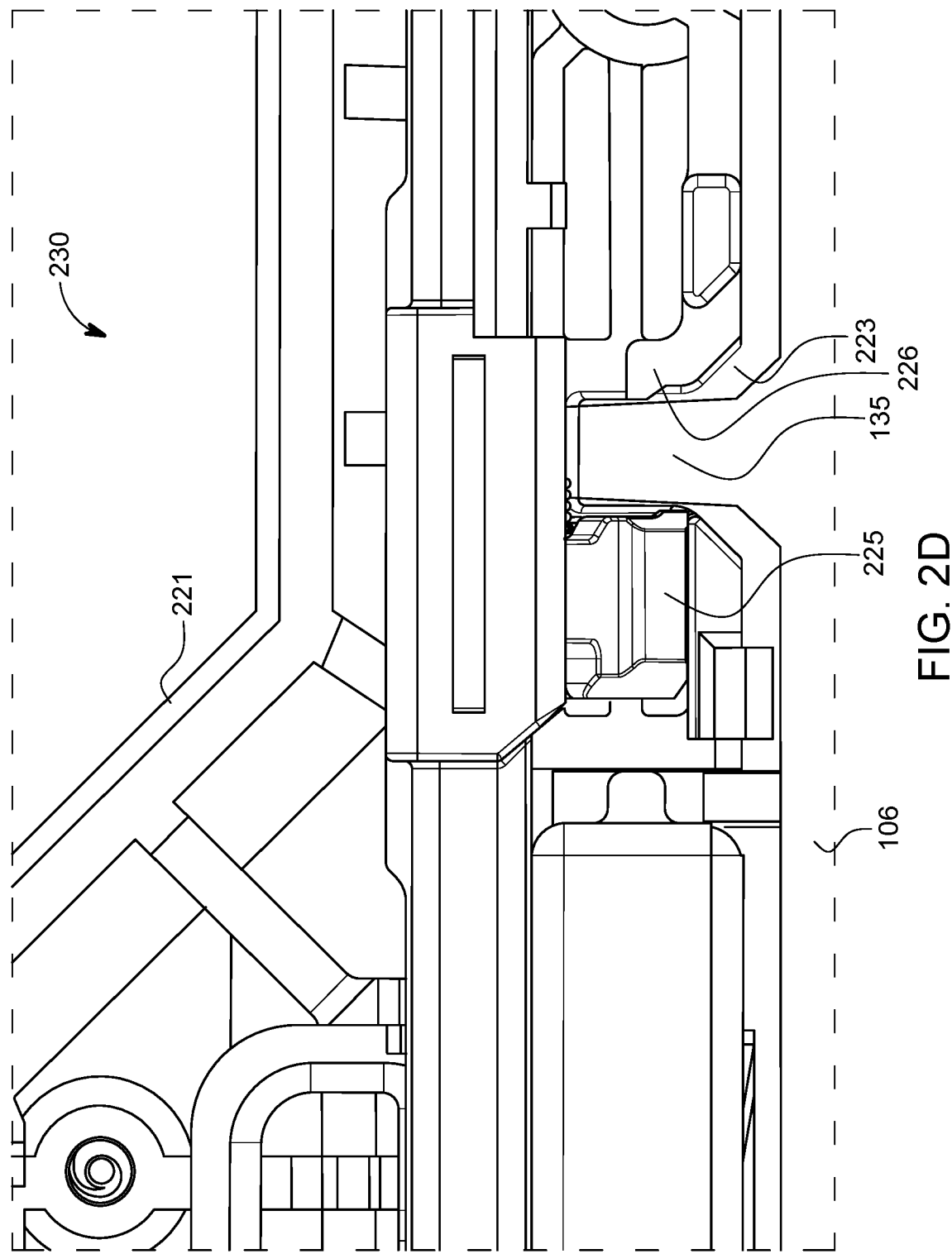
FIG. 2D shows an example closeup view of detent actuation mechanism with a protrusion inserted.

In various embodiments, the detent slot entry 222 self-alignment may also serve to hold the upper and lower boxes together more strongly and positively and prevent any slop or shifting around of the boxes because even though the slanted wide section 223 is angled, but the straight narrow section 224 encloses the protrusion 135b along part of its length, as shown in FIG. 2D described below, preventing movement of the boxes with respect to each other in a lateral direction along the planes of the bottom of the upper box and the lid of the lower box.

FIG. 2D shows an example closeup view of detent actuation mechanism with a protrusion inserted. In various embodiments, the closeup view 230 includes the lock mechanism assembly 221, the detent slot entry 222 having the expanded section 223, the detent 225, the detent stop 226, the lower box lid 106 having a protrusion 135.

In various embodiments, the protrusion 135 pushes the detent away while also rotating it, as further described below with respect to other figures. The state of the detent shown in this figure is in an unlocked position while the upper box lies on the lower box with the protrusion 135 inserted into the detent slot 144a. As described above with respect to FIG. 2D, the insertion of the protrusion 135 into straight narrow section 224 of the detent slot 144a holds the upper and lower boxes together and prevents lateral movement of the boxes with respect to each other.

Figure 3A:
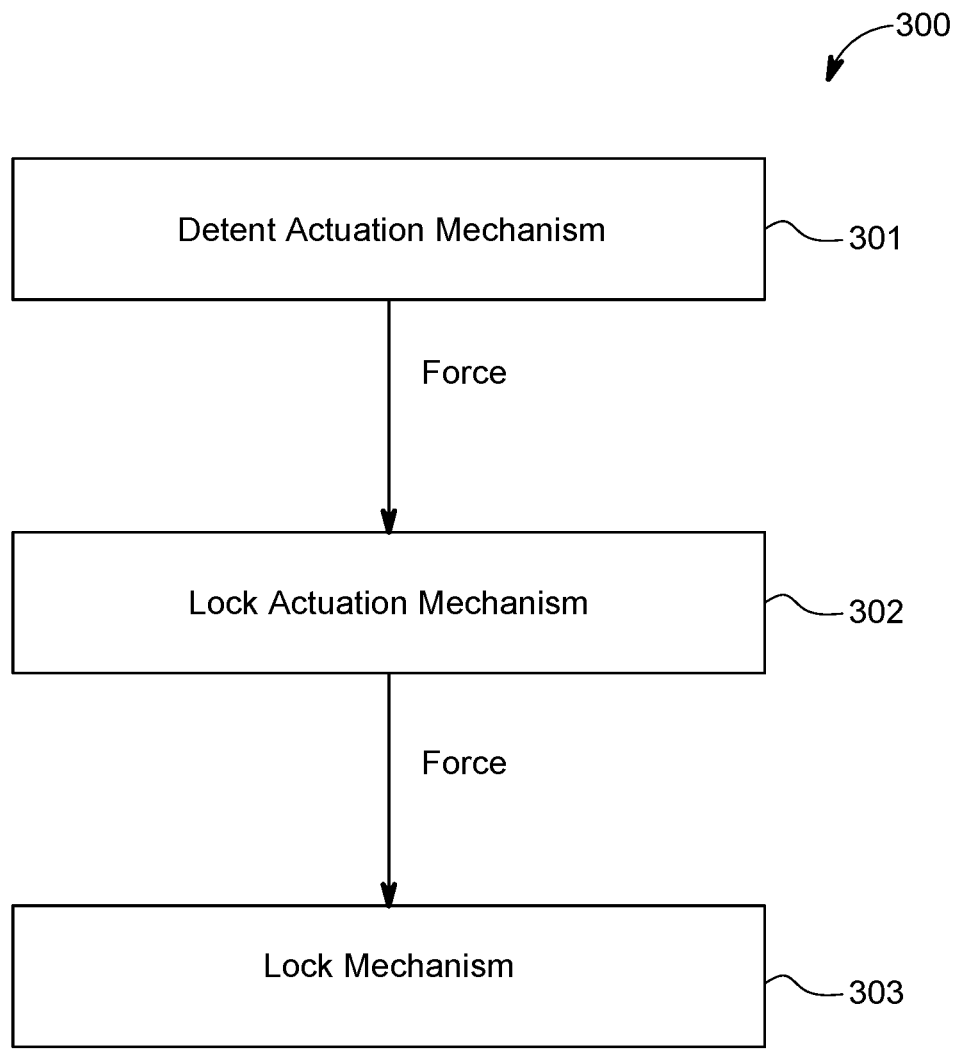
FIG. 3A shows an example abstract structure of a lock mechanism assembly.

FIG. 3A shows an example abstract structure of a lock mechanism assembly. In various embodiments, the abstract structure 300 includes a detent actuation mechanism 301, a lock actuation mechanism 302, and a lock mechanism 303.

In various embodiments, the mechanisms included in the lock mechanism assembly 221 may be implemented as three different and detached mechanisms or be partially or fully integrated as one or two mechanisms, while each performing its own function. In some embodiments, the three mechanisms may share some parts that perform multiple functions for one or more mechanisms. In the descriptions of the various figures below, different or alternative designs for each of the three mechanisms are described.

In various embodiments, the lock mechanism assembly 221 may be a three-state (or tri-state) locking system having three distinct states as defined by the position of the upper and lower boxes with respect to each other and the state of the lock that locks the boxes together in the stack. A first lock state is an unstacked unlocked state when the upper box is physically separate from the lower box, the lock is not engaged (boxes unlocked from each other), and the lock status indicator 104 (see FIG. 1A) is in an intermediate position along its indicator sliding path 145 (see FIG. 1E), partially away from each end of the indicator sliding path 145. A second lock state is a stacked locked state when the upper box is physically placed on top of the lower box and the protrusion 135b of the lower box is received within the detent slot 144b, has pushed the detent 225 into a position that allows the locking of the boxes together, as detailed later. In the second lock state, the lock status indicator is at the end of the indicator sliding path 145. A third lock state is a stacked unlocked state when a user manually slides the lock status indicator 104 lever away from the interior center of the box towards its closest side of the box. In the third state, the lock status indicator 104 is at the end of the indicator sliding path 145 farthest away from the interior center of the box (closest to side of the box). Lock mechanism assembly cannot transition from stacked unlocked state to stacked locked state by using the lock status indicator 104 lever without first going through the unstacked unlocked state. The status lock indicator 104 automatically indicates a present state or configuration of the locking system, in which the lock mechanism assembly 221 is at any given time.

In various embodiments, lock status indicator 104 may show two states including locked and unlocked states and not differentiate between boxes being stacked or not. In these embodiments, both the stacked unlocked state and the unstacked unlocked state are indicated as a single unlocked state and are not distinguished by the lock status indicator 104 as two separate states.

Figure 3B:
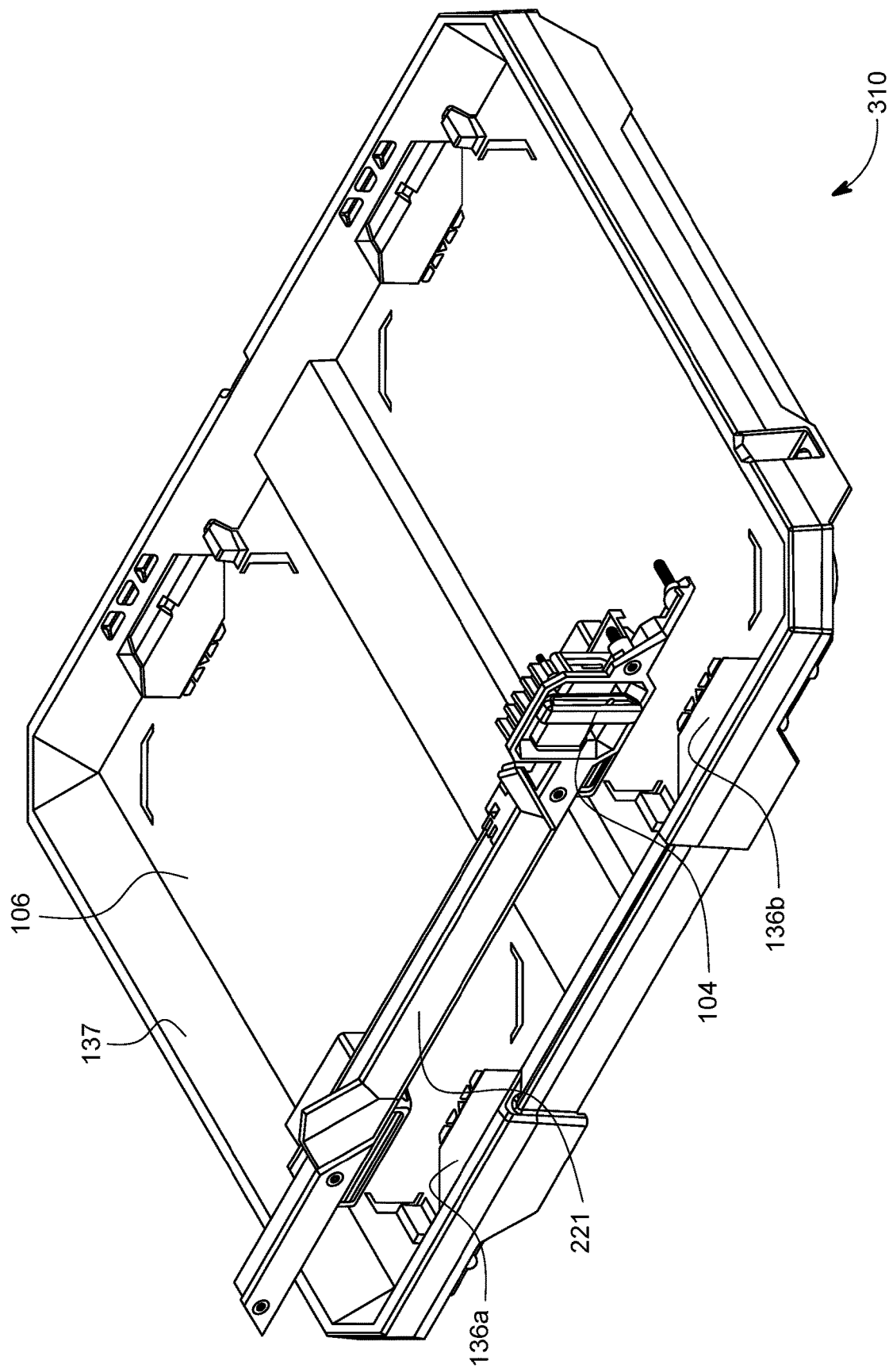
FIG. 3B shows an example lock mechanism assembly as part of an upper box and a lid of a lower box.

FIG. 3B shows an example lock mechanism assembly as part of an upper box and a lid of a lower box. In various embodiments, view 310 shows the lock mechanism assembly 221, lock status indicator 104, slanted side walls 137 of lower box, concave lid 106 of the lower box, and front cleat receivers 136a and 136b.

In various embodiments, the lock mechanism assembly 221 includes a detent actuation mechanism, a lock actuation mechanism, and a lock mechanism, each described with respect to various figures below. This figure shows the front or exterior surface of the lock mechanism assembly 221. Other figures described below show the back side or interior surface of the lock mechanism assembly 221 to better describe the components and operation of the mechanisms employed.

Figure 3C:
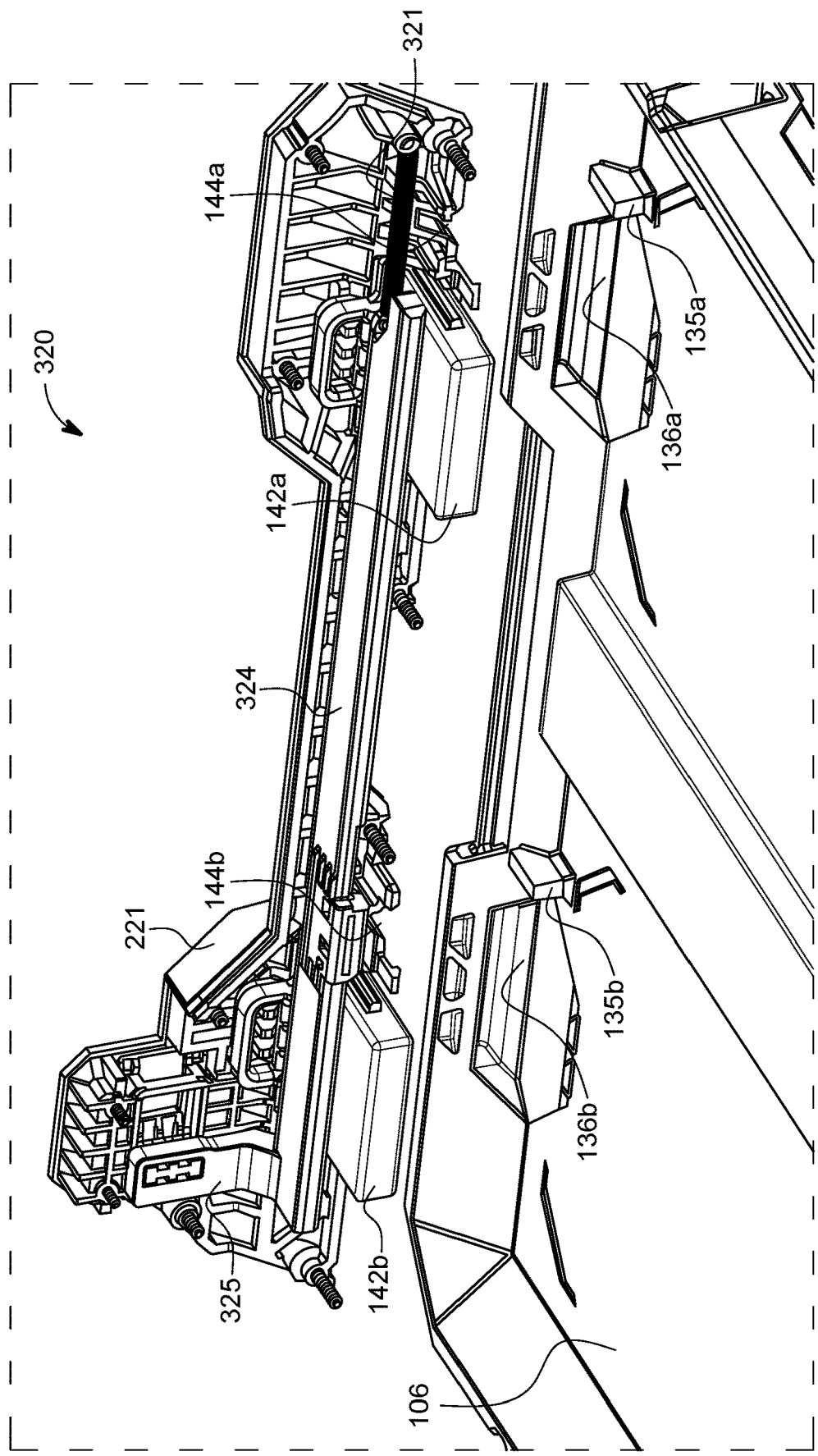
FIG. 3C shows an example back side of the lock mechanism assembly of FIG. 3B.

FIG. 3C shows an example back side of the lock mechanism assembly of FIG. 3B. In various embodiments, the back side view 320 includes lock mechanism assembly 221, lower box lid 106, protrusions 135a and 135b, front cleat receivers 136a and 136b, front cleat assemblies 142a and 142b, slider spring 321, detent slots 144a and 144b, slider 324, and slider handle 325. In this figure slider handle 325 is in open or unlocked position.

In various embodiments, when the upper box is placed on top of the lid 106 of the lower box, the protrusions 135a and 135b are received into detent slots 144a and 144b, respectively. Protrusion 135a pushes on detent 225 (see FIG. 2C) and sets in motion a set of actions by transmitting force between the detent actuation mechanism, the lock actuation mechanism and the lock mechanism to lock the upper box and lower box together in the stack.

In various embodiments, the force exerted on the detent 225 (see FIG. 2C) by protrusion 135b causes the detent 225 to be moved and clear the detent stop 226 and allow the slider spring 321 to pull the slider 324 towards the center of the box into a locked position. This is further described in more detail below with respect to various figures.

In various embodiments, the detent actuation mechanism 301 includes protrusion 135b on the lid 106 of lower box, detent slot 144b, detent 225 and its specific parts like detent spring described later, and detent stop described below with respect to other figures. The lock actuation mechanism 302 includes slider 324 and its specific structures such as slider grooves described below with respect to other figures, slider handle 325, lock status indicator 104 lever, and parts of front cleat assembly 142b such as cleat pins described below with respect to other figures. The lock mechanism includes the rear cleats 143a and 143b, front cleat assembly 142a and 142b, and latch or cleat receivers 136a-136d. Various forms of these three mechanisms may be used and combined to perform the same functions.

Figure 3D:
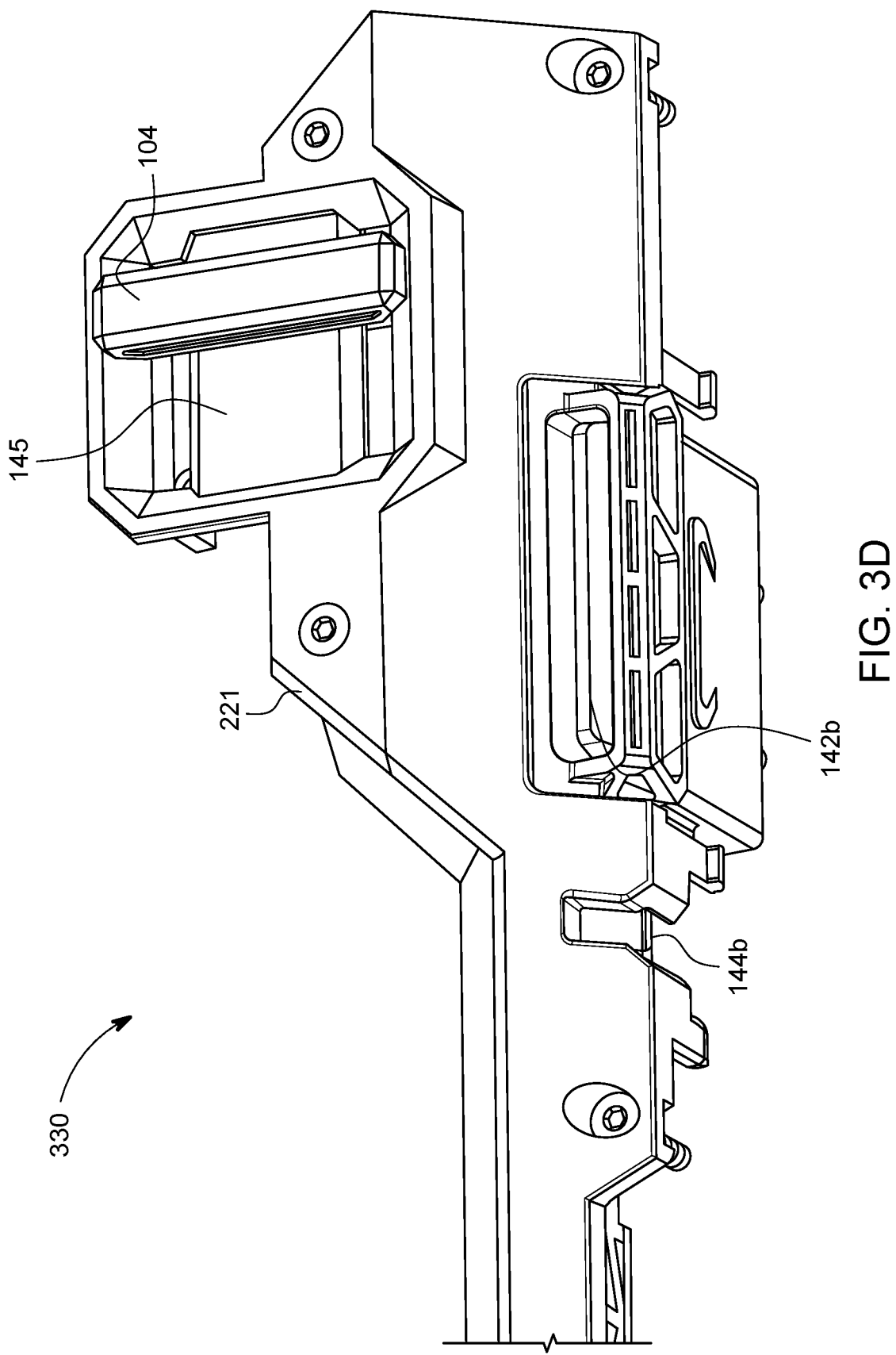
FIG. 3D shows an example view of the sliding lock lever of FIG. 1A.

FIG. 3D shows an example view of the sliding lock lever of FIG. 1A. In various embodiments, view 330 includes lock status indicator 104, lock mechanism assembly 221, detent slot 144b and front cleat assembly 142b, and indicator sliding path 145. This figure shows the front surface (away from interior of the box) of the lock mechanism assembly 221.

In various embodiments, lock status indicator 104 may be a lever that may take one of three positions or states, as described above with respect to FIG. 3A. In the first lock state, the unstacked unlocked state, the front cleats are retracted into front cleat assemblies 142a and 142b and are not engaged with the front cleat receivers 136a and 136b, respectively. In the second lock state, the stacked locked state, the cleats are extended from the front cleat assemblies 142a and 142b and engage the front cleat receivers 136a and 136b, respectively. In the third lock state, the stacked unlocked state, the front cleats are retracted into front cleat assemblies 142a and 142b and are not engaged with the front cleat receivers 136a and 136b, respectively.

FIG. 3E shows the example lock mechanism assembly of FIG. 3B in locked state. In various embodiments, the rear view 340 of the lock mechanism assembly 221 includes protrusion 135b of lower box, cleat assembly 142b, detent slot 144b, detent 225, slider 324, and slider handle 325. This figure shows lock mechanism assembly 221 in the stacked locked state.

In various embodiments, protrusion 135b is received in detent slot 144b and moves the detent 225 past detent stop 226 (see FIG. 2D) and puts the lock mechanism assembly 221 in the stacked locked state. The slider handle 325, coupled with the lock status indicator 104, is in the position that indicates stacked locked state. In this lock state, slider 324 is pulled by the slider spring 321 in a direction away from the indicator sliding path 145 (see FIG. 3D) and rests at one endpoint of indicator sliding path 145 closer to center of the box (middle point between two parallel sides). In this state, the front cleats extend out from the front cleats assembly 142a and 142b and enter into the front cleat receivers 136a and 136b, respectively, locking the upper and lower boxes together. From the stacked locked state, the lock mechanism assembly can enter into the stacked unlocked state by the user by pulling the lock status indicator 104 lever or bar towards the opposite end point of the indicator sliding path 145 from the end point in the present state.

In various embodiments, detent 225 is attached to slider 324 and moves back and forth with slider 324. Detent 225 may also move rotationally and has a radial spring, as further described below with respect to other figures. Detent 225 may rotate to clear some barriers within the housing.

Figure 3F:
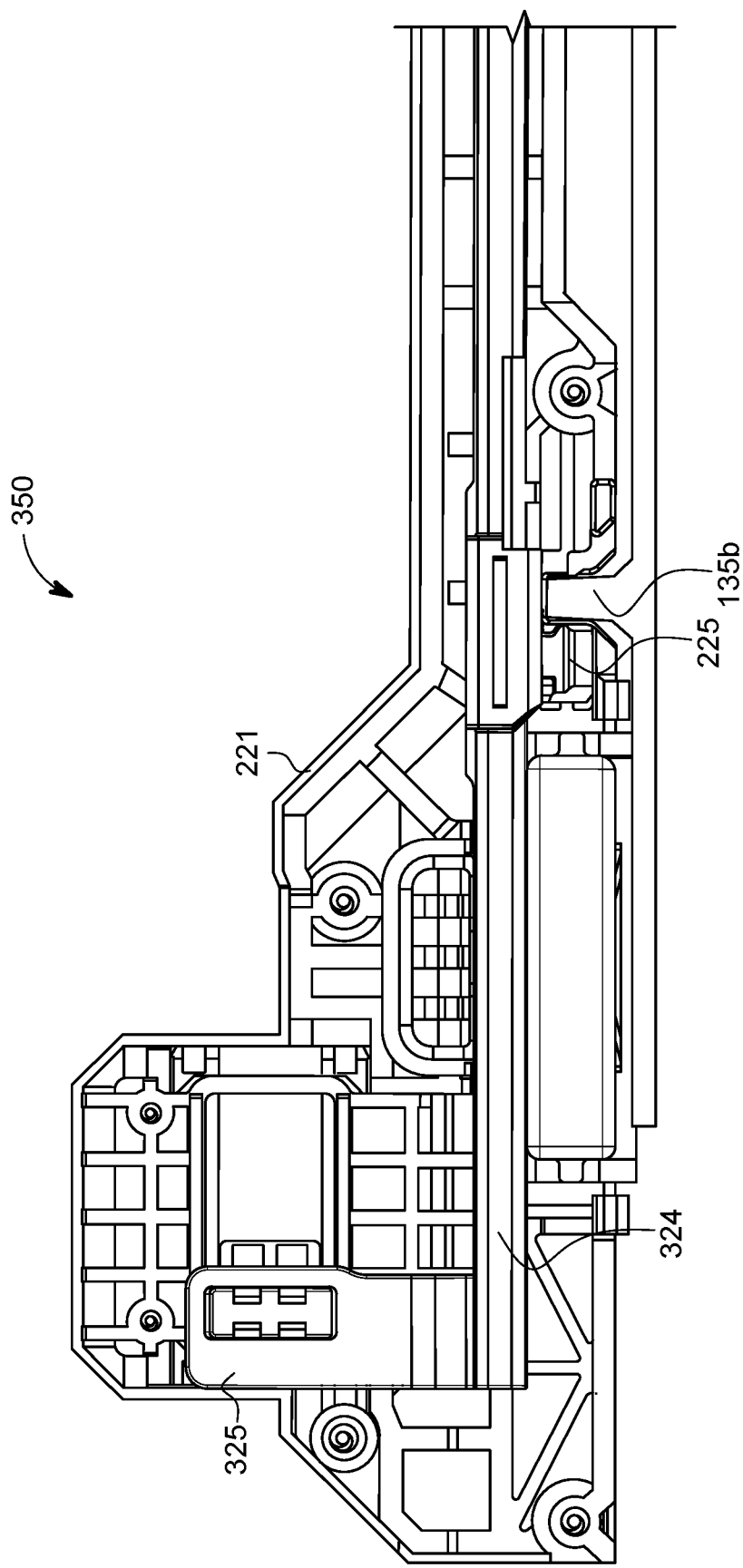
FIG. 3F shows the example lock mechanism assembly of FIG. 3B in an unlocked state.

FIG. 3F shows the example lock mechanism assembly of FIG. 3B in an unlocked state. In various embodiments, the rear view 350 of the lock mechanism assembly 221 includes protrusion 135b of lower box, detent 225, slider 324, and slider handle 325. This figure shows lock mechanism assembly 221 in the stacked unlocked state.

In various embodiments, in this configuration, the user has pulled the lock status indicator 104 towards the other end of the indicator sliding path 145 to place it in the stacked unlocked state. In this state, the front cleats are retracted back into the front cleat assembly 142a and 142b and disengage from the front cleat receivers 136a and 136b, respectively. In this state, detent 225 is moved to the other side of the protrusion 135b as shown in this figure and in comparison with FIG. 3E. When the user moves slider 324, using lock status indicator 104, detent 225 also moves in the same direction. At this point, the upper box is unlocked from the lower box and may be removed from the stack of boxes.

In various embodiments, in this state, the user cannot transition to stacked locked state by using the lock status indicator 104 lever because detent 225 is not in contact with protrusion 135b and cannot be pushed out of the way to allow slider 324 to be pulled by slider spring 321 into stacked locked state. The upper box has to be removed from and repositioned on top of the lower box to allow detent 225 to revert to its unstacked position and protrusion 135b to push it over detent stop 226 again, entering stacked locked state.

Figure 4A:
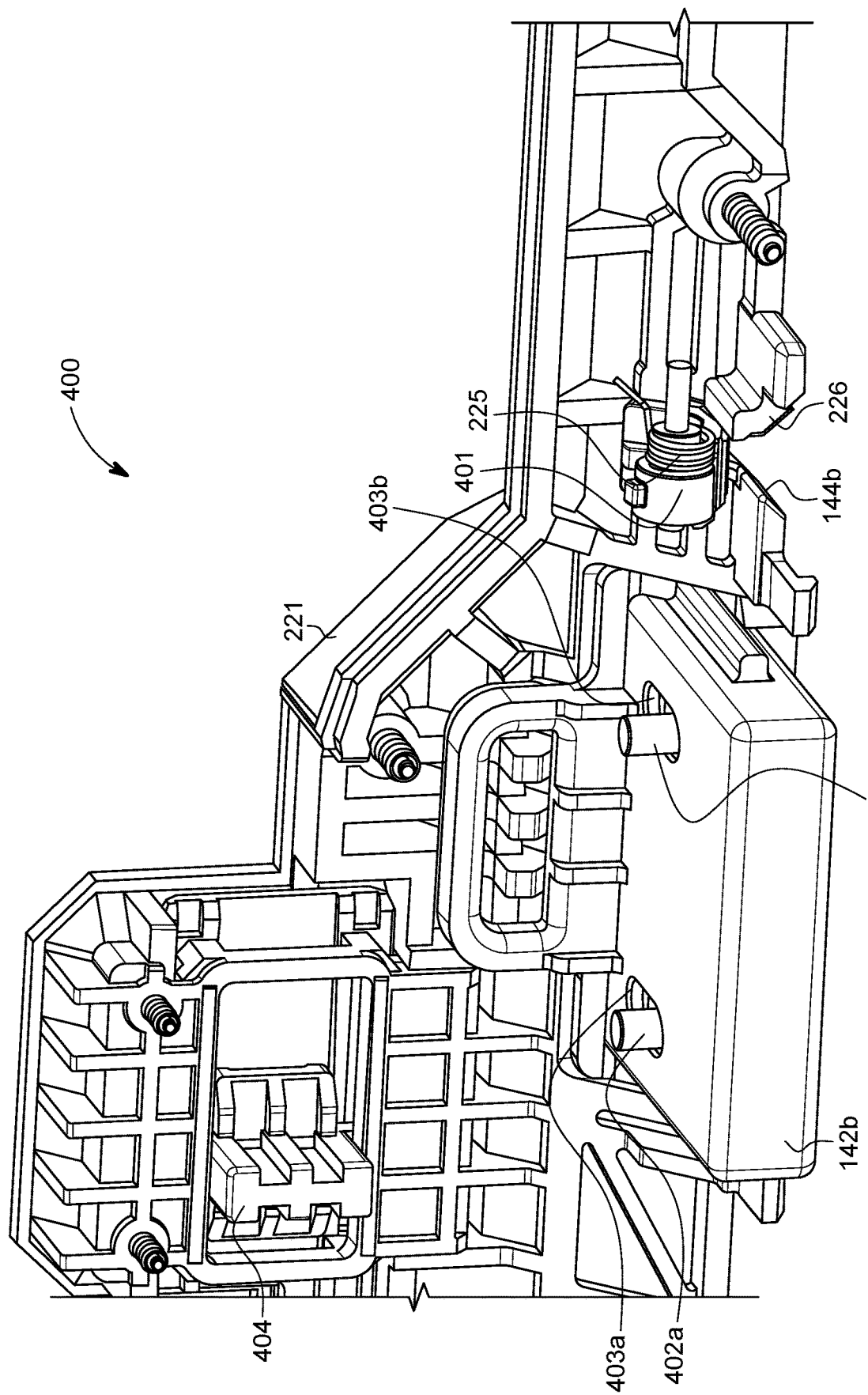
FIG. 4A shows an example closeup view of the back side of the lock mechanism assembly in unlocked state and with slider removed.

In various embodiments, state transitions allowed are as follows:
1. Unstacked unlocked state→stacked locked state
2. Stacked locked state→stacked unlocked state
3. Stacked unlocked state→unstacked unlocked state FIG. 4A shows an example closeup view of the back side of the lock mechanism assembly in unlocked state and with slider removed. The closeup view 400 incudes lock mechanism assembly 221, cleat assembly 142b, detent slot 144b, detent 225, detent stop 226, detent spring 401 (torsional spring), first cleat pin 402a, second cleat pin 402b, first pin slot 403a, second pin slot 403b, and slider coupler 404. This figure shows the lock mechanism assembly 221 in the unstacked unlocked state.

In various embodiments, slider coupler 404 couples slider 324 to lock status indicator 104 lever. When the user moves the lock status indicator 104, the slider also moves in the same direction. When the upper and lower boxes are stacked, the user may lock or unlock the stacked boxes to each other by moving the lock status indicator 104.

In various embodiments, first cleat pin 402a and second cleat pin 403a move back and forth within the first pin slot 403a and second pin slot 403b, respectively, to extend and retract the front cleats from the front cleat assembly 142b. The same actions happen simultaneously on the cleat assembly 142a (not shown in this figure). The front cleats are shown in retracted state, at a first end of pin slots 403a and 403b, unlocking the stacked boxes. The cleat pins engage with grooves deployed on the underside of slider 324, as further described below with respect to other figures. As the slider 324 moves, the cleat pins (402a and 402b) engaged with the slider 324 are moved in a direction perpendicular to the movement of slider 324, in turn moving the front cleats in the same direction as the cleat pins. These movements of the front cleats function to extend or retract the front cleats from the cleat assemblies 142a and 142b.

FIG. 4B shows an example closeup view of the back side of the lock mechanism assembly in locked state and with slider removed. The closeup view 410 incudes lock mechanism assembly 221, protrusion 135b, cleat assembly 142b, detent 225, detent stop 226, first cleat pin 402a, first pin slot 403a, and slider coupler 404. This figure shows the lock mechanism assembly 221 in the stacked locked state.

In various embodiments, first cleat pin 402a and second cleat pin 403a move back and forth within the first pin slot 403a and second pin slot 403b, respectively, to extend and retract the front cleats from the front cleat assembly 142b. The same actions happen simultaneously on the cleat assembly 142a (not shown in this figure). The front cleats are shown in extended state, at a second end of pin slots 403a and 403b, locking the stacked boxes. The cleat pins engage with grooves deployed on the underside of slider 324, as further described below with respect to other figures. As the slider 324 moves, the cleat pins (402a and 402b) engaged with the slider 324 are moved in a direction perpendicular to the movement of slider 324, in turn moving the front cleats in the same direction as the cleat pins. These movements of the front cleats function to extend or retract the front cleats from the cleat assemblies 142a and 142b.

Figure 4C:
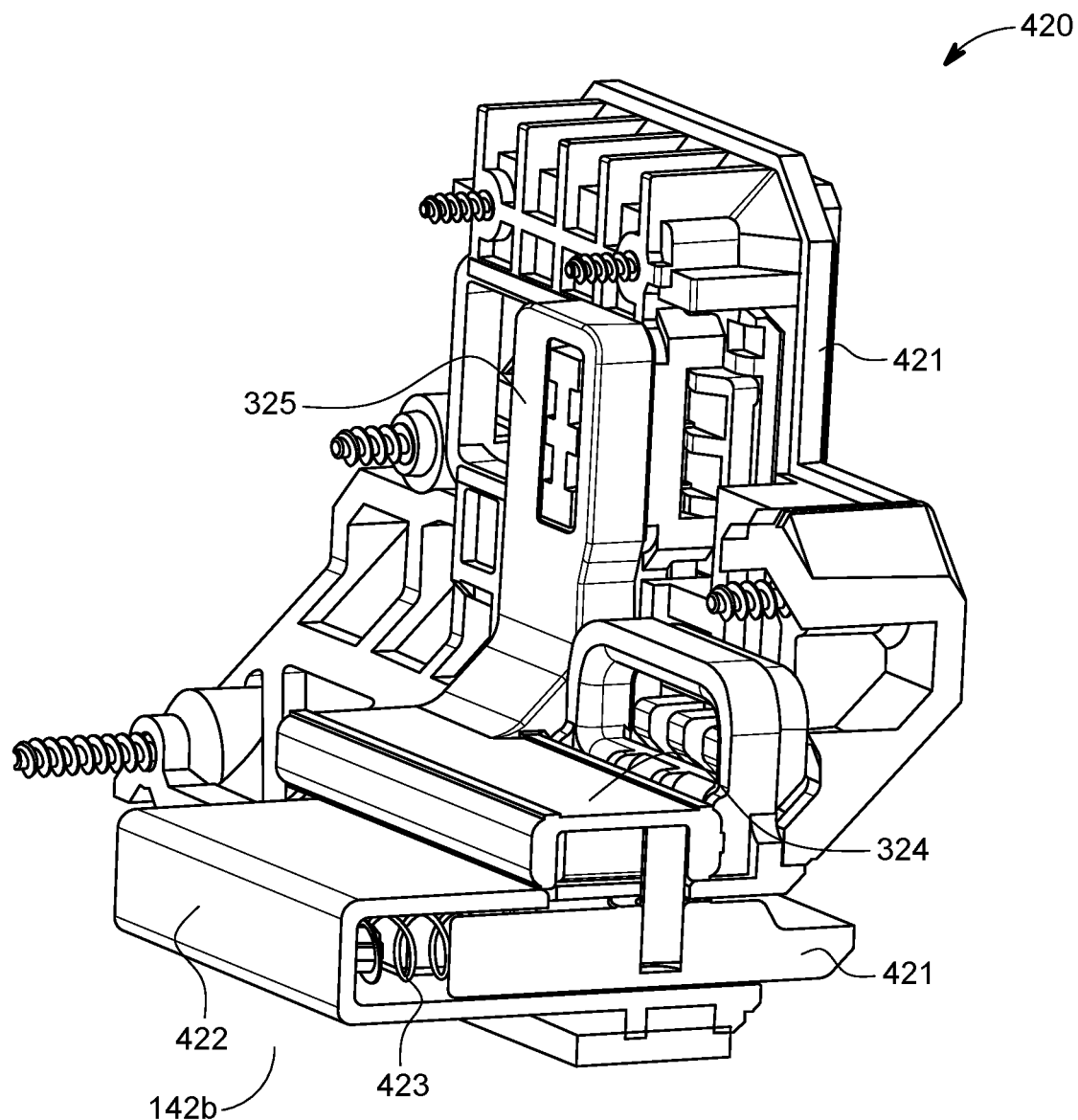
FIG. 4C shows an example closeup view of the cleat assembly.

FIG. 4C shows an example closeup view of the cleat assembly. In various embodiments, closeup view 420 includes lock mechanism assembly 221, slider handle 325, front cleat assembly 142b having a cleat shroud or case 422, cleat springs 423, slider 324, and front cleat 421 enclosed within cleat case 422. This figure shows a cross-section of cleat assembly 142b within lock mechanism assembly 221 in a stacked locked state.

In various embodiments, front cleat assembly 142b has a cleat case 422 to protect front cleat 421 from external forces, such as heavy boxes, impact of boxes dropped on top of other boxes in the stack, rough handling, and the like. The cleat pins 402a and 402b and corresponding pin slots 403a and 403b, respectively, are hidden below slider 324 and are not shown in this figure. Cleat springs 423 push front cleat 421 to extend out of front cleat assembly 142b and lock the stacked boxes together. Cleat case 422 is fixed with respect to slider 324 and lock mechanism assembly 221, while front cleat 421 may move in and out of cleat case 422 in a direction perpendicular to the motion of slider 324. Cleat pins 402a and 402b allow the movement of front cleat 421 within cleat case 422 in the above-mentioned perpendicular direction, while cleat case 422 itself remains motionless. The cleat operations are further described below with respect to other figures.

Figure 4D:
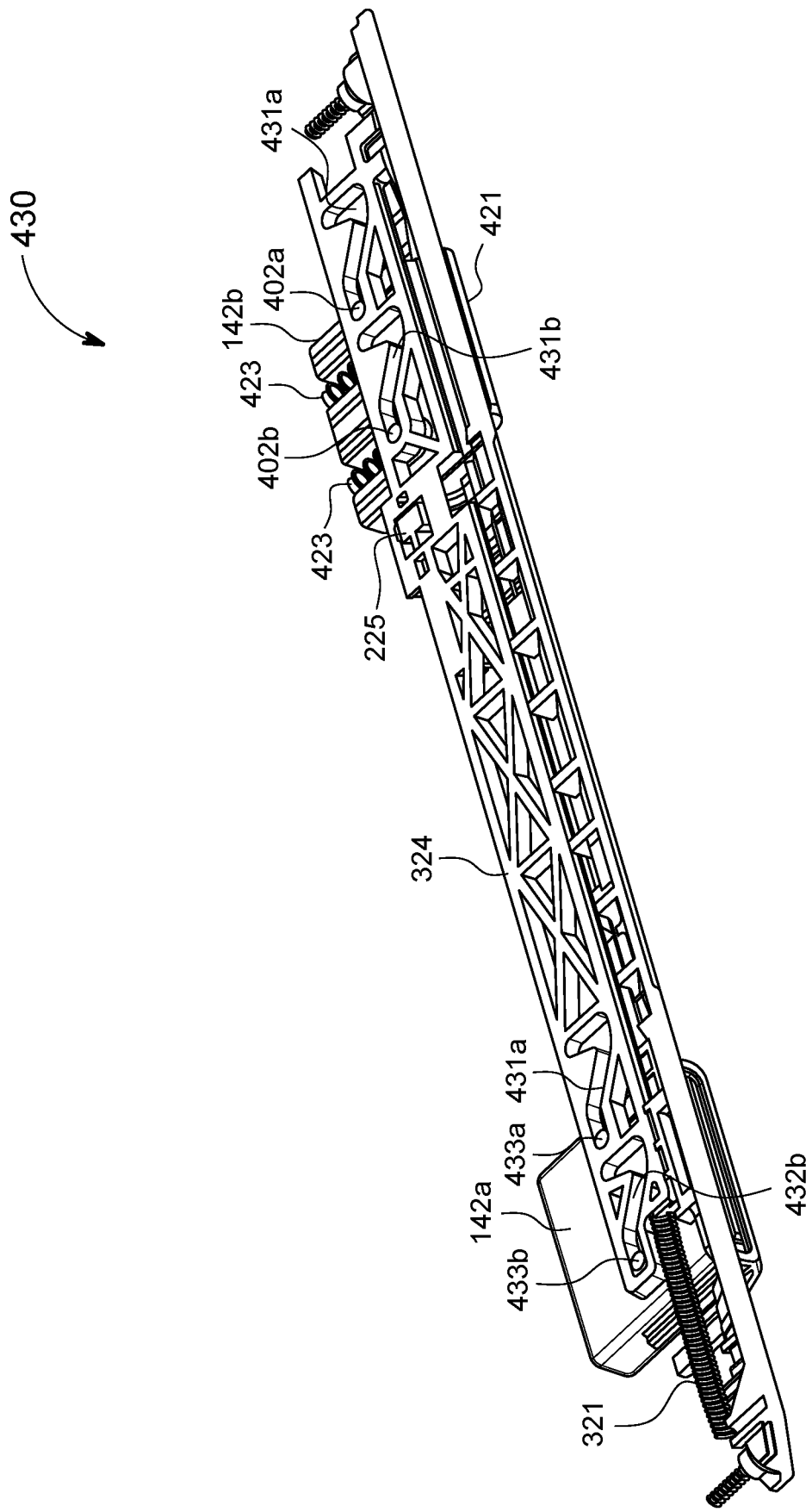
FIG. 4D shows an example underside of the slider and cleat assemblies in unlocked position with lower and upper boxes touching (stacked)

FIG. 4D shows an example underside of the slider and cleat assemblies in unlocked position with lower and upper boxes touching (stacked). In various embodiments, the slider underside view 430 includes slider 324, front cleat assemblies 142a and 142b, slider spring 321, cleat pins 402a and 402b, front cleat 421, cleat springs 423, detent 225, slider rails or groove 431a enclosing cleat pin 402a, slider groove 431b enclosing cleat pin 402b, slider groove 432a enclosing cleat pin 433a, and slider groove 432b enclosing cleat pin 433b. In this figure, lock mechanism assembly 221 (see FIG. 3C) is in stacked unlocked state.

In various embodiments, lateral movement (parallel to a front side of a box) of slider 324 causes perpendicular movement of front cleats 421. The movement of the front cleats 421 as a result of lateral movement of slider 324 is caused by wedge or cam action of slider grooves 431a, 431b, 432a, and 432b on cleat pins 402a, 402b, 433a, and 433b, respectively. When slider 324 moves to the left in this figure, for example, when pulled by slider spring 321, each cleat pin traverses its respective groove from left to right with respect to the groove. As each pin travels through its groove and follows its path, the pin moves up the sloped segment (which has a motion component perpendicular to the direction of movement of slider 324) of its groove and pulls its front cleat 421 along with it in the direction perpendicular to the motion of slider 324.

In various embodiments, the location of each cleat pin along its respective slider groove determines the lock state of the lock mechanism assembly 221. When the pin is in the left-most position in this figure (nearest to slider spring 321) the front cleats (for example, front cleat 421) are retracted into their respective front cleat assemblies 142a and 142b. This configuration defines and/or is associated with the staked unlocked state. Other positions of the cleat pins define other lock states, as described below.

In various embodiments, detent 225 is coupled with slider 324 and moves with slider 324 when slider 324 makes a lateral movement.

Figure 4E:
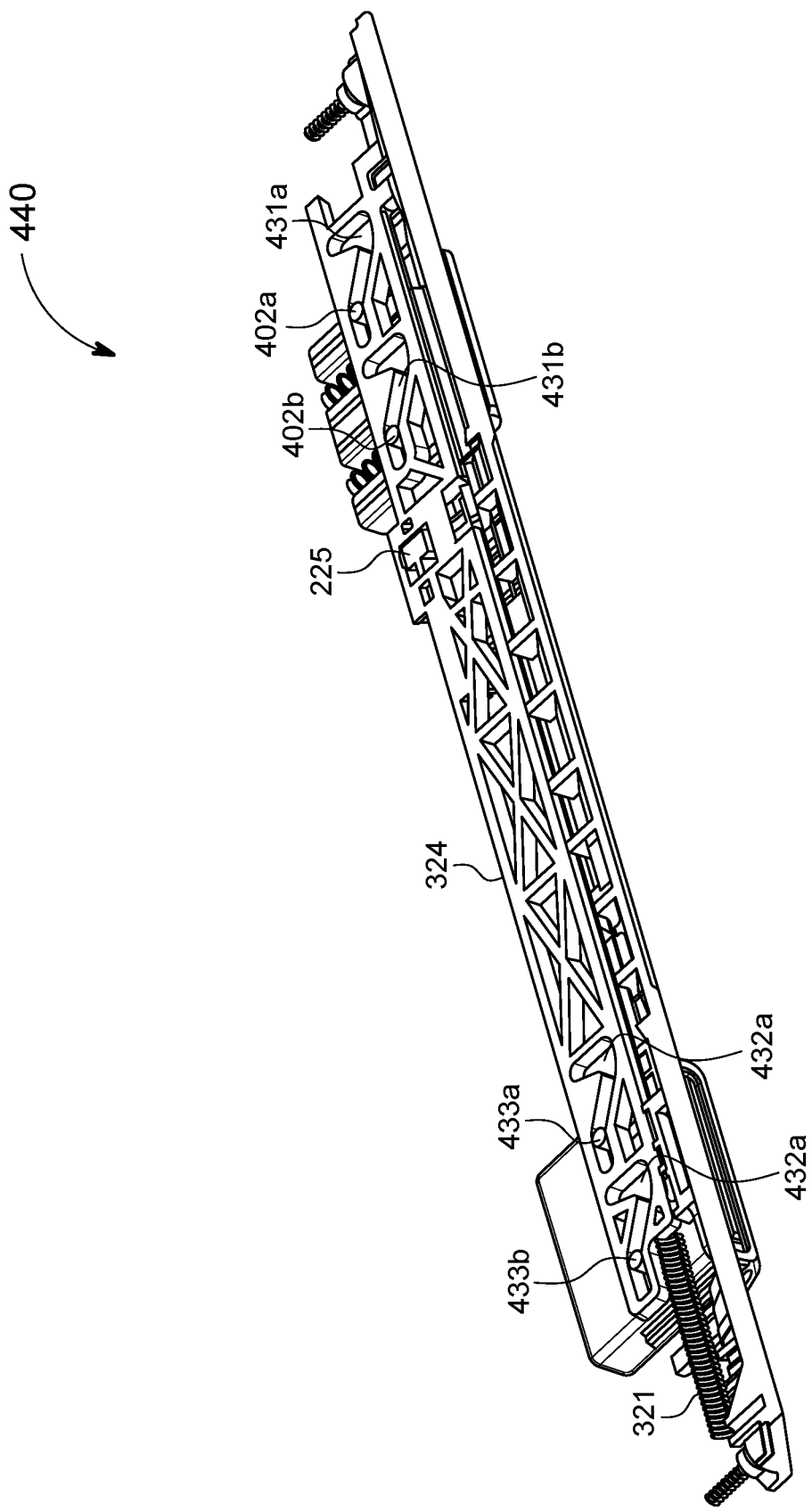
FIG. 4E shows an example underside of the slider and cleat assemblies in unlocked position with lower and upper boxes not touching (unstacked)

FIG. 4E shows an example underside of the slider and cleat assemblies in unlocked position with lower and upper boxes not touching (unstacked). In various embodiments, the slider underside view 440 includes slider 324, slider spring 321, cleat pins 402a and 402b, front cleat 421, cleat springs 423, detent 225, slider rails or groove 431a enclosing cleat pin 402a, slider groove 431b enclosing cleat pin 402b, slider groove 432a enclosing cleat pin 433a, and slider groove 432b enclosing cleat pin 433b. In this figure, lock mechanism assembly 221 (see FIG. 3C) is in unstacked unlocked state.

In various embodiments, When the pin is in the intermediate position in this figure (at the bent or angle between the small straight segment and the sloped segment) the front cleats (for example, front cleat 421) are retracted into their respective front cleat assemblies 142a and 142b. This configuration defines and/or is associated with the unstacked unlocked state.

Figure 4F:
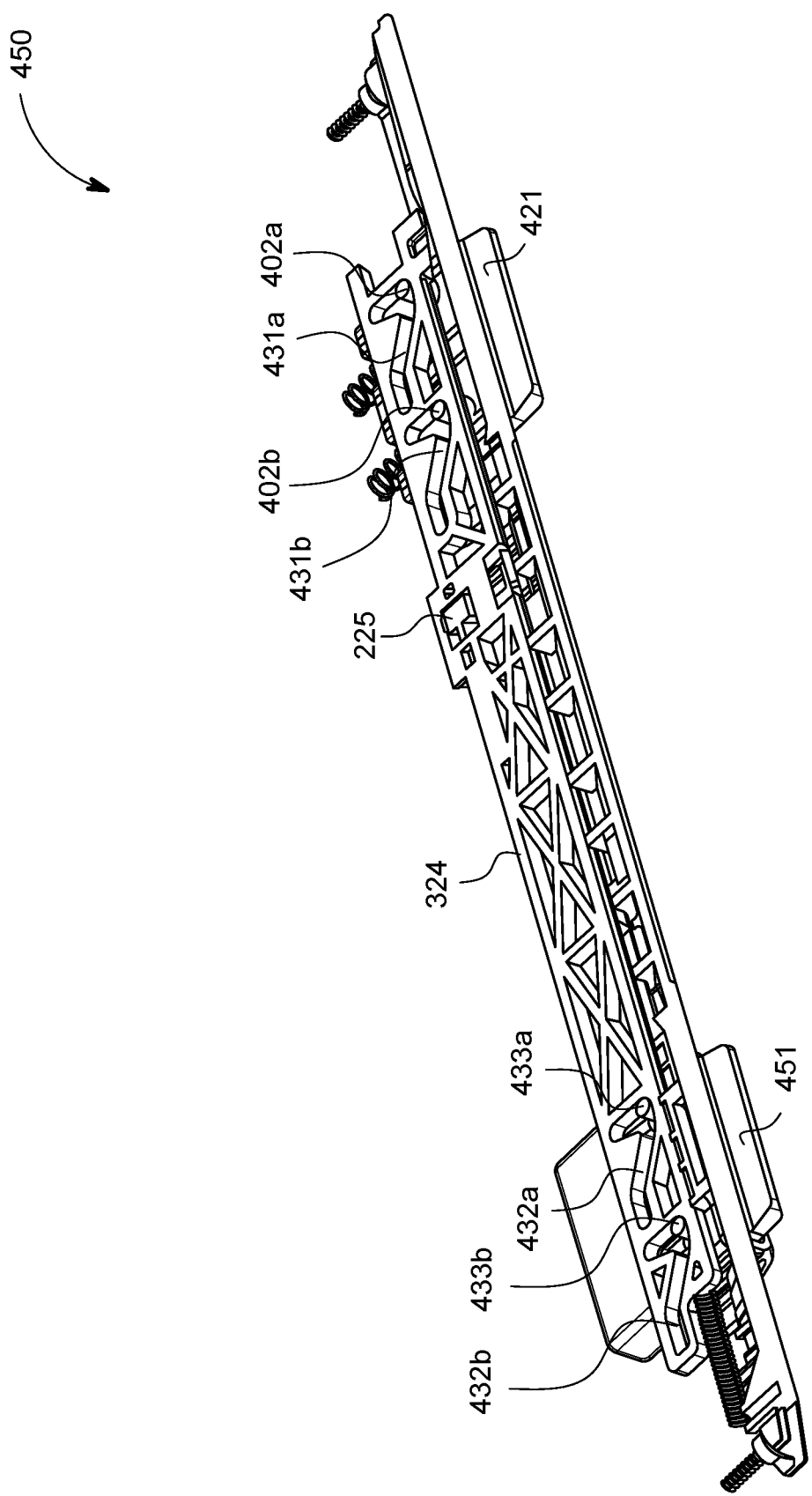
FIG. 4F shows an example underside of the slider and cleat assemblies in locked position with lower and upper boxes touching (stacked)

FIG. 4F shows an example underside of the slider and cleat assemblies in locked position with lower and upper boxes touching (stacked). In various embodiments, the slider underside view 450 includes slider 324, slider spring 321, cleat pins 402a and 402b, front cleats 421 and 451, cleat springs 423, detent 225, slider rails or groove 431a enclosing cleat pin 402a, slider groove 431b enclosing cleat pin 402b, slider groove 432a enclosing cleat pin 433a, and slider groove 432b enclosing cleat pin 433b. In this figure, lock mechanism assembly 221 (see FIG. 3C) is in stacked locked state.

In various embodiments, When the pin is in the top position in this figure (at the top end of the slopped segment farthest away from slider spring 321) the front cleats (for example, front cleat 421) are extended out from their respective front cleat assemblies 142a and 142b. This configuration defines and/or is associated with the stacked locked state.

Figure 5A:
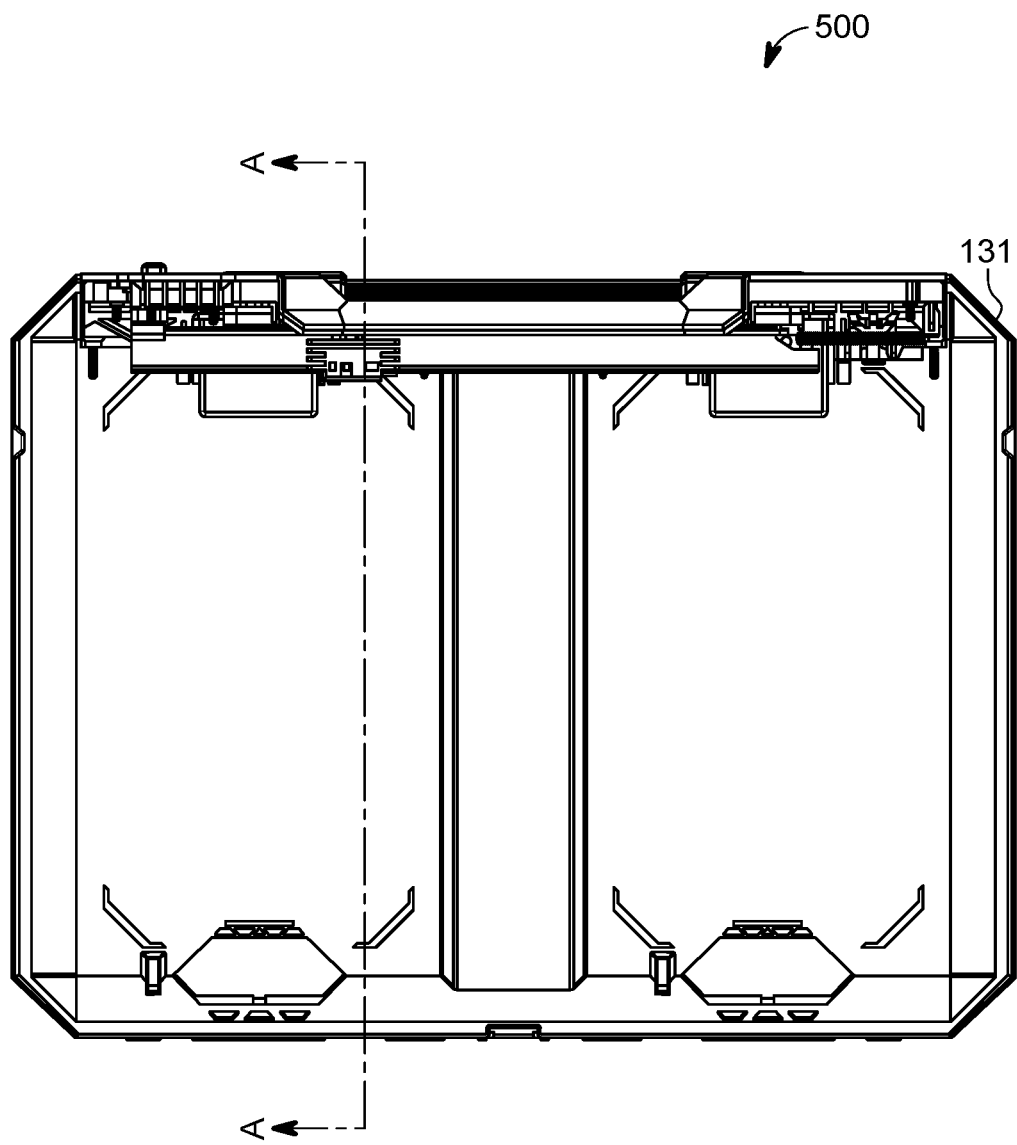
FIG. 5A shows an example arrangement of lower box and upper lock mechanism assembly.

FIG. 5A shows an example arrangement of lower box and upper lock mechanism assembly. In various embodiments, arrangement 500 is a top view of lock mechanism assembly 221 of an upper box 131 resting on a lower box lid. Cross-section A-A is described below with respect to FIG. 5B.

Figure 5B:
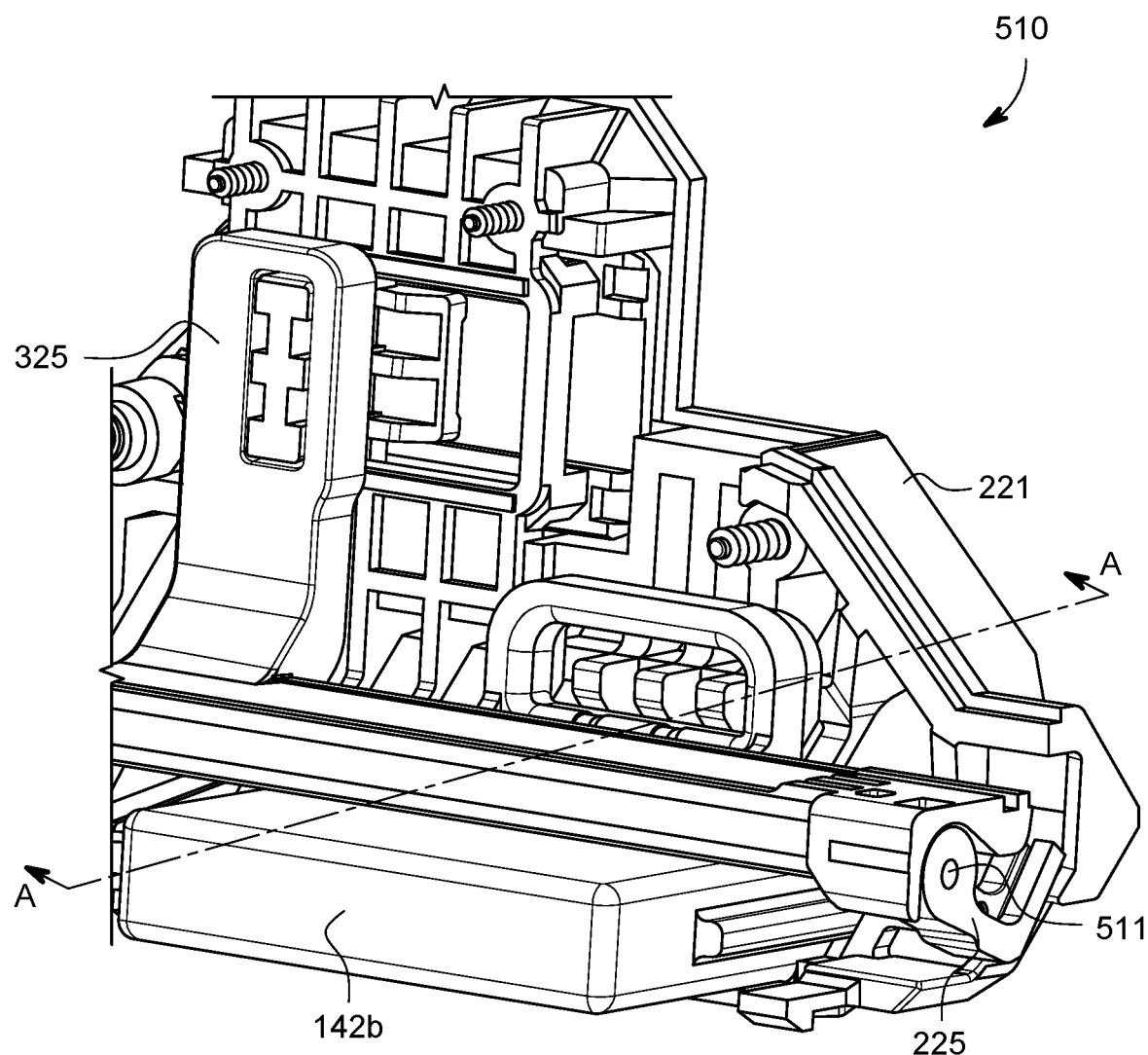
FIG. 5B shows an example cross-section of the lock mechanism assembly and a first detent actuation mechanism.
Figure 5B:
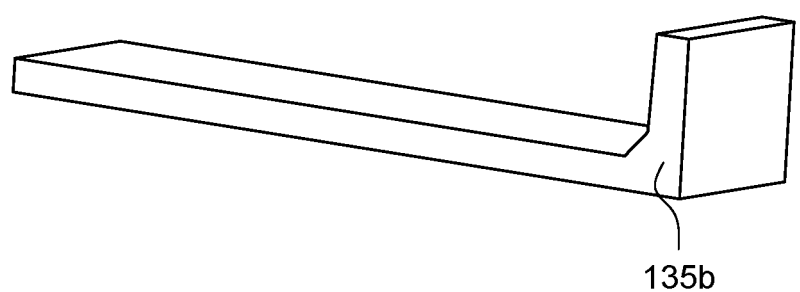

FIG. 5B shows an example cross-section of the lock mechanism assembly and a first detent actuation mechanism. In various embodiments, cross-section A-A view 510 includes lock mechanism assembly 221 of an upper box, protrusion 135b of lower box, cleat assembly 142b, detent 225, slider handle 325, and detent axle 511. In this figure, lock mechanism assembly 221 is shown in unstacked unlocked state.

In various embodiments, detent 225 is rotationally coupled with slider 324 (see FIG. 3C). While detent 225 follows the lateral movement (parallel to front side of upper box) of slider 324, detent 225 can also rotate around detent axle 511 in a plane normal (perpendicular) to longitudinal axis (parallel to front side of the upper box) of slider 324. When protrusion 135b on the lid of the lower box is received in the detent slot 144b (see FIG. 3C), protrusion 135b pushes against detent 225 arm and rotates it counterclockwise (CCW) about detent axle 511 to clear and pass over detent stop 226 (not visible in this view; see FIG. 2C), which is stopping detent 225 and slider 324 from moving in the direction of slider spring 321 force (see FIG. 3C). Once the detent stop 226 is cleared, the slider spring 321 pulls slider 324 towards center of the upper box to place the lock mechanism assembly in the stacked locked state. Detent spring 401 (see FIG. 4A) functions to rotate and return detent 225 back to its original position prior to insertion of protrusion 135b, when transitioning to unlocked states.

It is to be noted that FIGS. 6A-7H are related to the lock mechanism assembly with rotational lock status indicator 152 of FIG. 1F. However, with some design modifications these mechanisms may also be employed by lock mechanism assembly 221 with sliding lock status indicator 104 of FIG. 1E.

Figure 6A:
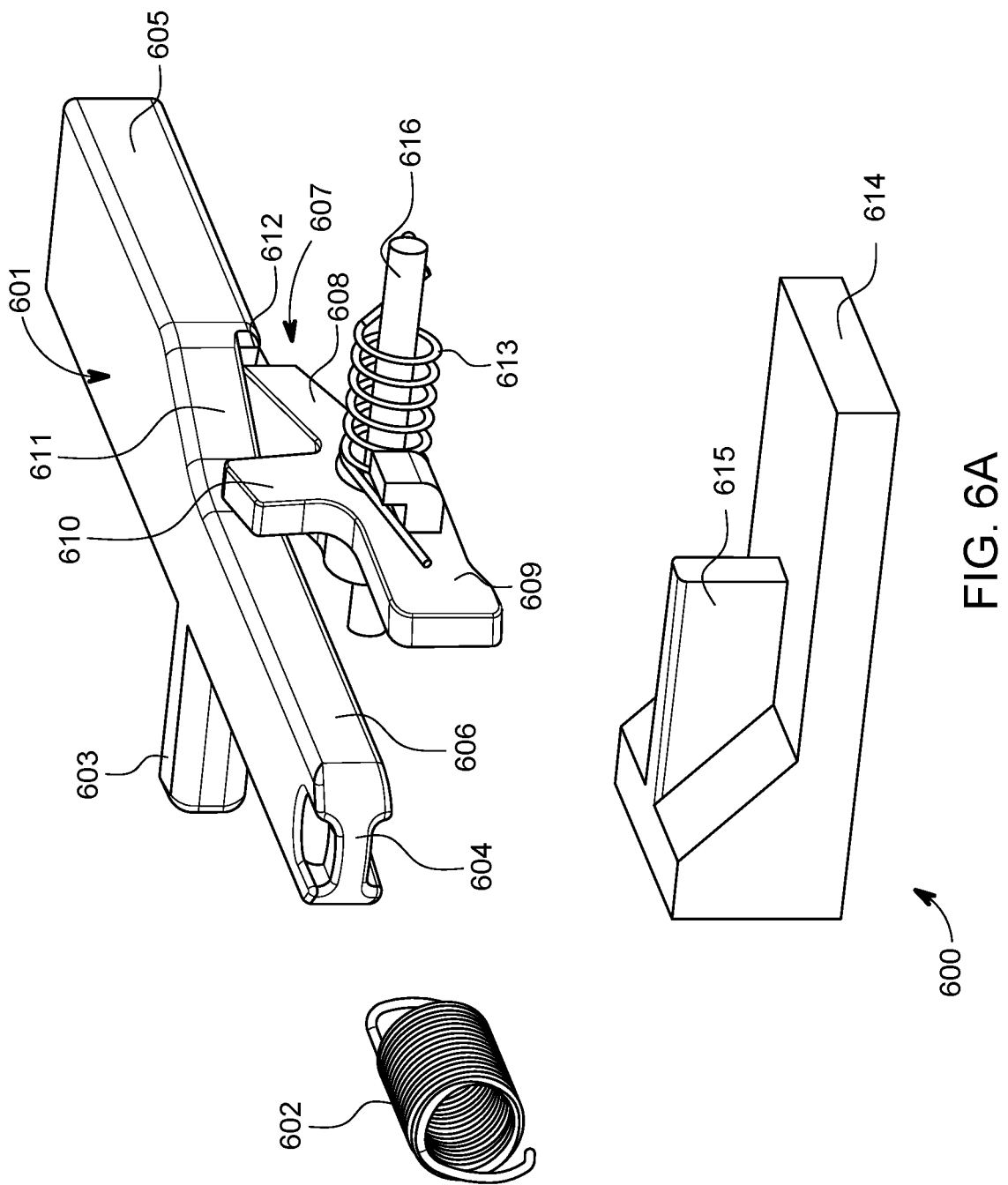
FIG. 6A shows an example second detent actuation mechanism with one part in a first functional state useable with the storage boxes of FIGS. 1A-1F.

FIG. 6A shows an example second detent actuation mechanism with one part in a first functional state useable with the storage boxes of FIGS. 1A-1F. In various embodiments, the one-part detent mechanism 600 includes a slider 601 having a rear end 605, an angled transition surface 611 to a narrower front end 606, a slider catch or hook 603, a lower recessed surface 612, a slider return spring 602, and spring receptacle 604. The one-part detent mechanism 600 further includes a detent 607 having a rear end 608, a front end 609, a spring rod 616 embedded within a compression-torsional spring 613, and a top end 610. The one-part detent mechanism 600 further includes a detent protrusion 615 attached to a lower storage box lid 614.

In various embodiments, the one-part detent mechanism 600 has a single part, the slider 601, other than the detent 607. The slider 601 has several control surfaces that serve to move the detent 607 and slider 601 in various directions, both in translational motion and rotational motion. The directions or orientations, such as up or down, are defined with respect to natural gravity in normal operation of the stacking toolboxes. These directions may also be defined with respect to the direction leading from a lid of a storage box towards the bottom surface of the storage box having latches embedded therein to engage the lid of another storage box.

In various embodiments, the control surfaces include the angled transition surface 611, the lower recessed surface 612, and the lower surface of detent front end 609. Additional control components that control the motions of various components of the one-part detent mechanism 600 include slider return spring 602 and the compression-torsional spring 613. These control mechanisms are further described below individually. These control surfaces and components work in a coordinated fashion, some of which may operate simultaneously. The overall operation of the one-part detent mechanism 600 is also described below.

In various embodiments, the transition surface 611 is located between the wider rear end 605 and the narrower front end 606. The transition is between the wide section and the narrow section. As the slider 601 moves forward towards the slider return spring 602 (pulled by this spring), the angled transition surface 611 pushes detent 607 away from the slider 601 (to the right as shown in FIG. 6A), compressing the compression-torsional spring 613 in the process.

In various embodiments, the lower recessed surface 612 limits the rotational motion of the detent 607 about the spring rod 616 in a counterclockwise (CCW) direction under the force of the compression-torsional spring 613 acting on the detent 607.

In various embodiments, the lower surface of the detent front end 609 is pushed up by the detent protrusion 615 when upper and lower storage boxes are stacked on top of each other causing the detent 607 to rotate clockwise (CW) sufficiently to clear an edge of the lower recessed surface 612 and slip under the rear end 605 as the slider 601 moves forward.

In various embodiments, the slider return spring 602 works in tension to pull the slider 601 forward (towards itself). The slider catch 603 and the angled transition surface 611 move in the same direction as the slider 601 and perform their respective functions. The slider catch 603 engages and actuates the locking mechanism.

In various embodiments, the compression-torsional spring 613 performs two distinct functions that may occur independently or simultaneously. the compression-torsional spring 613 may be linearly compressed if the detent 607 is pushed away from the slider 601 by the angled transition surface 611 along the spring rod 616. The compression-torsional spring 613 may be also be rotationally compressed if the detent 607 rotates in CW direction. When the detent 607 is free to rotate, the compression-torsional spring 613 forces it to rotate CCW.

In various embodiments, in operation, the one-part detent mechanism 600 works as follows. As noted elsewhere herein, the one-part detent mechanism 600 is a linkage between the detent protrusion 615 of lower storage box lid 614 and the latches on the upper storage box with the detent mechanism embedded in the bottom surface of the upper storage box. This linkage is used to automatically lock the upper and lower storage boxes together upon placing the upper storage box on the lower one (see FIG. 1A). With continued reference to FIG. 6A and the orientation of components as shown, when the upper storage box is stacked on the lower box, the detent protrusion 615 pushes up the front end 609 of detent 607 under the weight of the upper storage box. As a result, the detent 607 rotates CW and clears the lower recessed surface 607, allowing the slider 601 to move above rear end 608 of the detent 607 and slide forward (towards its front end 606). As the detent 607 rotates CW, the compression-torsional spring 613 is rotationally compressed CW also. As the slider 601 slides forward, the angled transition surface 611 pushes the top end 610 away from the slider 601 and linearly compresses the compression-torsional spring 613. At the same time, the slider catch 603 also slides forward as part of the slider 601 and pushes a lock or latch (not shown in this figure) into a locked position. The locking operation is described below with respect to FIGS. 6B-6E. At this point the compression-torsional spring 613 is compressed both linearly and rotationally. As the detent is pushed away from the slider 601, the front end 609 slides off the detent protrusion 615 causing the detent 607 to rotate CCW under the torsional force of the compression-torsional spring 613. When the front end 609 slides off the detent protrusion 615, the detent protrusion 615 blocks the detent 607 from being pushed back by the compression-torsional spring 613 towards the slider 601.

Figure 6B:
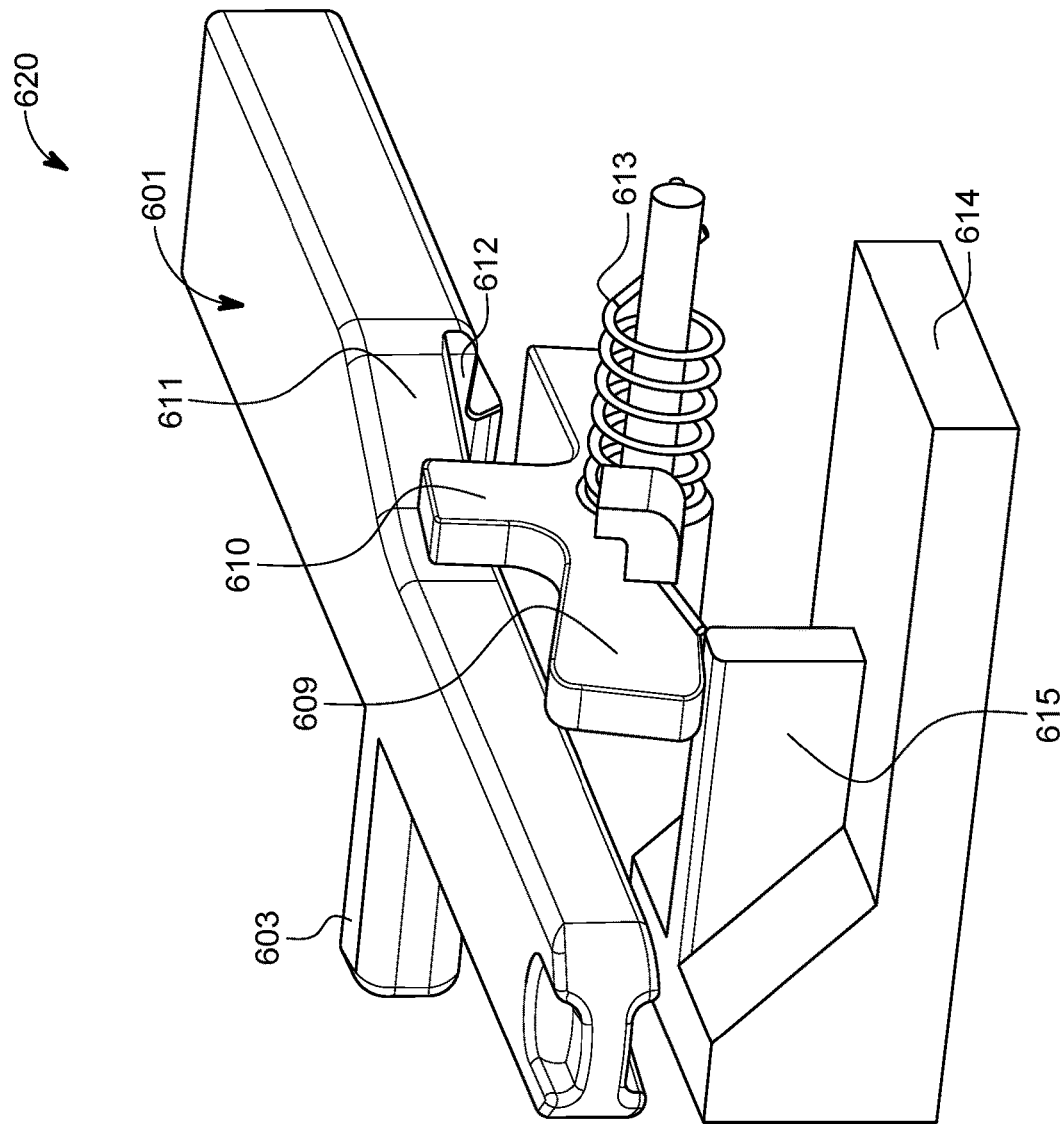
FIG. 6B shows the example detent actuation mechanism of FIG. 6A in a second functional state.
Figure 6B:
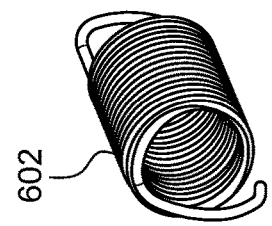

At this point, a user may unlock the latches holding the upper storage box to the lower one. The unlocking of the latch allows the slider 601 to slide backwards. When the slider goes sufficiently backwards, the rear end 608 of detent 607 clears the lower surface of the rear end 605, rotates CCW, and comes to rest on the lower recessed surface 612, preventing the slider 601 from sliding forward again. At this point, the upper toolbox may be lifted up and away from the lower one by the user, removing the contact between the detent protrusion 615 from the front end 609 of the detent 607, allowing the detent 607 to be pushed back towards the slider 601 by the compression-torsional spring 613. At this point, the detent and locking mechanisms FIG. 6B shows the example detent actuation mechanism of FIG. 6A in a second functional state. In various embodiments, the detent mechanism described with respect to FIG. 6A includes the same components in a different state when the detent protrusion 615 touches the front end 609 of the detent 607. The components include the slider 601 with angled transition surface 611, lower recessed surface 612, sider catch 603, lower storage box lid 614, detent protrusion 615, compression-torsional spring 613, front end 609 of the detent 607, top end 610 of the detent 607, and slider return spring 602.

The operation is as described above with respect to FIG. 6A.

Figure 6C:
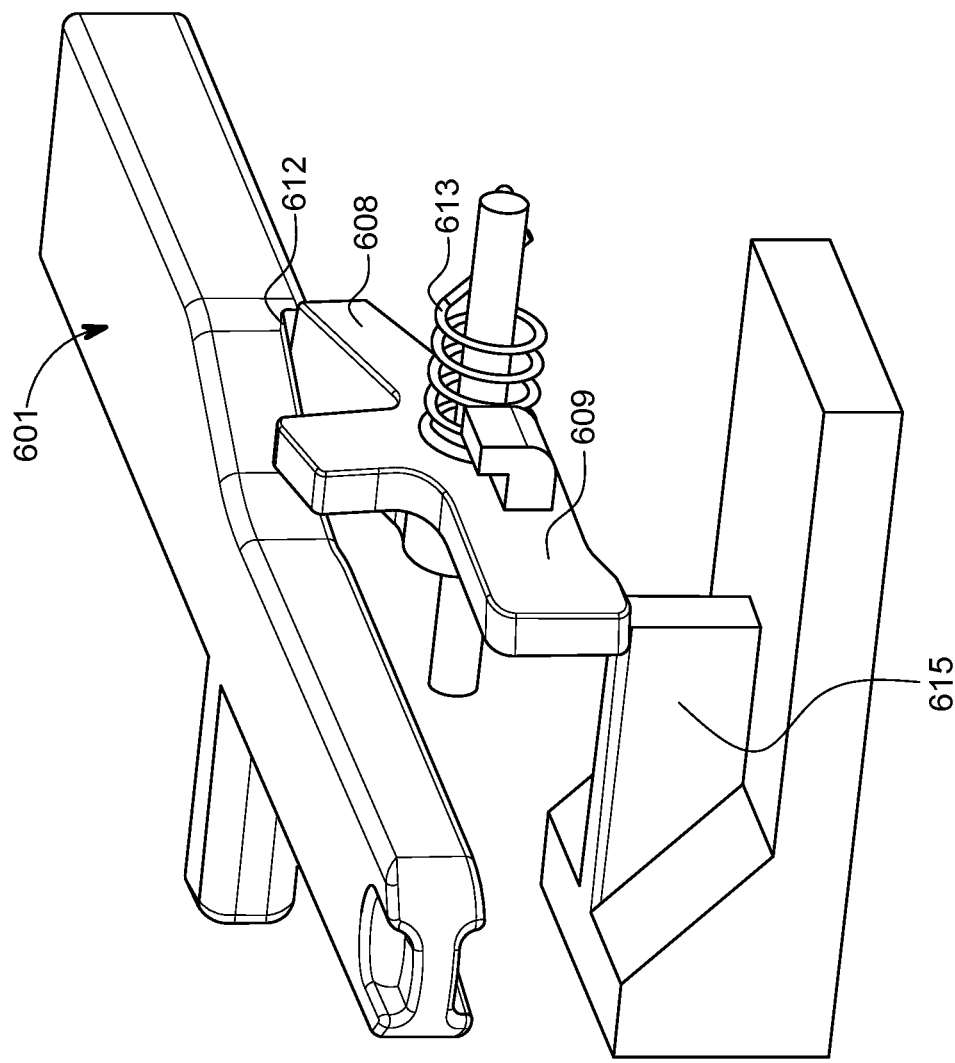
FIG. 6C shows the example detent actuation mechanism of FIG. 6A in a third functional state.
Figure 6C:
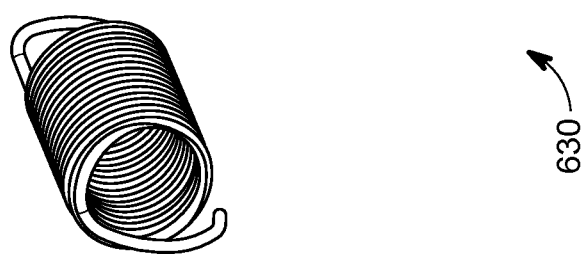

FIG. 6C shows the example detent actuation mechanism of FIG. 6A in a third functional state. The components are the same as shown in FIG. 6A. These components include the slider 601, the lower recessed surface 612, the rear end 608 of the detent 607, the front end 609 of the detent 607, the compression-torsional spring 613, and the detent protrusion 615.

FIG. 6C shows the one-part detent mechanism 600 in a state that the upper and lower storage boxes are initially stacked but not locked together yet. This figure illustrates one state encountered in the operations described with respect to FIG. 6A.

Figure 6D:
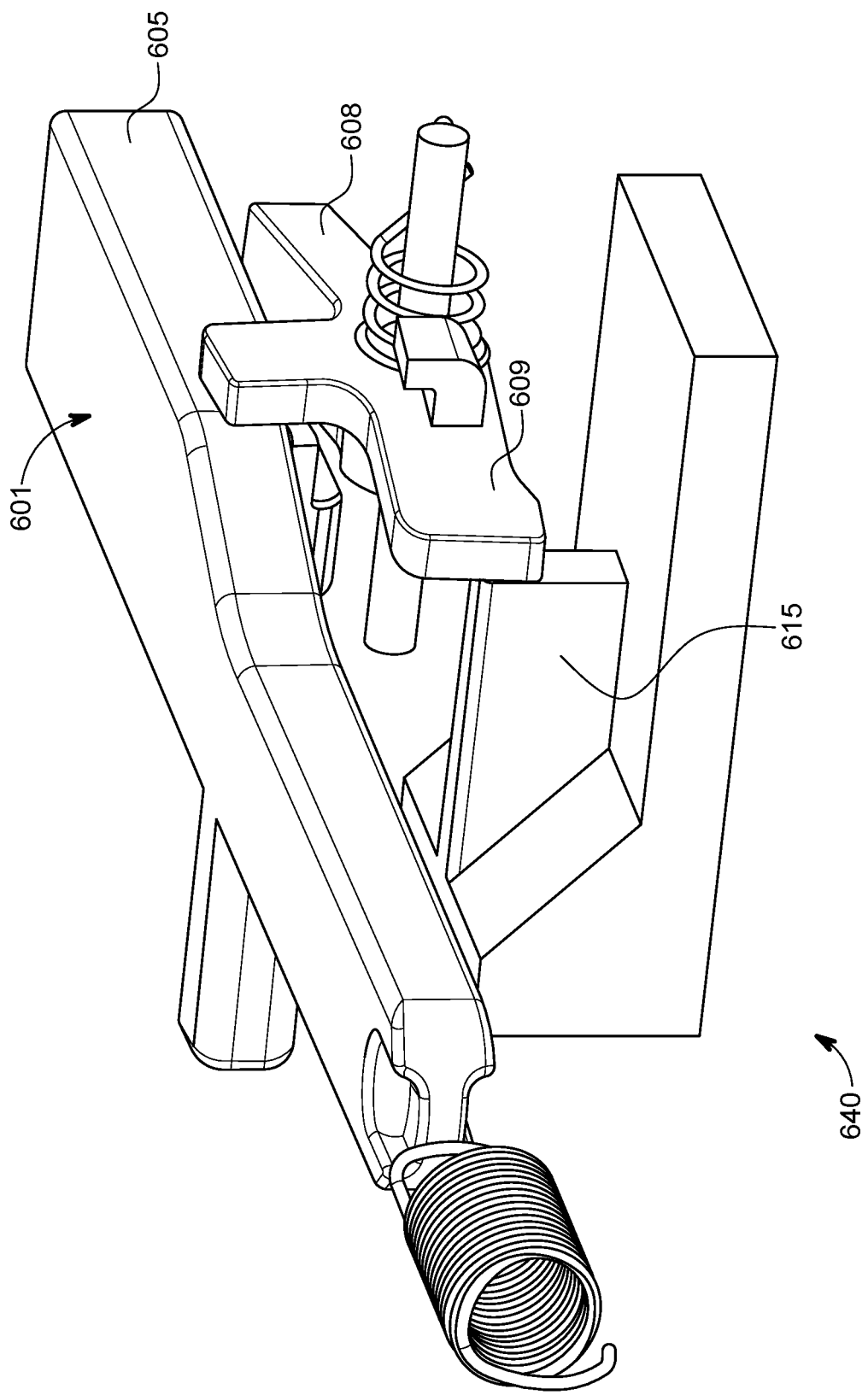
FIG. 6D shows the example detent actuation mechanism of FIG. 6A in a fourth functional state.

FIG. 6D shows the example detent mechanism of FIG. 6A in a fourth functional state. The components are the same as shown in FIG. 6A. These components in arrangement 640 include the slider 601, the lower recessed surface 612, the rear end 608 of the detent 607, the front end 609 of the detent 607, the compression-torsional spring 613, and the detent protrusion 615.

FIG. 6D shows the example detent actuation mechanism of FIG. 6A in a fourth functional state. The arrangement 640 shows the one-part detent mechanism 600 in a state that the upper and lower storage boxes are stacked and locked together. This figure illustrates one state encountered in the operations described with respect to FIG. 6A.

Figure 6E:
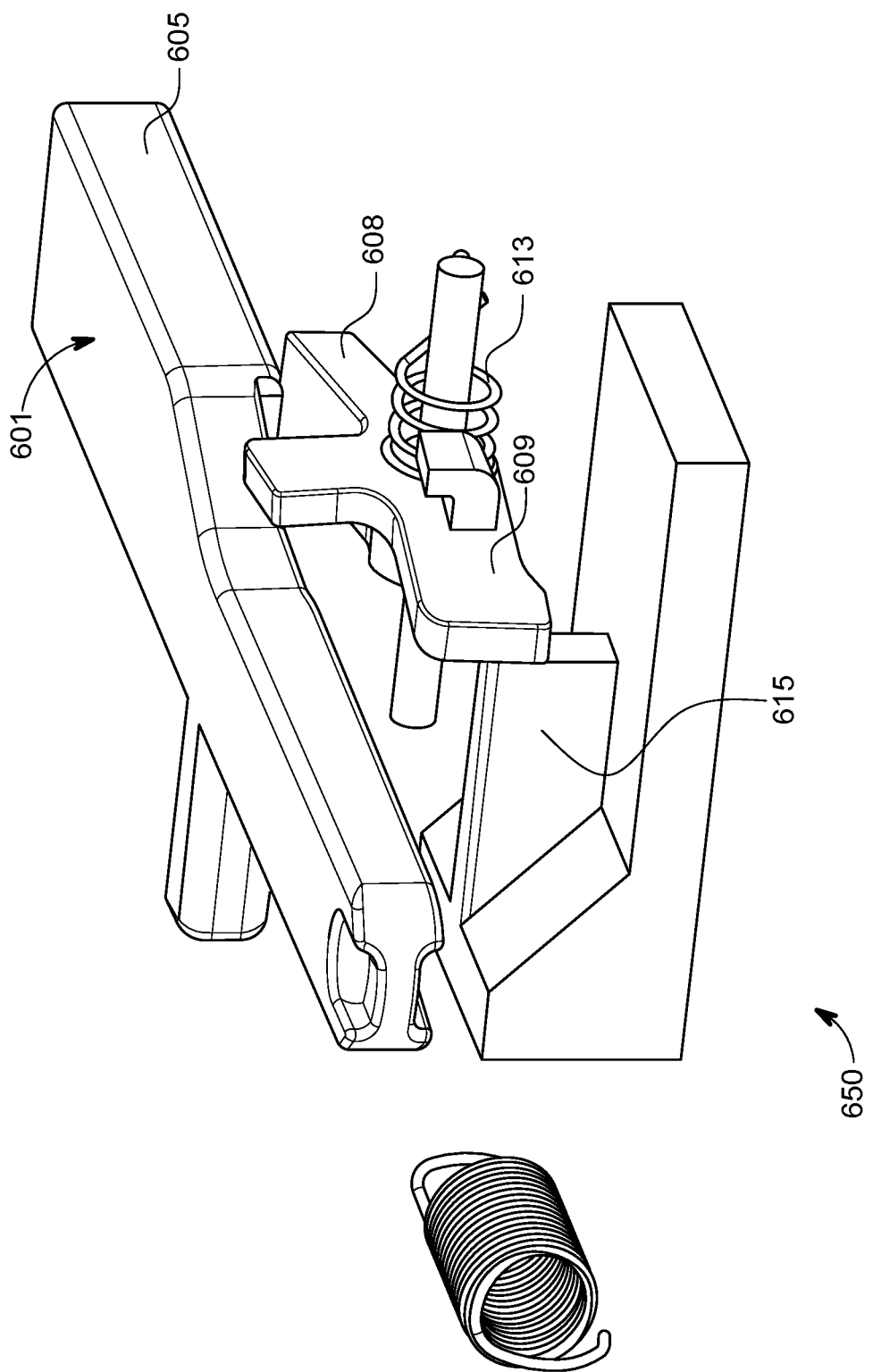
FIG. 6E shows the example detent actuation mechanism of FIG. 6A in a fifth functional state.

FIG. 6E shows the example detent actuation mechanism of FIG. 6A in a fifth functional state. The components are the same as shown in FIG. 6A. These components include the slider 601, the lower recessed surface 612, the rear end 608 of the detent 607, the front end 609 of the detent 607, the compression-torsional spring 613, and the detent protrusion 615.

FIG. 6E shows the one-part detent mechanism 600 in a state that the upper and lower storage boxes are stacked but now unlocked by the user in preparation for lifting the upper storage box off of the lower one. This figure illustrates one state encountered in the operations described with respect to FIG. 6A.

Figure 7A:
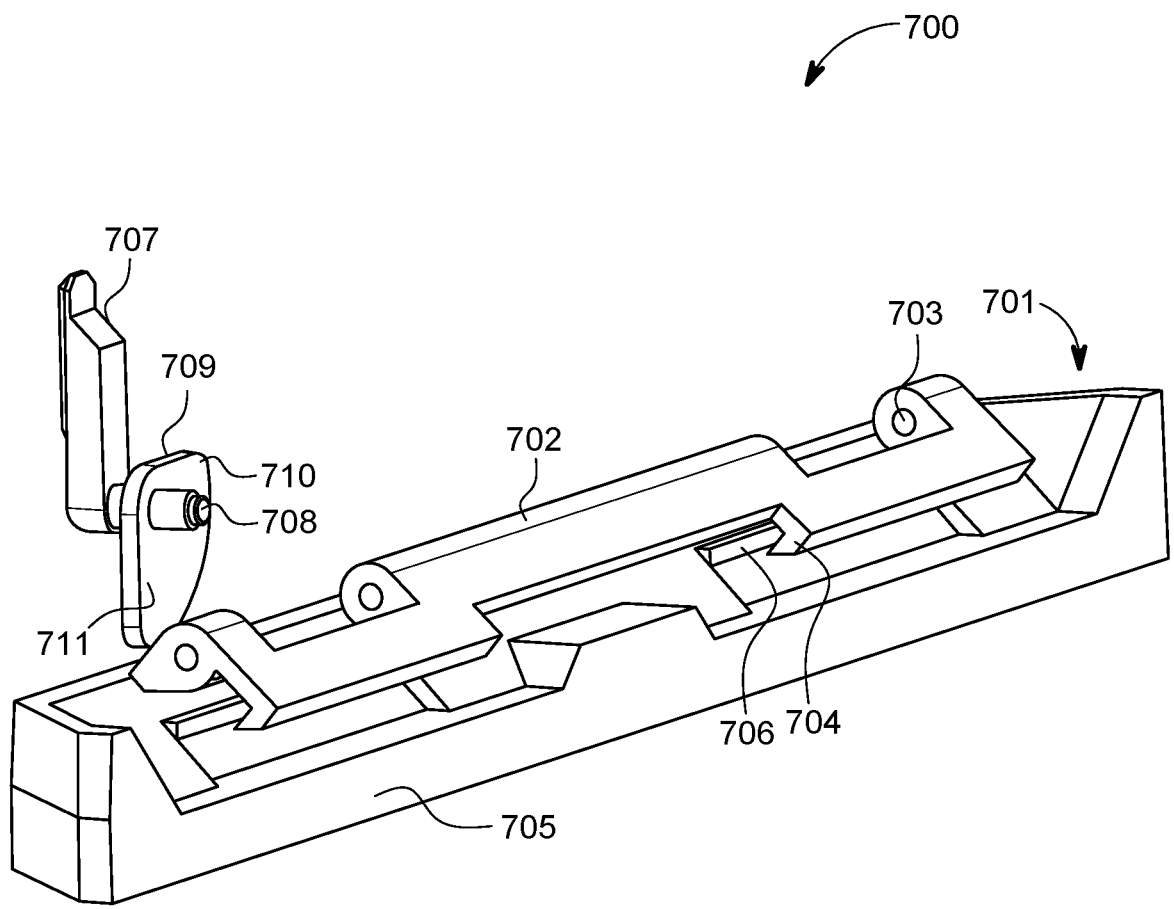
FIG. 7A shows an example storage box third type front latch mechanism in an open state.

FIG. 7A shows an example storage box third type front latch mechanism in an open state. In various embodiments, the third type front latch mechanism 700 includes lock receiver 701 having body 705 and lock receiver edge 706, latch 702, latch pivot 703, lock edge 704, lock status indicator 707, cam 709 having a short end 710 and a long end 711 and a cam pivot 708.

In various embodiments, the cam 709 is coupled with the lock status indicator 707 via cam pivot 708. FIG. 7A shows the third type front latch mechanism 700 in an open state (unlocked.) When the long end 711 of the cam 709 engages tabs extending from latch 702, it causes the lock edge 704 to lift up around the latch pivot 703 and disengage lock edge 704 from lock receiver edge 706 and open or unlock the Latch 702. Similarly, when the short end 710 of the cam 709 engages tabs extending from latch 702, it causes the lock edge 704 to move down around the latch pivot 703 and engage lock edge 704 with lock receiver edge 706 and close or lock the Latch 702.

Figure 7B:
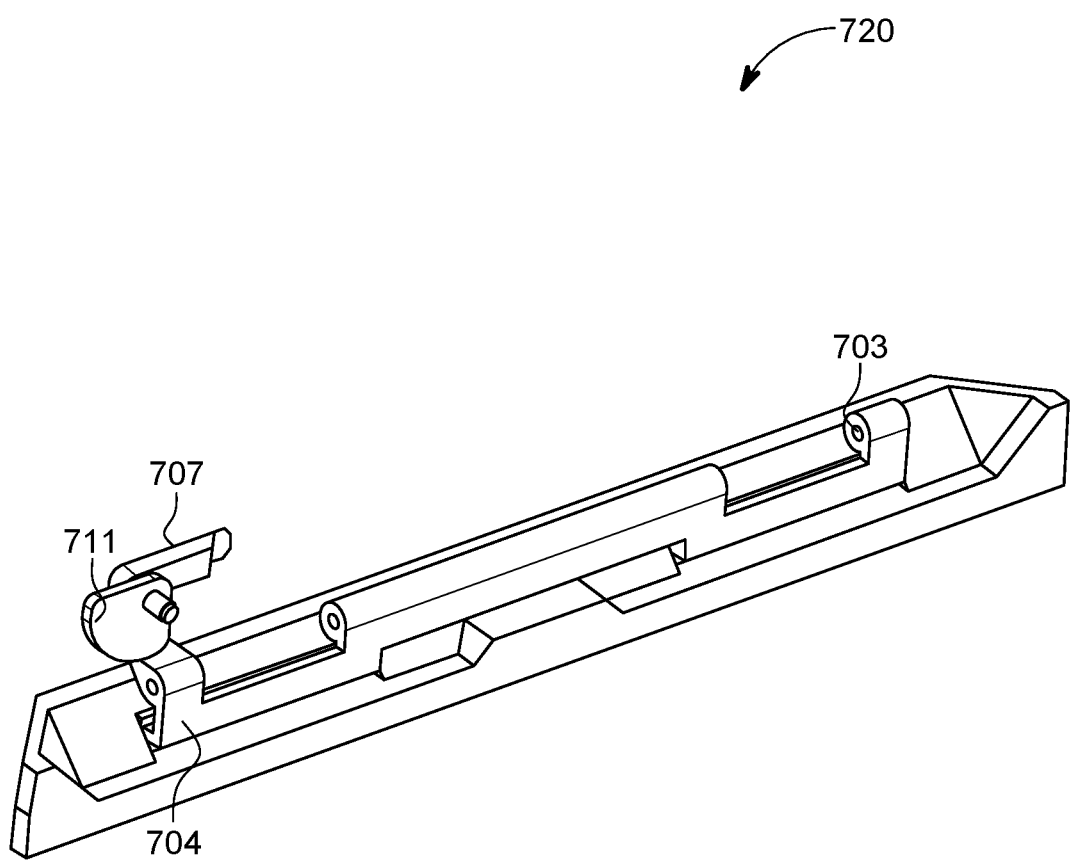
FIG. 7B shows the example storage box third type front latch mechanism in a closed state.

FIG. 7B shows the example storage box third type front latch mechanism in a closed state. The third type front latch mechanism 720 is the same as shown in FIG. 7A and has the same components, some of which are the latch pivot 703, long end 711 of cam 709, short end 710 of cam 709, lock edge 704, and lock status indicator 707.

Figure 7C:
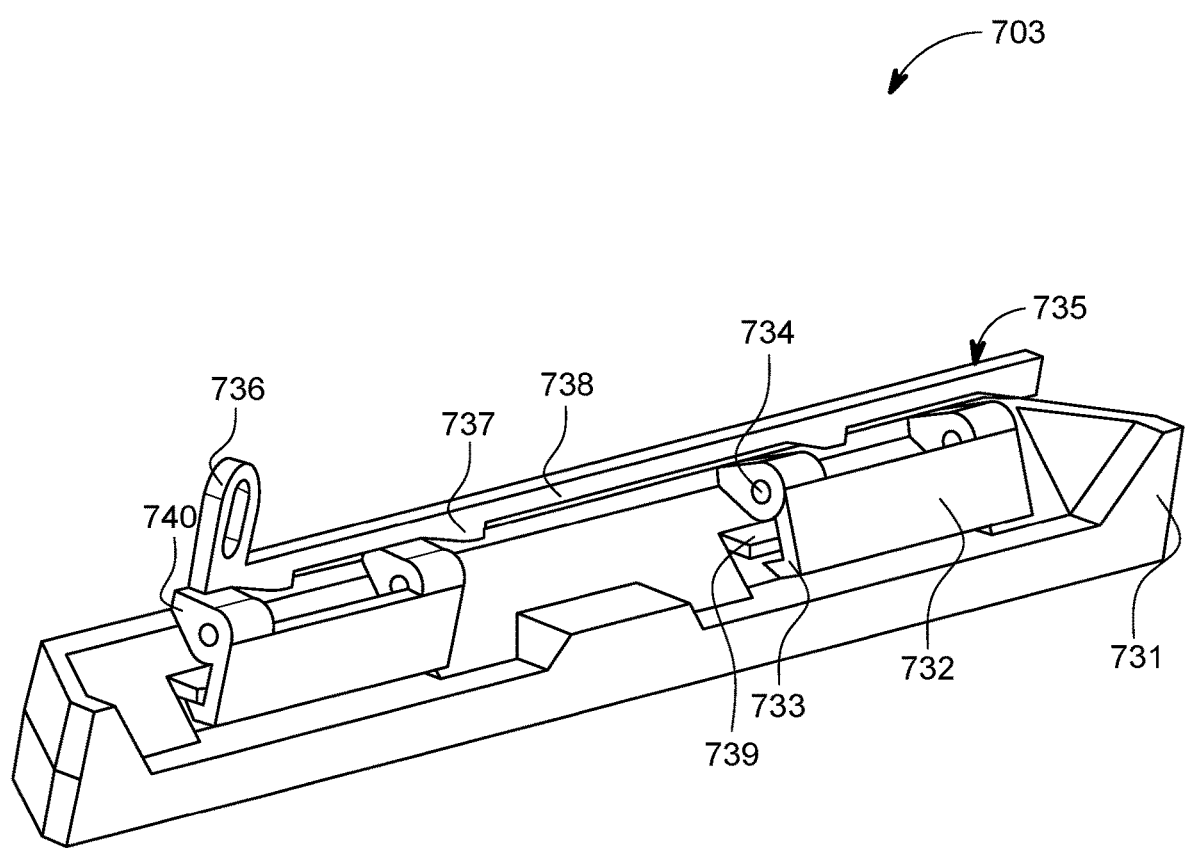
FIG. 7C shows an example storage box fourth type front latch mechanism in a closed state.

FIG. 7C shows an example storage box fourth type front latch mechanism in a closed state. In various embodiments, the fourth type front latch mechanism 730 includes lock receiver 731, lock receiver edge 739, latch 732, lock edge 733, latch pivot 734, slider 735 having slider slot 736, lock tab 740, slider narrow section 738, and slider wide section 737.

In various embodiments, the slider 735 has one or more of each of two distinct sections, narrow sections 738 and wide sections 737. When the slider 735 slides back and forth to lock and unlock the latch, the narrow sections 738 and wide sections 737 come into contact with lock tabs 740, respectively. The narrow sections 738, when in contact with the lock tabs 740 allow the lock edge 733 to rotate down around the latch pivot 734 and engage the lock receiver edge 739 and lock the latch. Similarly, the wide sections 737, when in contact with the lock tabs 740 force the lock edge 733 to rotate up around the latch pivot 734 and disengage from the lock receiver edge 739 and unlock the latch.

Figure 7D:
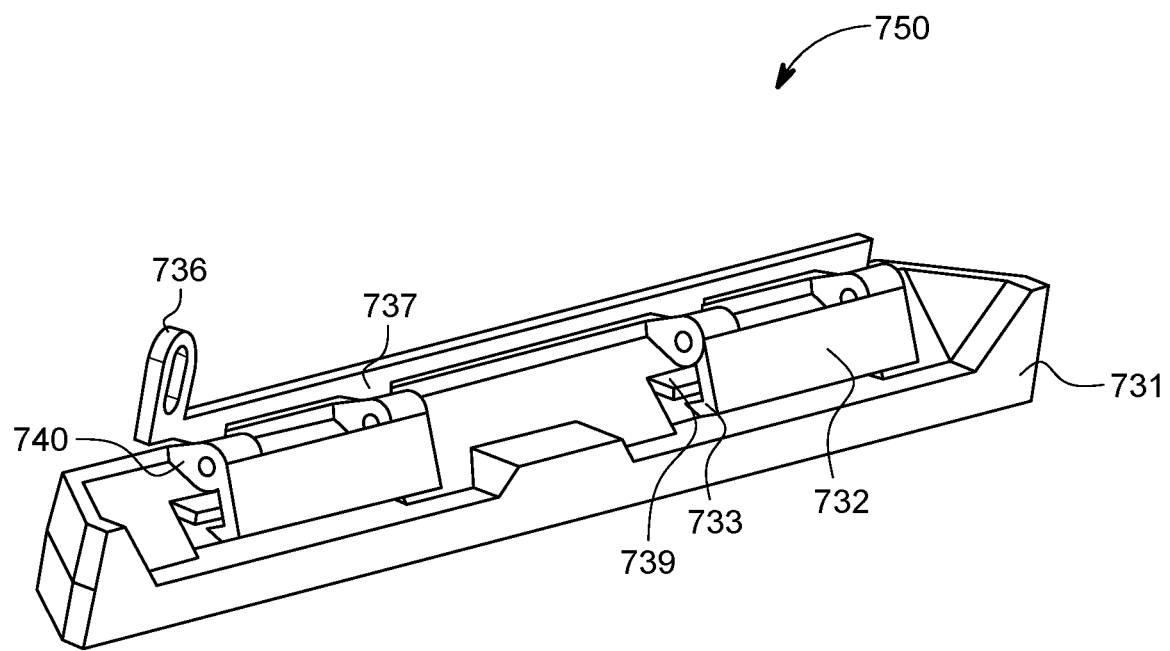
FIG. 7D shows the example storage box fourth type front latch mechanism in an open state.

FIG. 7D shows the example storage box fourth type front latch mechanism in an open state. The fourth type front latch mechanism 750 shown in this figure includes the same components as shown in FIG. 20A and includes lock receiver 731, lock receiver edge 739, latch 732, lock edge 733, slider 735 having slider slot 736, lock tab 740, and slider wide section 737.

The operation of the latch mechanism shown in this figure is the same as described above with respect to FIG. 20A.

Figure 7E:
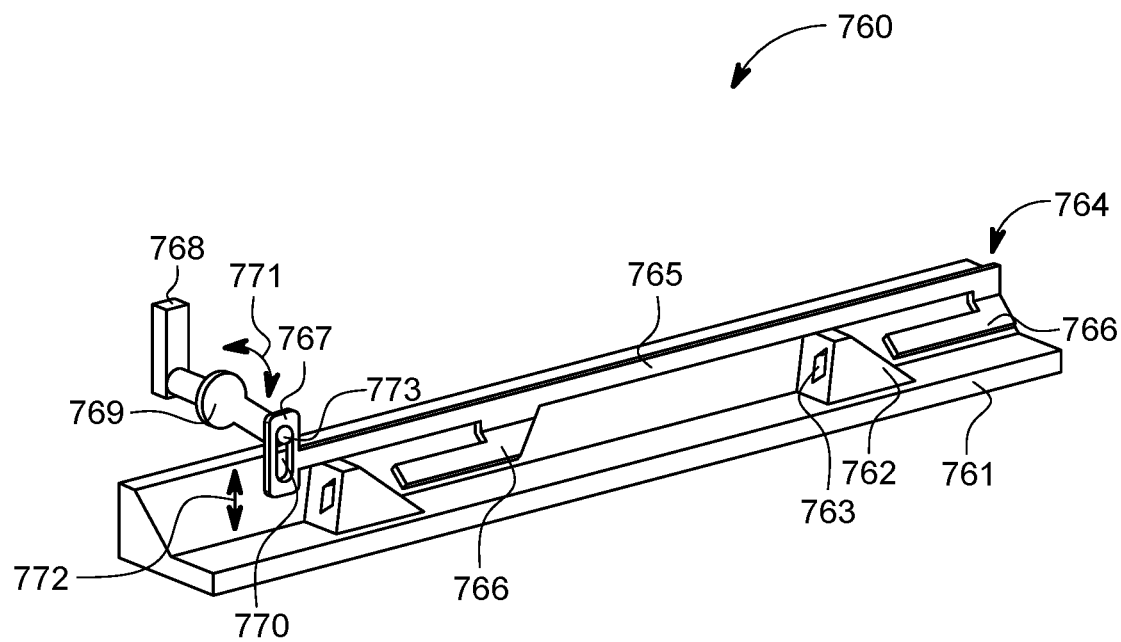
FIG. 7E shows an example storage box fifth type front latch mechanism in an open state.

FIG. 7E shows an example storage box fifth type front latch mechanism in an open state. In various embodiments, the fifth type front latch 760 includes lock receiver 761, lock receiver block 762, lock receiver cavity 763, slider 764, lock bolts 766, slider coupler 767, lock status indicator 768, slider link 769, link knob 773, slider slot 770, rotational arrow 771, and sliding arrow 772.

In various embodiments, in the open or unlocked state, the lock bolts 766 are not inside the cavities 763. The lock status indicator 768 rotates into the unlock position via slider coupler 767, link knob 773, and slider link 769. When the slider 764 is in the open position, the link knob 773 slides up the slider slot 770, as signified by arrow 772, which translates to the rotation of the slider link 769 CCW via link knob 773, as signified by rotational arrow 771, placing the lock status indicator 768 to positively indicate an open lock status. Similarly, when the slider 764 is in the closed position as shown in FIG. 7F, the link knob 773 slides down the slider slot 770, as signified by arrow 772, which translates to the rotation of the slider link 769 CW, as signified by rotational arrow 771, placing the lock status indicator 768 to positively indicate a closed lock status.

Figure 7F:
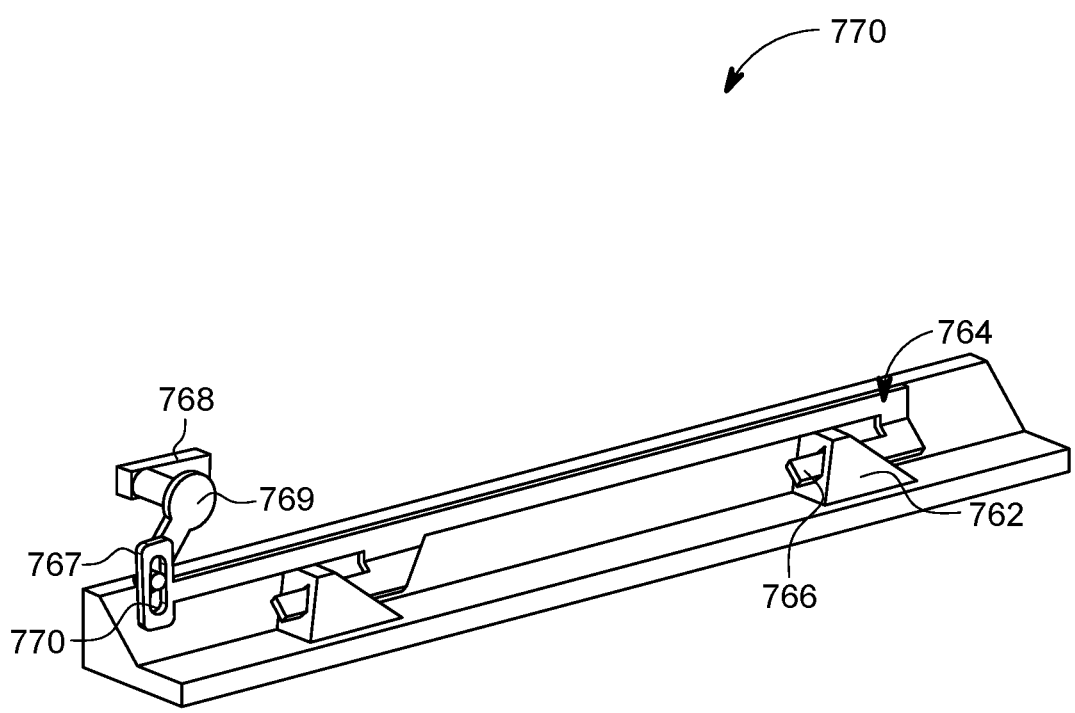
FIG. 7F shows the example storage box fifth type front latch mechanism in a closed state.

FIG. 7F shows the example storage box fifth type front latch mechanism in a closed state. The fifth type front latch mechanism 770 shown in this figure includes the same components as shown in FIG. 7E and includes, lock receiver block 762, slider 764, lock bolts 766, slider coupler 767, lock status indicator 768, slider link 769, and slider slot 770.

In various embodiments, in the closed state, the lock bolts 766 enter the lock receiver cavities 763, thereby locking the latch. As described above with respect to FIG. 7E, when the slider 764 is in the closed position, the link knob 773 slides down the slider slot 770, as signified by arrow 772, which translates to the rotation of the slider link 769 CW, as signified by rotational arrow 771, placing the lock status indicator 768 to positively indicate a closed lock status.

Figure 7G:
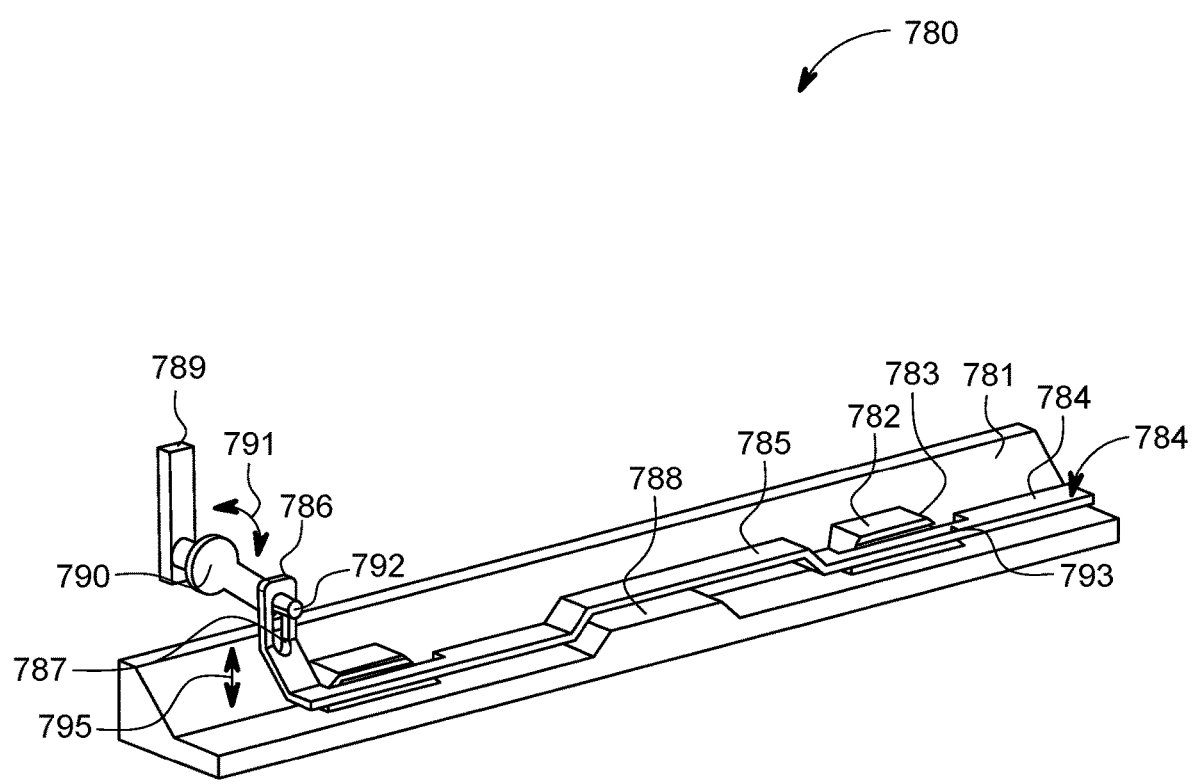
FIG. 7G shows an example storage box sixth type front latch mechanism in an open state.

FIG. 7G shows an example storage box sixth type front latch mechanism in an open state. In various embodiments, the sixth type front latch mechanism configuration 780 includes lock receiver 781, lock receiver block 782, receiver grooves 783, lock receiver stop 788, slider 784 having narrow sections 793, wide sections 794, raised section 785, slider coupler 786, slide slot 787, lock status indicator 789, slider link 276, link knob 792, rotational arrow 791, and sliding arrow 795.

Figure 7H:
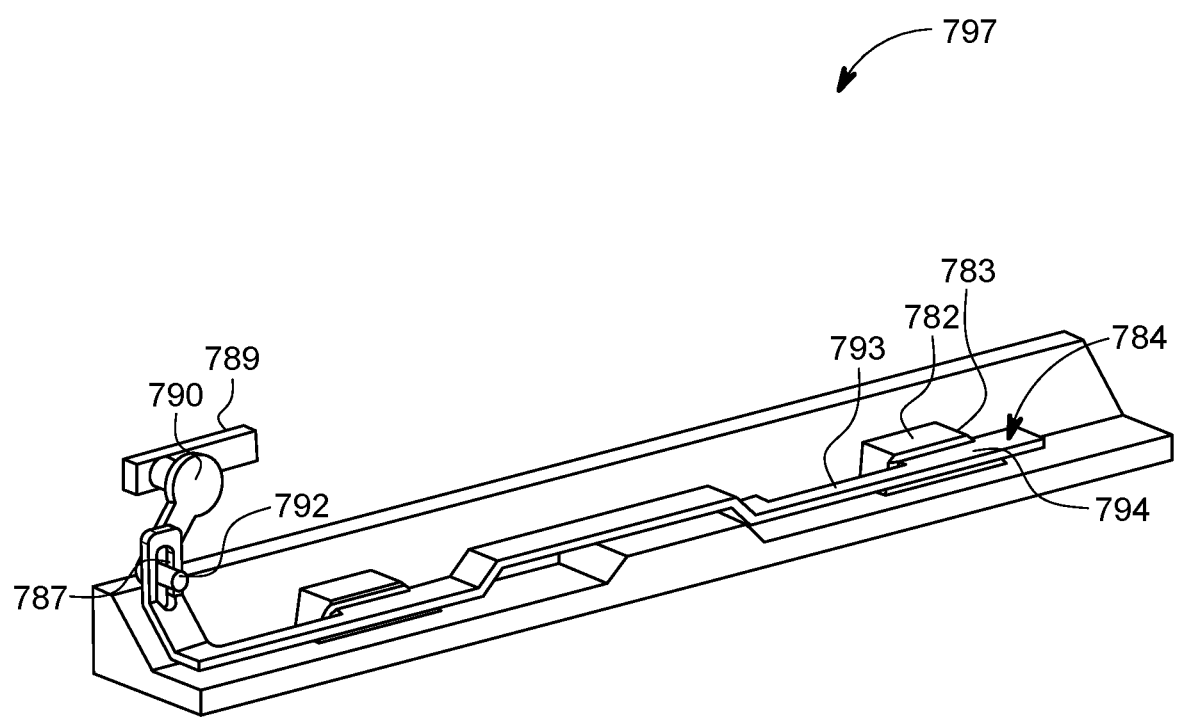
FIG. 7H shows the example storage box sixth type front latch mechanism in a closed state.

In various embodiments, when in open state, the narrow sections 793 of slider 784 are not inside the receiver grooves 783. The lock status indicator 789 rotates into the unlock position via slider coupler 786, link knob 792, and slider link 276. When the slider 784 is in the open position, the link knob 792 slides up the slider slot 787, as signified by arrow 795, which translates to the rotation of the slider link 276 CCW via link knob 792, as signified by rotational arrow 791, placing the lock status indicator 789 to positively indicate an open lock status. The raised section 785 engages the lock receiver stop 788 to prevent the slider 784 from moving too far in one direction or another. Similarly, when the slider 784 is in the closed position as shown in FIG. 7H, the wide sections 794 of slider 784 move inside the receiver grooves 783 to lock the latch. The link knob 792 slides down the slider slot 787, as signified by arrow 795, which translates to the rotation of the slider link 791 CW, as signified by rotational arrow 791, placing the lock status indicator 789 to positively indicate a closed lock status. The raised section 785 engages the lock receiver stop 788 to prevent the slider 784 from moving too far in one direction or another.

FIG. 7H shows the example storage box sixth type front latch mechanism in a closed state. In various embodiments, the sixth type front latch mechanism configuration 797 shown in this figure has the same components as shown in FIG. 7G including lock receiver block 782, receiver grooves 783, slider 784 having narrow sections 793, wide sections 794, slide slot 787, lock status indicator 789, slider link 790, and link knob 792.

In various embodiments, when the slider 784 is in the closed position as shown in FIG. 7H, the wide sections 794 of slider 784 move inside the receiver grooves 783 to lock the latch. The link knob 792 slides down the slider slot 787, as signified by arrow 795, which translates to the rotation of the slider link 791 CW, as signified by rotational arrow 791, placing the lock status indicator 789 to positively indicate a closed lock status. The raised section 785 engages the lock receiver stop 788 to prevent the slider 784 from moving too far in one direction or another.

II. Attachment Slots

Figure 8A:
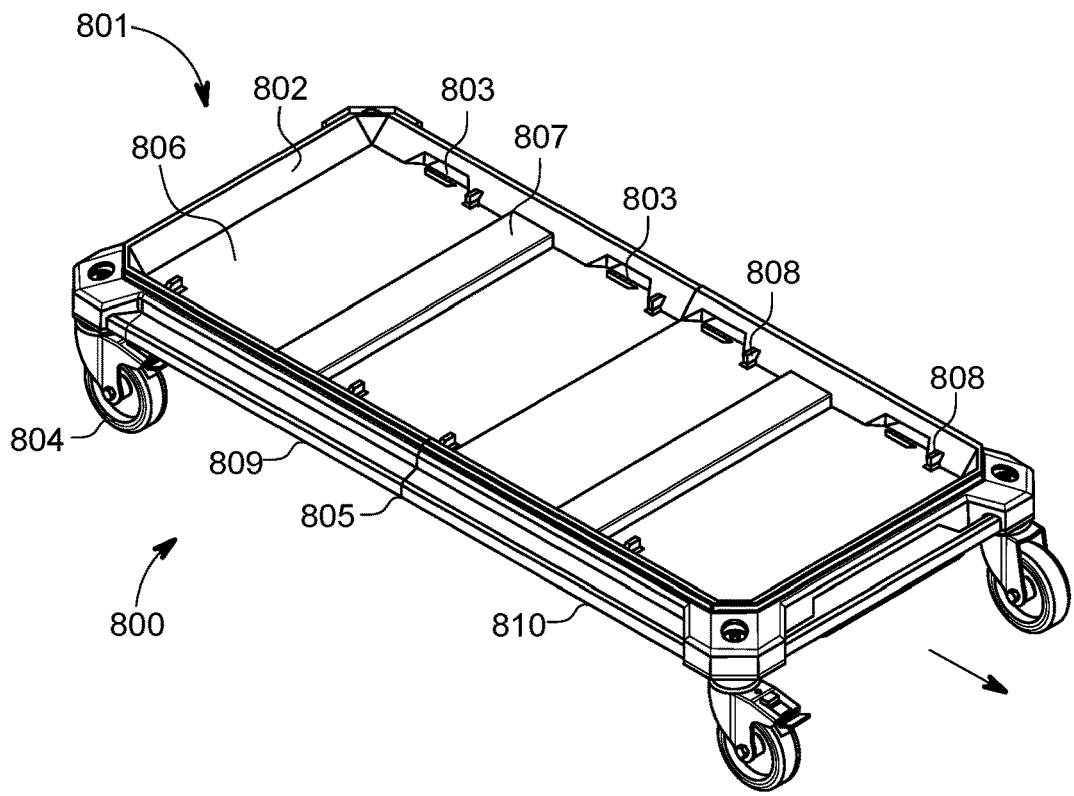
FIG. 8A shows an example large base cart.
Figure 8B:
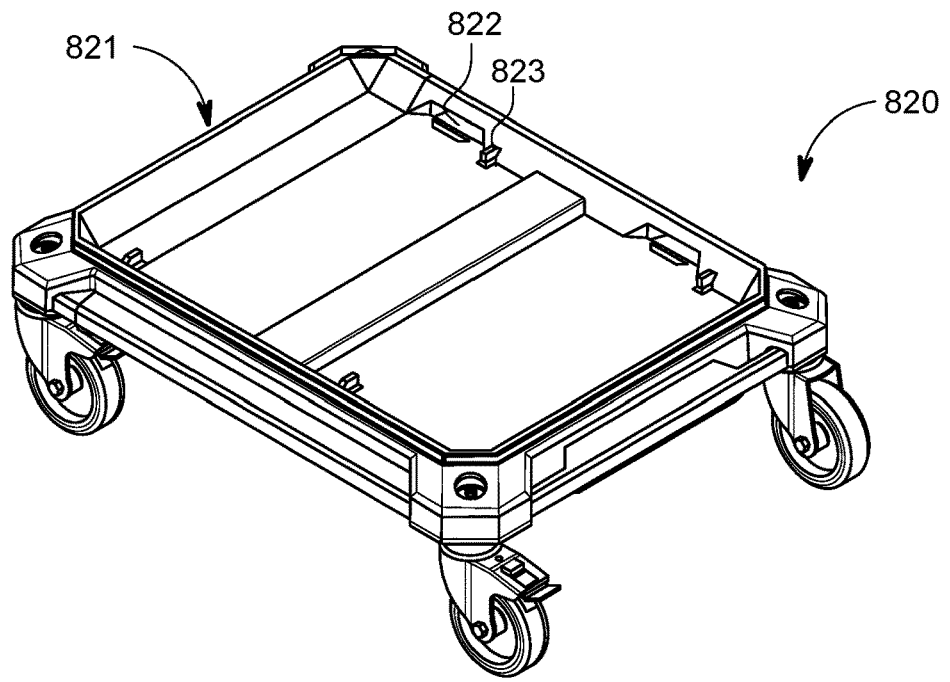
FIG. 8B shows an example small base cart.
Figure 8C:
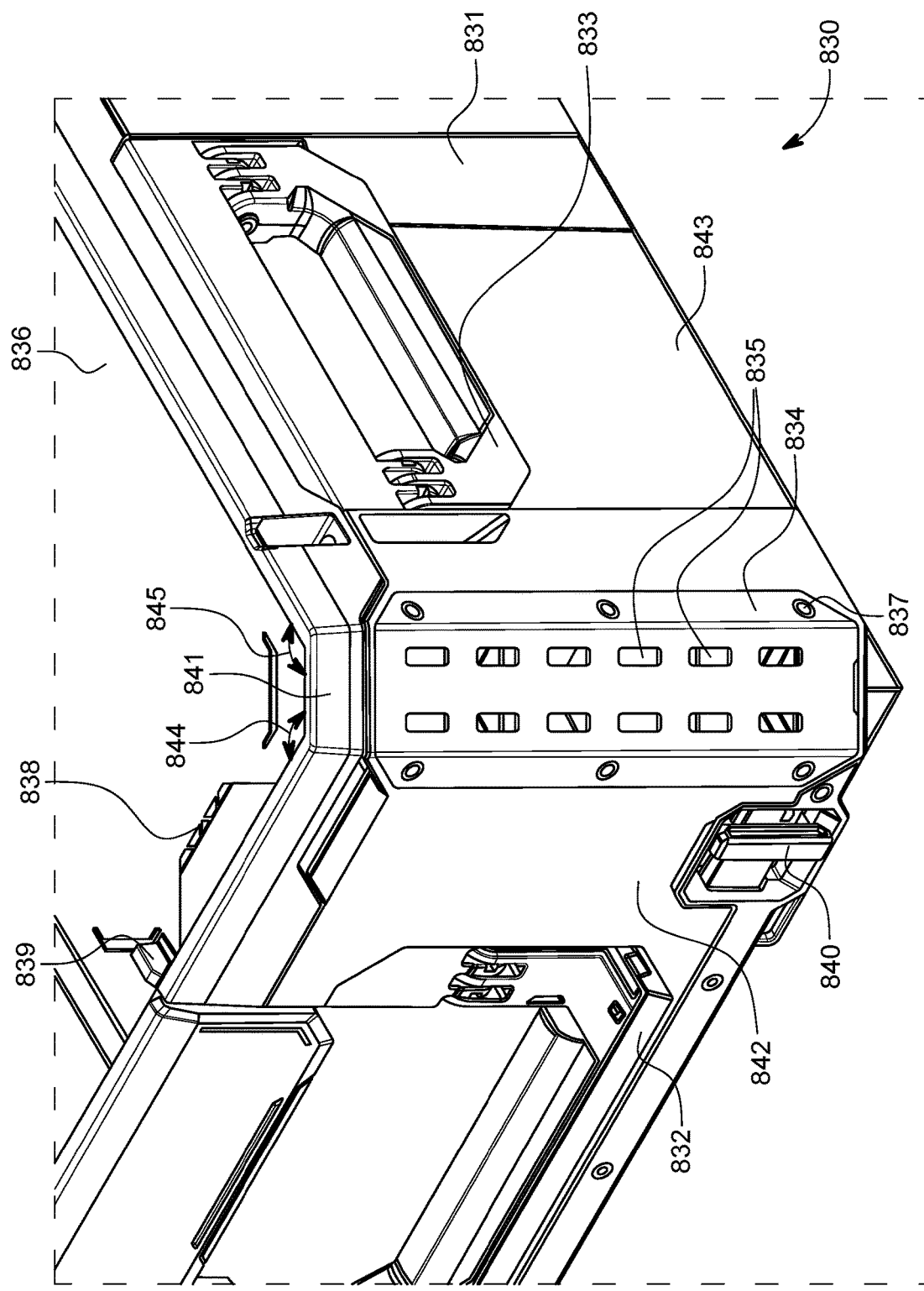
FIG. 8C shows an example storage box with corner attachment slots.

FIG. 8C shows an example storage box with corner attachment slots. In various embodiments, storage box configuration 830 includes stackable box 831, front handle 832, side handle 833, box lid 836, cleat receiver 838, protrusion 839, attachment strip or slot strip 834, attachment slots 835, fasteners 837, lock status indicator 840, corner wall 841, front wall 842, side wall 843, front wall angle 844, and side wall angle 845.

In various embodiments, stackable box 831 may include corner wall 841 that is not perpendicular to either front wall 842 or side wall 843 that are connected via the corner wall. The angles 844 and 845 of the corner wall with respect to the front wall 842 and side wall 843, respectively, may be any angle, for example 45 degrees. In some embodiments, the angles may equal, while in other embodiments the angles may be different. In various embodiments, slot strip 834 is attached to corner wall 841 to create a hook gap, not visible in this figure, between the corner wall 841 and slot strip 834.

In this configuration, slot strip 834 does not physical touch corner wall 841. The hook gap is used to receive hooks, or other similar devices, attached to various tools and objects to quickly attach/detach the hooked objects to/from stackable box 831. This is further described below with respect to other figures.

In various embodiments, slot strip 834 has two parallel vertical (with respect to orientation of stackable box 831) columns of perforations or slots, as shown in the figure. This symmetry of slots allow symmetrical attachment to the corners of the stackable box 831 with or without corner wall 841. The slot strip 834 also has two parallel edges on the exterior side of the slots 835 that are used to attach slot strip 834 to walls of stackable box 831. The parallel edges are bent at same angles as front wall angle 844 and side wall angle 845.

In various embodiments, slot strip 834 may be in the form of a perforated panel of various shapes and sizes, such as rectangular, round, irregular shape (non-geometric), and the like. The perforations on the panel, like slots 835, may also have different forms, sizes, and shapes, such as oval, round, rectangular, horizontally oriented, vertically oriented and the like. The arrangement of the slots 835 may also be in various forms such as evenly spaced, staggered rows and columns, or specially placed on the perforated panel at specific locations for attachment of specific tools and accessories. The term "slot strip" as used throughout this disclosure is defined and is to be construed as a general perforated panel with various sizes and shapes (not just a rectangular strip) and with any type of perforations or holes (not just an elongated slot).

In various embodiments, multiple stacked boxes locked together may form a longer column of vertically aligned slot strips 834 and goes vertically across the multiple stacked boxes, as shown in FIG. 1A. In effect, this configuration creates a longer column of perforations or slots that allow attachment of long-handled tools attached to the stacked boxes that may have to be secured at more than one point along the slot strips 834 on the stacked boxes.

In some embodiments, slot strip 834 may be attached to a flat wall of stackable box 831 at near a corner or on the flat wall away from the corner. In all embodiments, the hook gap is preserved to allow hanging or attaching object to the slot strip 834.

In various embodiments, slot strip 834 may function to reinforce the corners and/or the walls of the stackable box 831. In such embodiments, for the additional function of reinforcement, slot strip 834 may be made of a strong material such as metals like steel, aluminum, titanium, metal alloys, high-strength nylon, high-strength plastics, resin, and the like. The reinforcement function is usually practical when the mechanical strength of slot strip 834 is significantly more than needed to support tools or accessories that are attached to it. Examples of tools and accessories that may be attached to slot strip 834 are lights, bins, hand tool holders, and the like, which usually do not weight more than a few hundred grams or a few kilograms. A strong slot strip adds strength to the structure of stackable box 831 in multiple mechanical ways and directions including compression strength, tensile strength, and torsional strength. Such reinforcements help maintain the shape and integrity of stackable box 831 when subjected to intense use and various loads and forces. Such loads and forces may include static weight put on or inside stackable box 831, impact force of dropping stackable box 831 on a hard surface such as on ground or a workbench, and rough handling forces.

In some embodiments, stackable box 831 may have corner wall 841 creating a slanted corner, while in other embodiments, front wall 842 and side wall 843 meet at a 90 degree angle without an intermediate corner wall 841 between them, creating a square corner. In the embodiments in which slot strip 834 is attached to stackable box 831 at the corners, half of the slot strip 834 is attached to front (or back) wall 842 and the other half is attached to side wall 843. This corner configuration of slot strip 831 allows slots 835 to be used with or without corner wall 841. In both cases, one slot column falls on the side of front wall 842 while the other slot column falls on the side of side wall 843 with adequate clearance from stackable box 831 walls to receive attachment hooks. Hence, slot strip 841 is usable the same way with both cases. However, the shape of the slot strip 834 is different for slanted corner and square corner to accommodate the different geometries. The parallel edges of slot strip 834 may have a different bend angle and different dimensions for the square corner and the slanted corner.

In various embodiments, slot strip 834 may be attached to corner wall 841 using screws, nuts and bolts, rivets, industrial glue, thermal fusion, welding, and other similar methods of attachment. In some embodiments, slot strip 834 may be permanently attached to the stackable box 831 while in other embodiments, it may be removably attached, for example, by nuts and bolts.

Figure 11A:
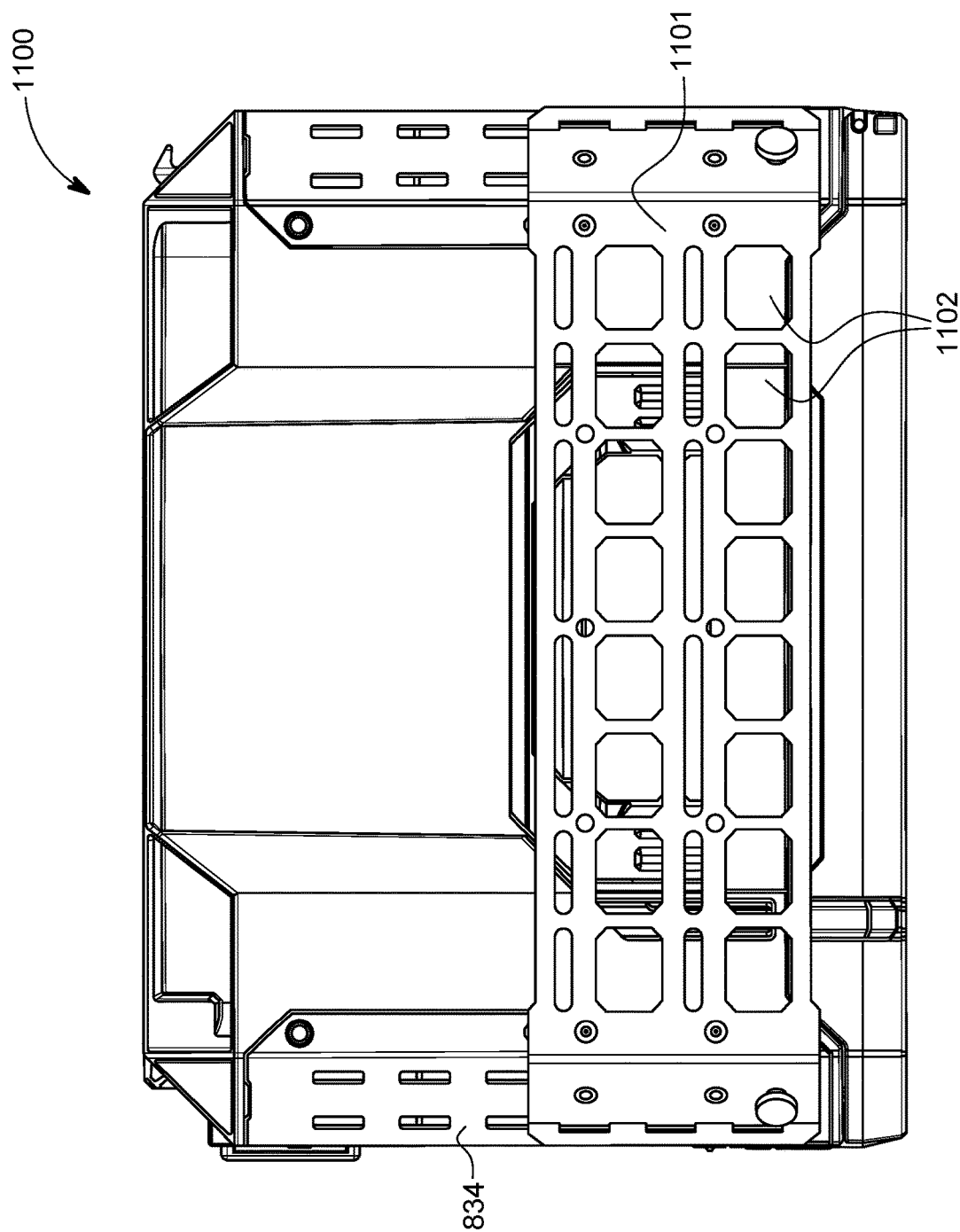
FIG. 11A shows an example storage box with a molle panel attached to corner attachment slots.

FIG. 11A shows an example storage box with a molle panel attached to corner attachment slots. In various embodiments, configuration 1100 includes slot strip 834, molle panel 1101, and panel perforations 1102.

In various embodiments, a molle panel or molle board is a flexible system, similar to a peg-board, used to quickly attach various tools and objects. Molle panel 1101 may be attached and/or detached quickly to/from adjacent slot strips 834, as shown. Slot strips 834 may be attached to corner walls 841 (see FIG. 8C) or to flat portions of box walls.

In various embodiments, molle panel 1101 may be used for tools or accessories that are designed to be used with molle panels rather than slot strips 834. In some cases, an accessory or attachment may be physically too large to attach to a single slot strip 834 and has to be distributed over a larger span. In such cases, a molle panel or another type of bar or panel may be needed. An example of a large item includes large bins or containers.

Figure 11B:
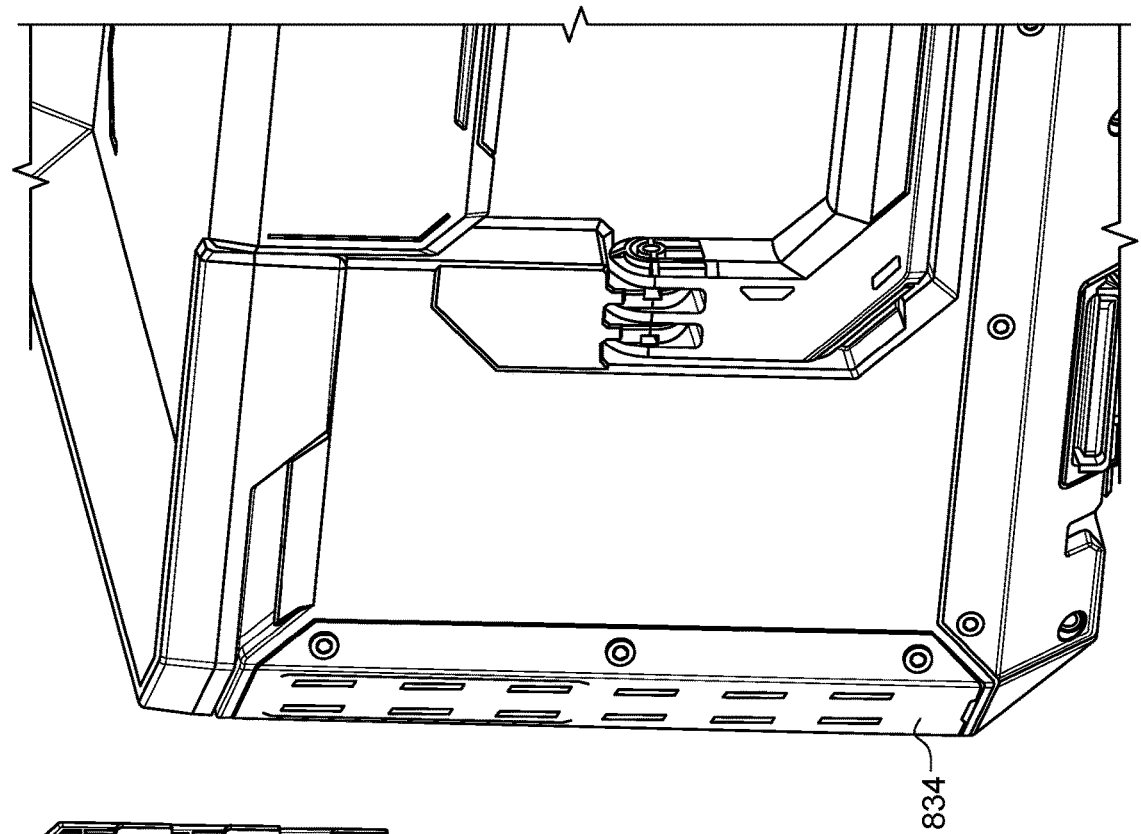
FIG. 11B shows an example molle panel attachable to corner attachment slots.
Figure 11B:
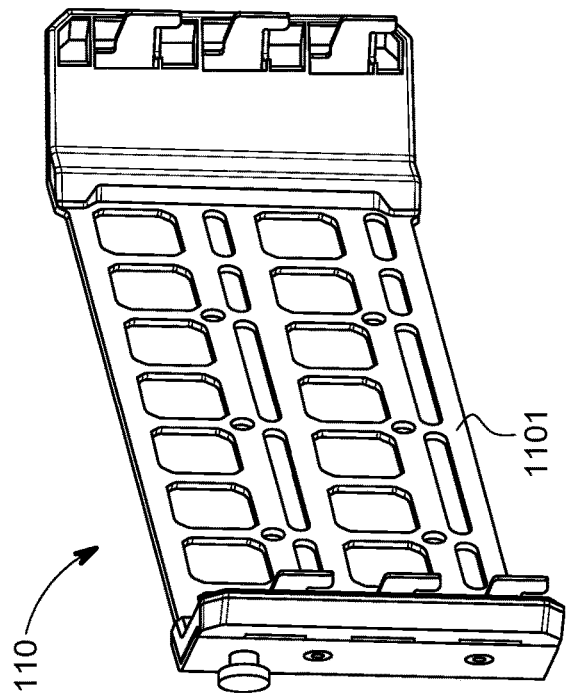

FIG. 11B shows an example molle panel attachable to corner attachment slots. In various embodiments, detached configuration 1110 includes molle panel 1101, and slot strip 834.

As described with respect to FIG. 11A above, molle panel 1101 may be attached to two adjacent slot strips 834. In some embodiments, molle panel 1101 may have angled ends that match front wall angle 844 and side wall angle 845 and can be attached to slot strips 834 on corner wall 841.

Figure 12A:
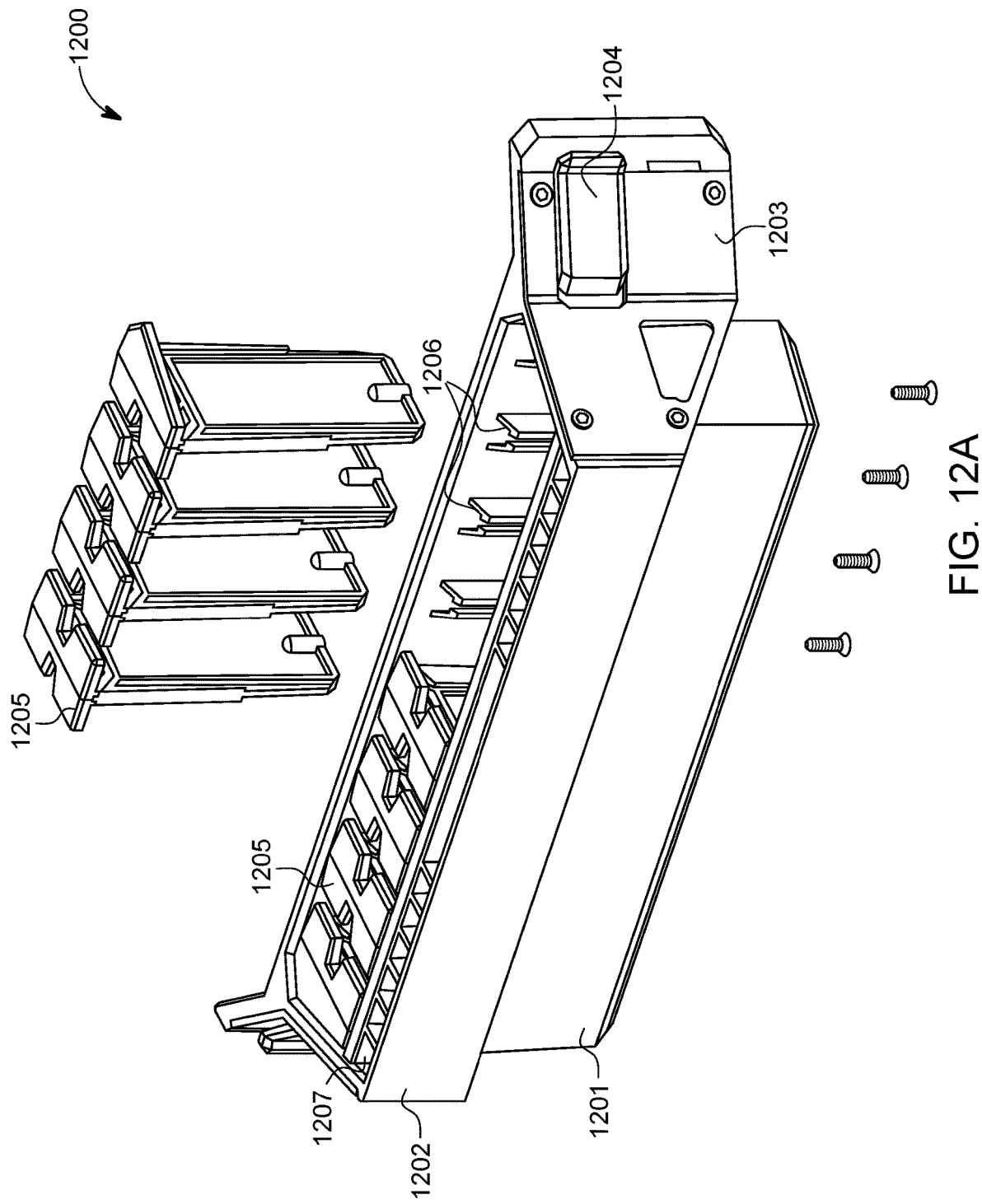
FIG. 12A shows an example tool holder attachable to corner attachment slots.

FIG. 12A shows an example tool holder attachable to corner attachment slots. In various embodiments, configuration 1200 includes tool holder 1201, attachment bar 1202, bar ends 1203, bar latch 1204, tool dividers 1205, divider rails 1206, and tool slots 1207.

In various embodiments, tool holder 1201 may be quickly attached/detached from slot strips 834. In various embodiments, different sizes of tool dividers 1205 may be used to accommodate different size tools. Tool slots 1207 may be used to carry long and narrow tools such as screw drivers. Bar ends 1203 may have angled ends that match front wall angle 844 and side wall angle 845 and can be attached to slot strips 834 on corner wall 841. Bar latch 1204 may be used to fasten attachment bar 1202 to slot strips 834.

Figure 12B:
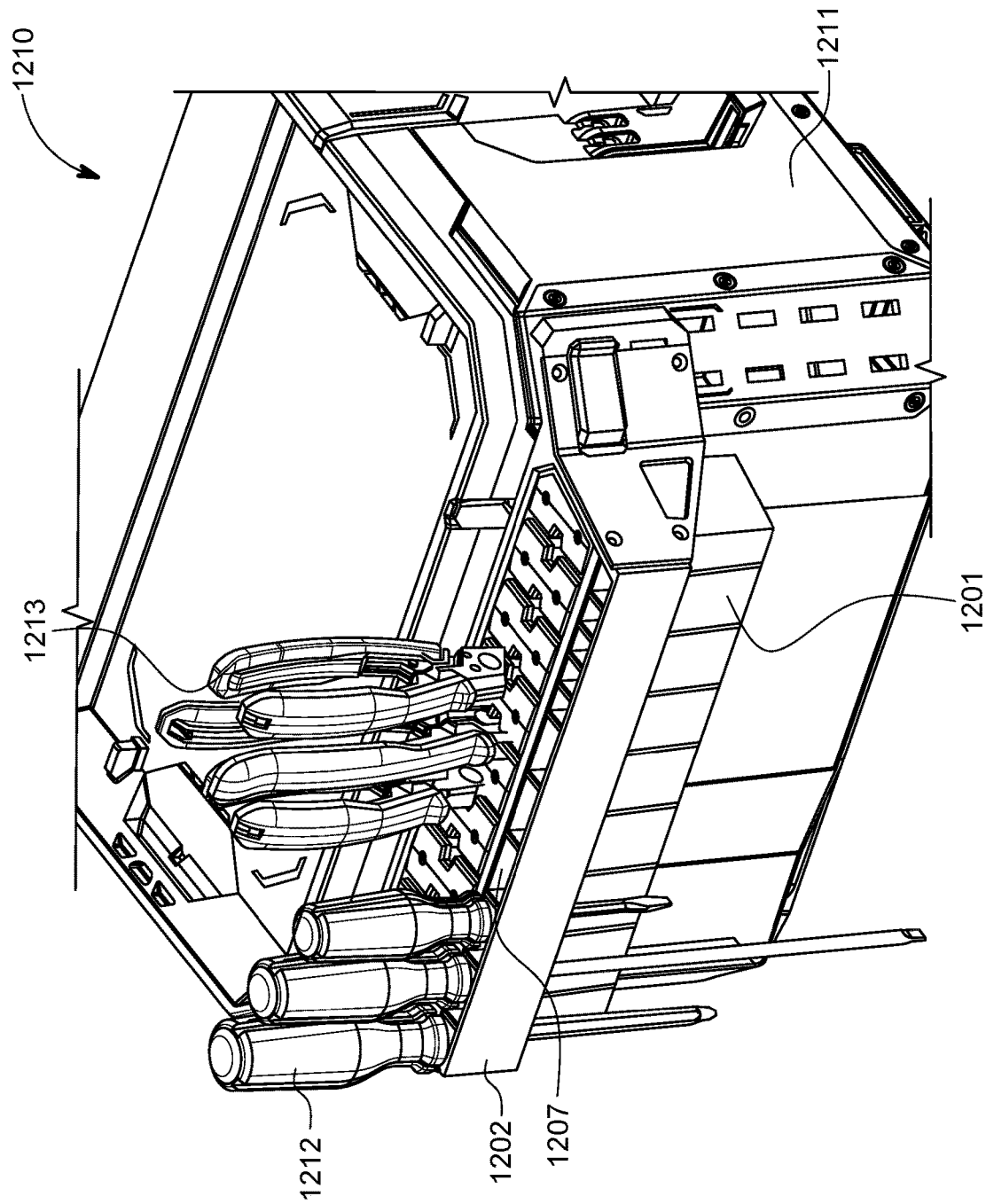
FIG. 12B shows an example tool holder attached to corner attachment slots.

FIG. 12B shows an example tool holder attached to corner attachment slots. In various embodiments, configuration 1210 includes tool holder 1201, attachment bar 1202, tool slots 1207, stackable box 1211, screw drivers 1212, and pliers 1213.

In various embodiments, different tool holders 1201 with different tool sets for different applications may be prepared and strapped onto stackable box 1211. This allows quick changing of different tools sets for a particular application.

Figure 12C:
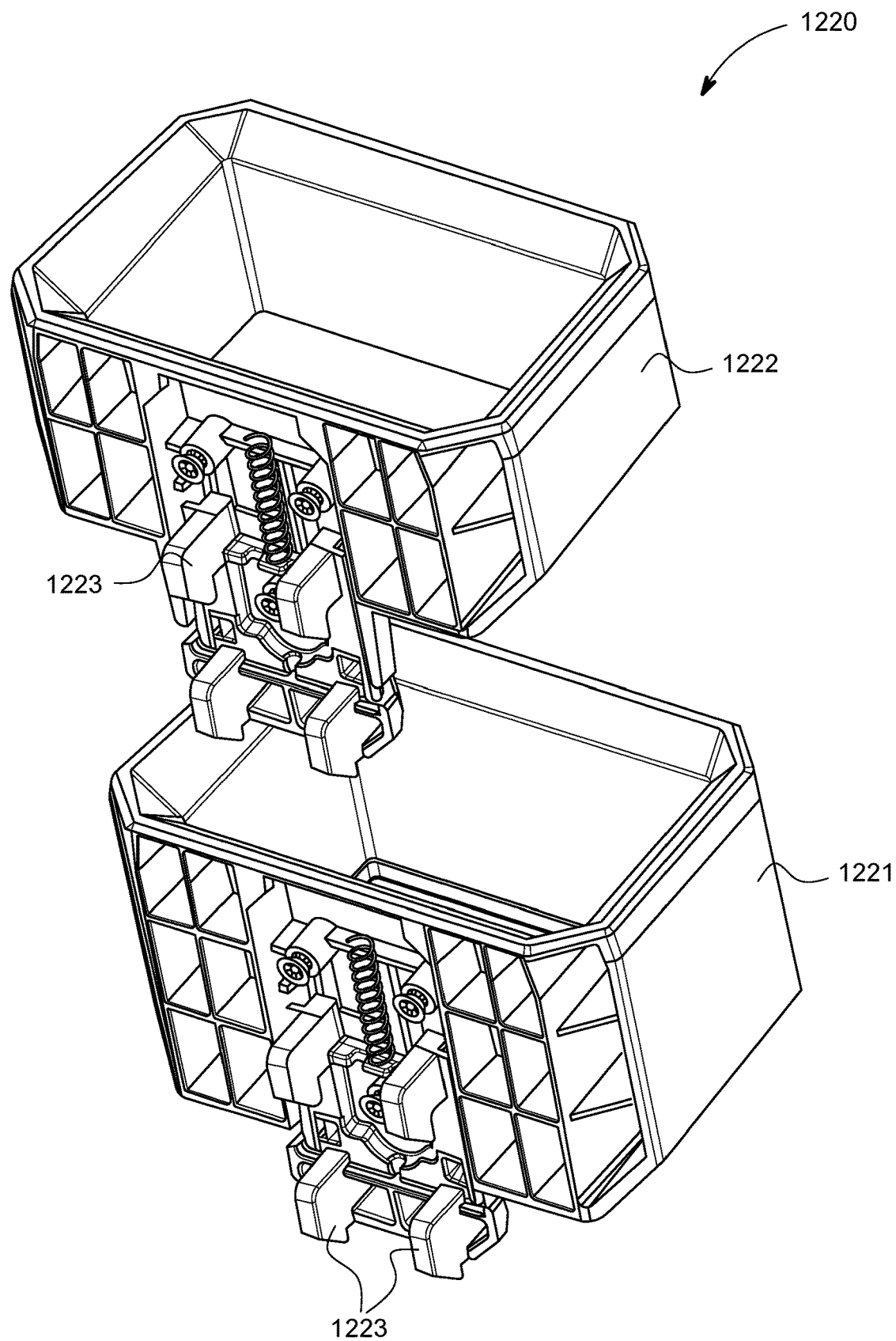
FIG. 12C shows example bins attachable to corner attachment slots.

FIG. 12C shows example bins attachable to corner attachment slots. In various embodiments, configuration 1220 includes bins 1221 and 1222 with attachment hooks 1223 that may be used to the attach bins 1221 and 1222 to slot strips 834.

Figure 12D:
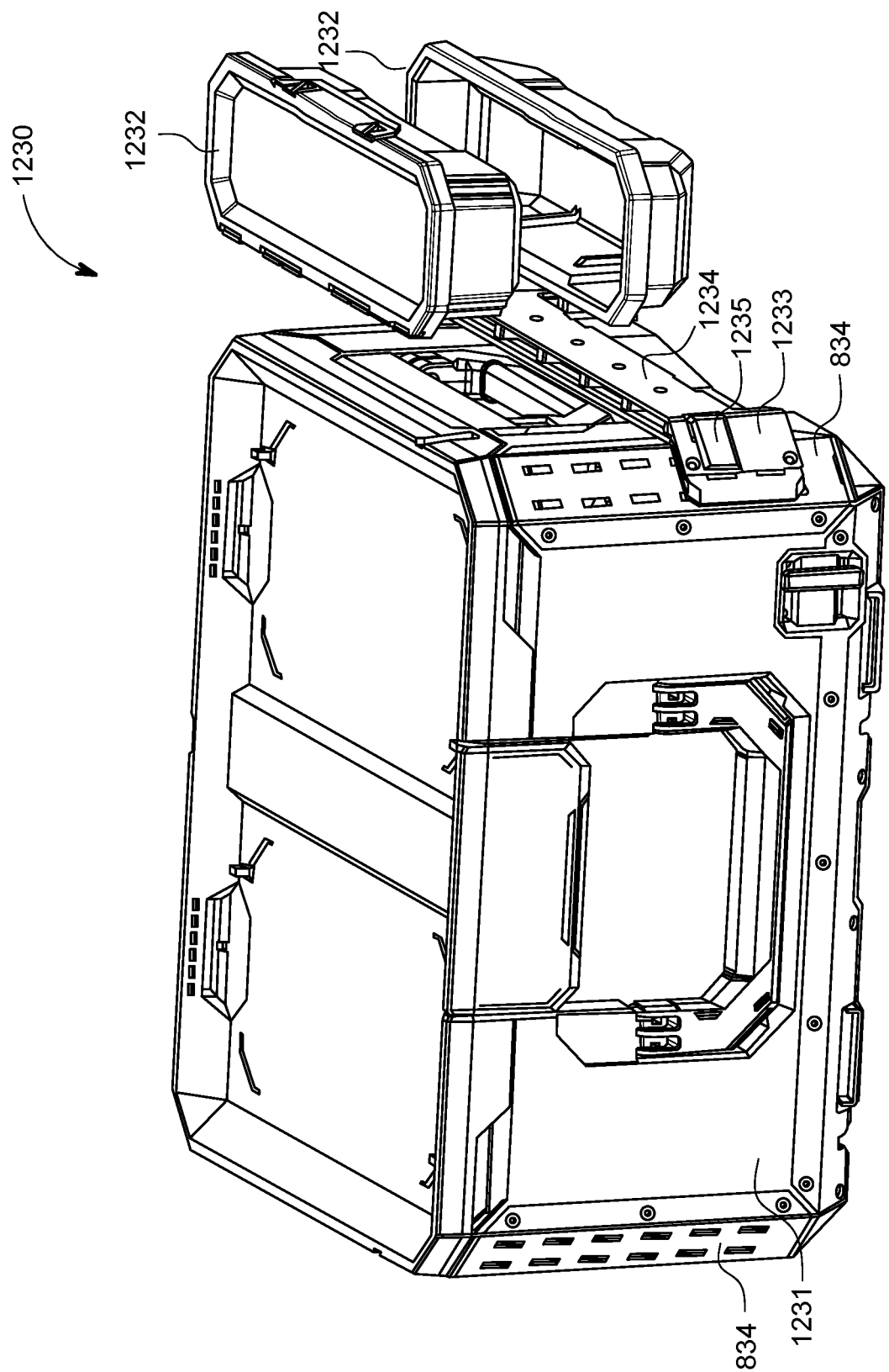
FIG. 12D shows example bins attachable to an hanging accessory bar attached to corner attachment slots.

FIG. 12D shows example bins attachable to a hanging accessory bar attached to corner attachment slots. In various embodiments, configuration 1230 includes stackable box 1231, slot strip 834, bins 1232, attachment bar 1234, angled bar ends 1233, and bar latch 1235.

In various embodiments, attachment bar 1234 may be attached to adjacent slot strips 834, and then bins 1232 may be attached to stackable box 1231 via attachment bar 1234.

Figure 12E:
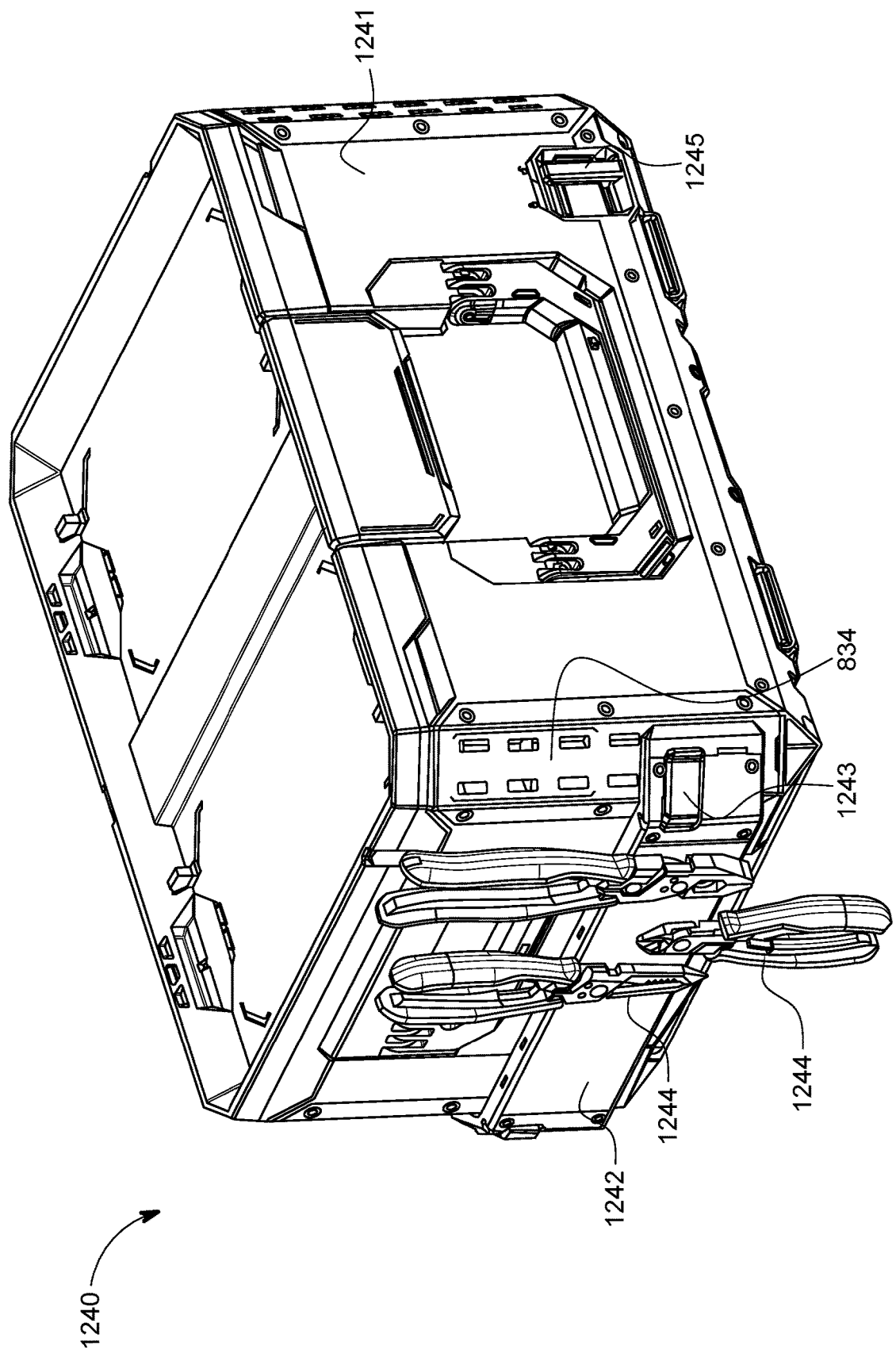
FIG. 12E shows an example magnetic accessory bar attached to corner attachment slots.

FIG. 12E shows an example magnetic accessory bar attached to corner attachment slots. In various embodiments, configuration 1240 includes stackable box 1241, slot strip 834, magnetic bar 1242, hand tools 1244, bar latch 1243, and lock status indicator 1245.

In various embodiments, magnetic bar 1242 may be attached to adjacent slot strips 834, and then hand tools 1244 may be attached to stackable box 1241 via magnetic bar 1242.

Figure 13A:
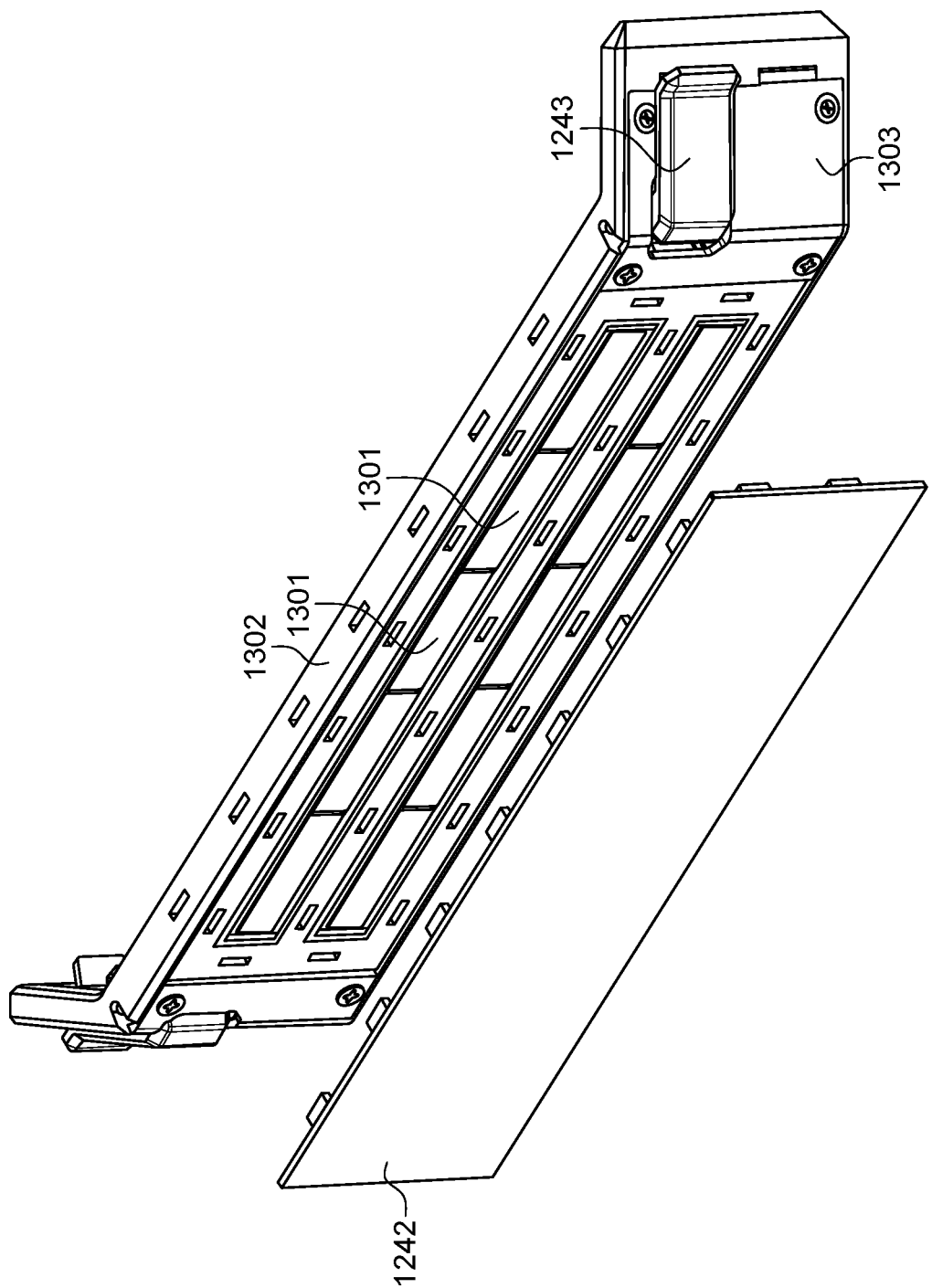
FIG. 13A shows an example exploded view of the magnetic accessory bar of FIG. 12E.

FIG. 13A shows an example exploded view of the magnetic accessory bar of FIG. 12E. In various embodiments, configuration 1300 includes magnetic bar 1242, bar frame 1302, magnets 1301, bar frame ends 1303, and bar latch 1243.

In various embodiments, magnetic bar 1242 may be quickly attached/detached from slot strips 834. In various embodiments. Bar frame ends 1303 may have angled ends that match front wall angle 844 and side wall angle 845 and can be attached to slot strips 834 on corner wall 841. Bar latch 1243 may be used to fasten magnetic bar 1242 to slot strips 834. This configuration allows quick attachment and detachment of magnetic bar 1242 to slot strips 834, as well as quick attachment and detachment of tools to the magnetic bar.

Figure 13B:
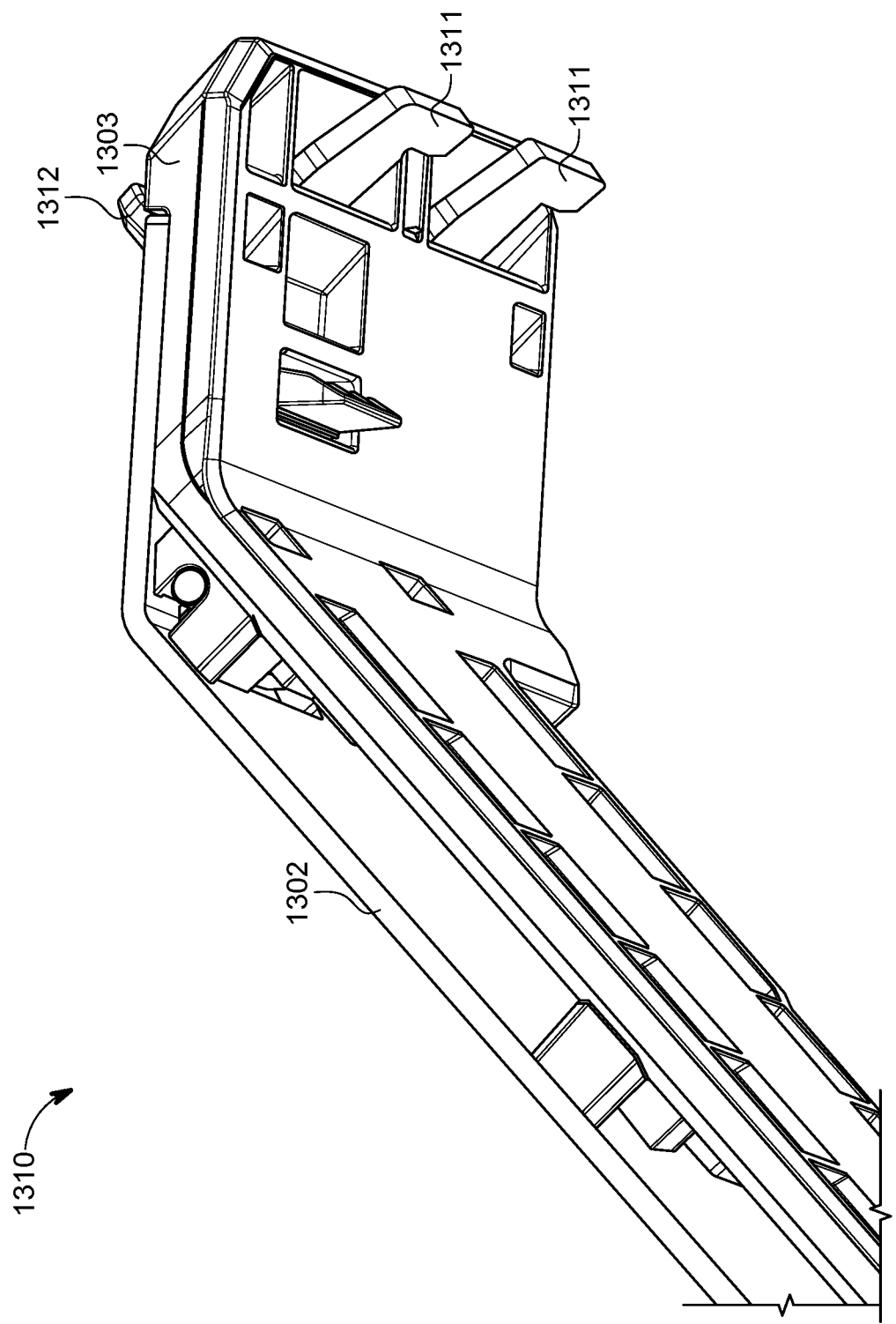
FIG. 13B shows an example closeup view of a back side of the magnetic accessory bar with closed latch.

FIG. 13B shows an example closeup view of a back side of the magnetic accessory bar with closed latch. In various embodiments, closeup view 1310 includes bar frame 1302, bar frame ends 1303, bar latch back view 1312, and bar hooks 1311.

In various embodiments, bar hooks 1311 may be inserted into the slots 835 of slot strip 834 and be locked in place with bar latch 1312 in closed position.

Figure 13C:
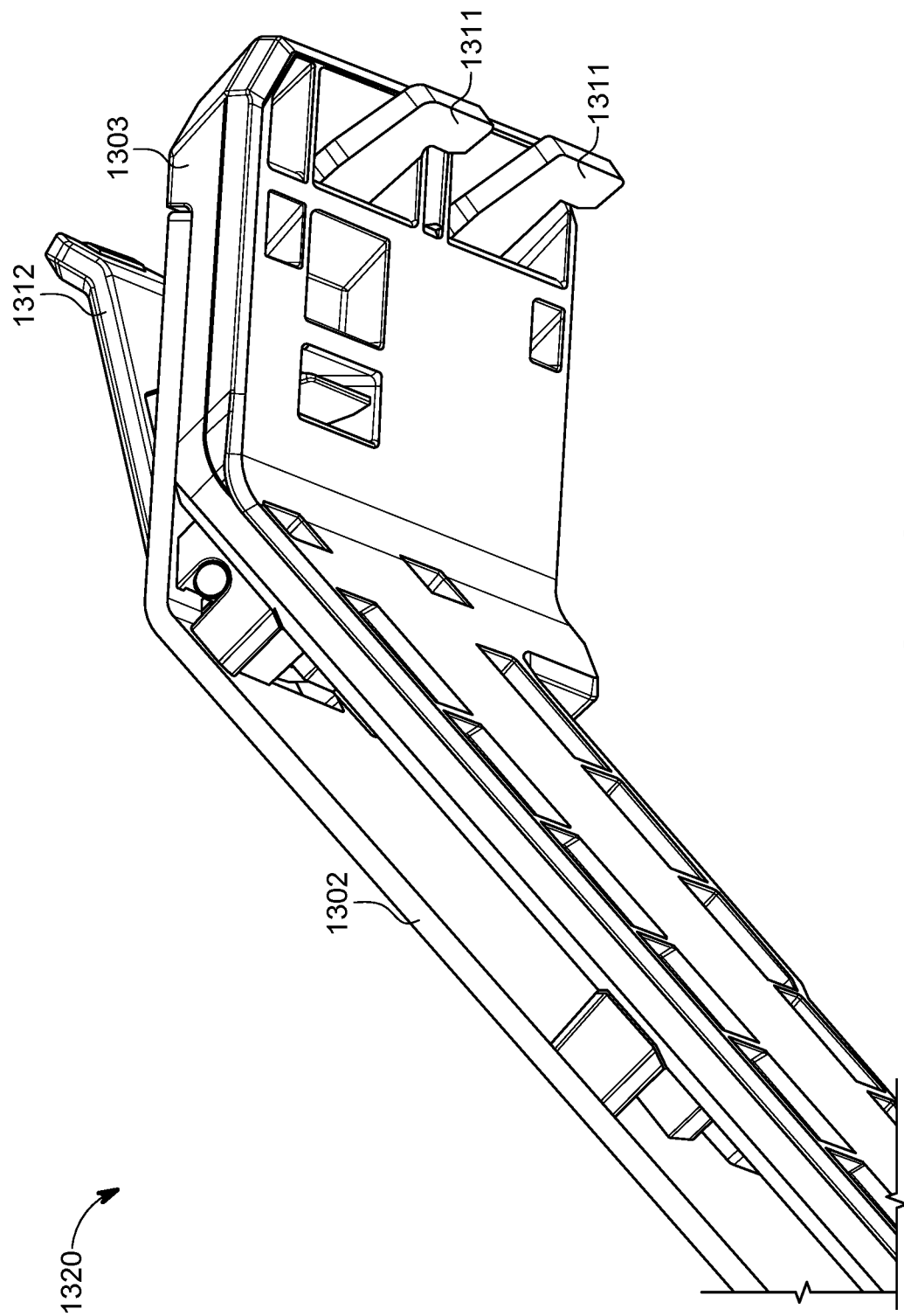
FIG. 13C shows an example closeup view of a back side of the magnetic accessory bar with open latch.

FIG. 13C shows an example closeup view of a back side of the magnetic accessory bar with open latch. In various embodiments, closeup view 1320 includes bar frame 1302, bar frame ends 1303, bar latch back view 1312, and bar hooks 1311.

In various embodiments, bar hooks 1311 may be unlocked from the slots 835 of slot strip 834 and be removed with bar latch 1312 in open position.

Figure 14:
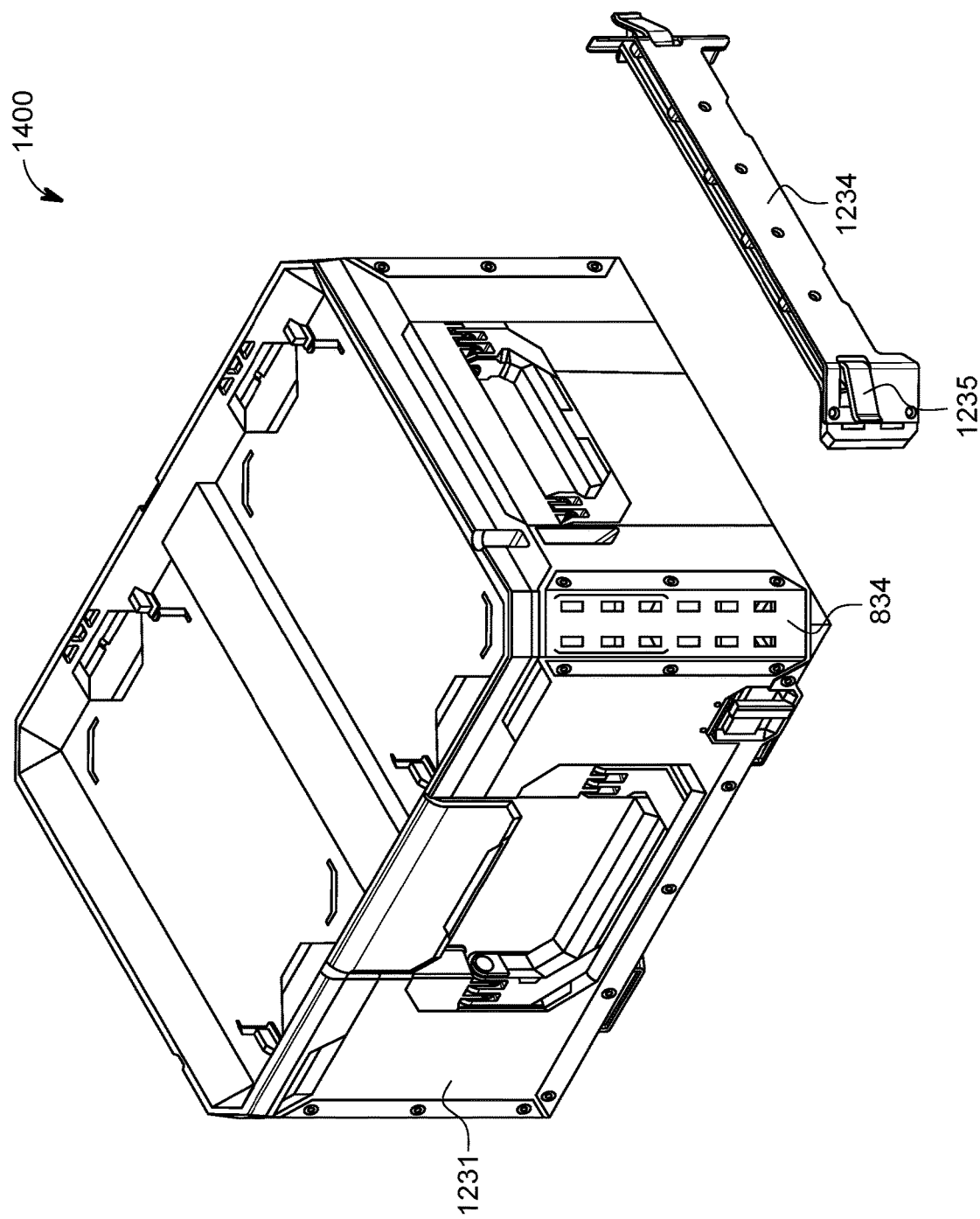
FIG. 14 shows the example hanging accessory bar of FIG. 12D attachable to corner attachment slots.

FIG. 14 shows the example hanging accessory bar of FIG. 12D attachable to corner attachment slots. In various embodiments, configuration 1400 includes stackable box 1231, slot strip 834, attachment bar 1234, and bar latch 1235.

In various embodiments, attachment bar 1234 may be quickly attached and detached to/from slot strip 834.

III. Maintenance Table

Maintenance tables are often used in janitorial services, machine shops, factory floors, hospitals, and anywhere a large number of tools or supplies are needed and used. Maintenance tables make it easier to carry the tools and supplies around the location they are used.

FIG. 8A shows an example large base cart. In various embodiments, large base cart 800 includes cart frame 801, slanted sides 802, cleat receivers 803, cart wheels 804, cart joint 805, cart floor 806, reinforcement beam 807, protrusions 808, a first half cart 809, and a second half cart 810.

In various embodiments, large base cart 800 may receive and support one or two sets of stackable boxes the same way other stackable boxes are stacked, as shown in FIG. 1A. Large base cart 800 provides the same cleat receivers 803 and protrusions 808 that are provided by stackable boxes, allowing stackable boxes to be stacked on top of large base cart 800.

FIG. 8B shows an example small base cart. In various embodiments, small base cart 820 includes frame 821, cleat receivers 822, and protrusion 823.

In various embodiments, small base cart 820 may receive and support one set of stackable boxes the same way other stackable boxes are stacked, as shown in FIG. 1A. Small base cart 820 provides the same cleat receivers 822 and protrusions 823 that are provided by stackable boxes, allowing stackable boxes to be stacked on top of small base cart 820.

Figure 9A:
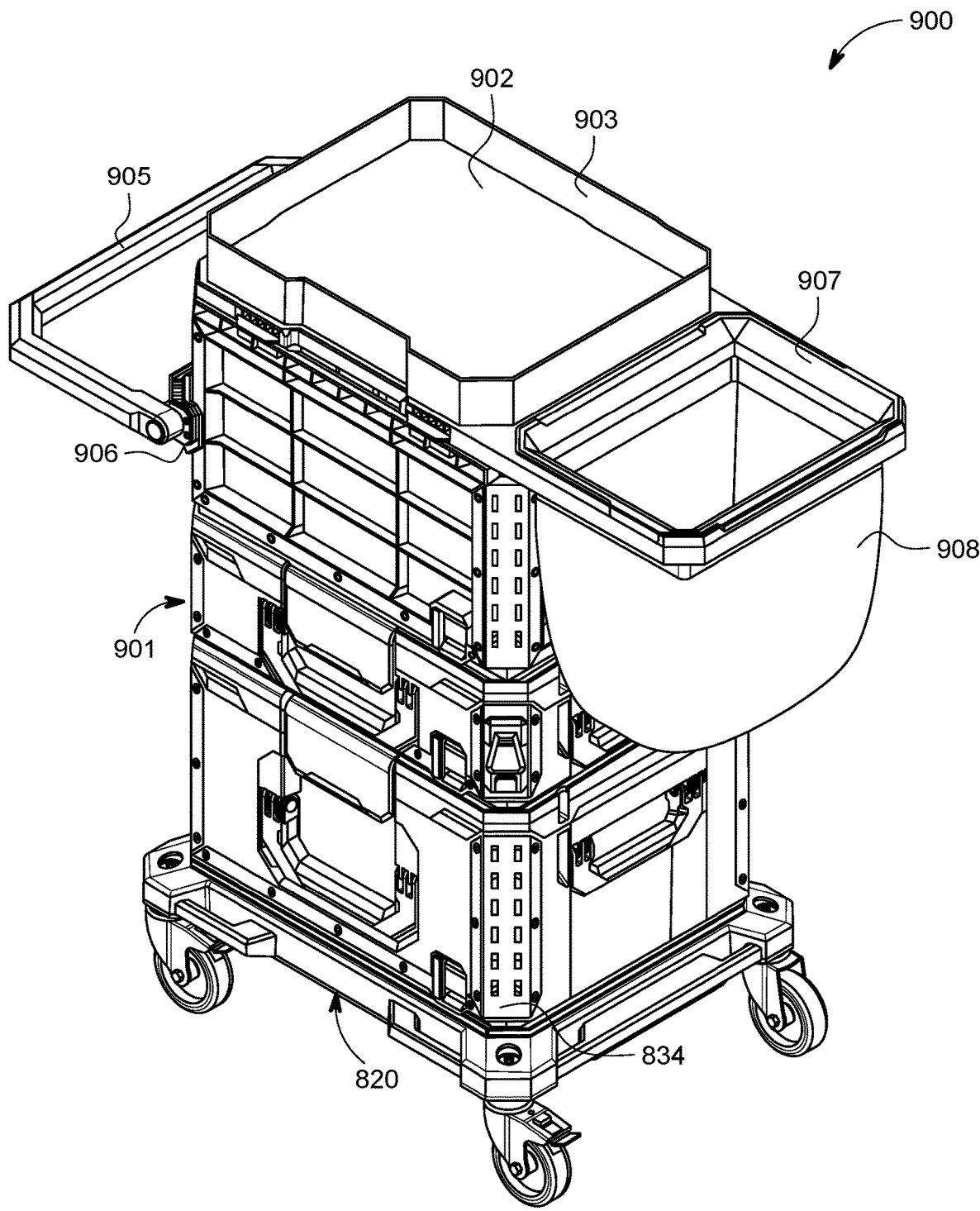
FIG. 9A shows an example single stack of storage boxes on a small base cart with a maintenance table at top.

FIG. 9A shows an example single stack of storage boxes on a small base cart with a maintenance table at top. In various embodiments, cart-based stack 900 includes stacked boxes 901, small cart 820, slot strip 834, maintenance table 902 with edges 903, cart handle 905, handle attachment point 906, bag frame 907, and bag 908.

In various embodiments, maintenance table 902 is attached to uppermost stackable box with bag 908 hanging in front to carry or collect various items such as supplies or trash. Cart handle 905 may be attached to slot strips 834 and be moved up or down the stack to a convenient position based on a height of a user. Maintenance table 902 may be used to carry various items such as tools, equipment, towels, supplies and other similar items.

Figure 9B:
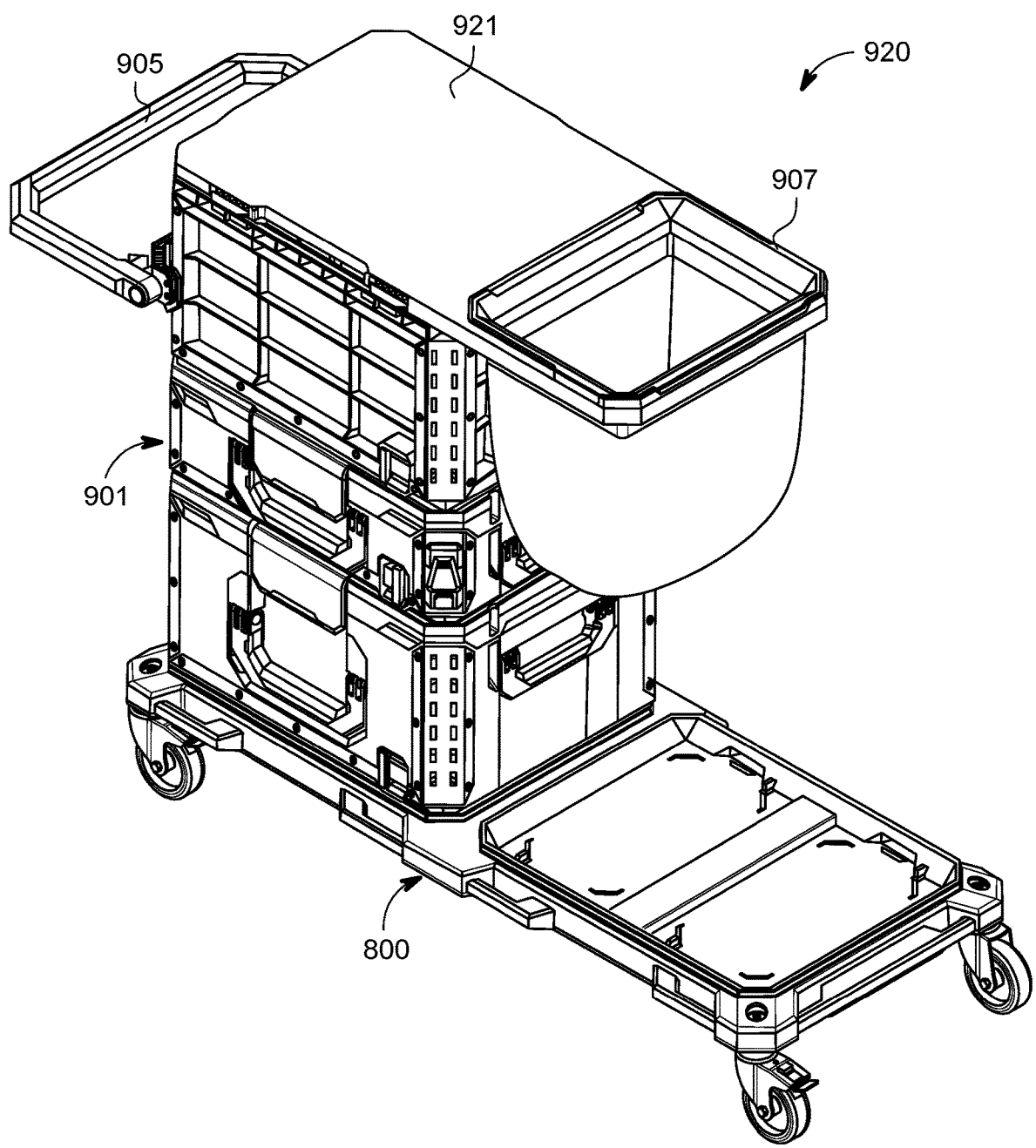
FIG. 9B shows an example single stack of storage boxes on a large base cart with a maintenance table at top.

FIG. 9B shows an example single stack of storage boxes on a large base cart with a maintenance table at top. In various embodiments, cart-based stack 920 includes stacked boxes 901, large cart 800, maintenance table 921 without edges, cart handle 905, and bag frame 907.

In various embodiments, maintenance table 921 is attached to uppermost stackable box with bag frame 907 in front to carry or collect various items such as supplies or trash. Cart handle 905 may be attached to slot strips 834 and be moved up or down the stack to a convenient position based on a height of a user. Maintenance table 921 may be used to carry various items such as tools, equipment, towels, supplies and other similar items.

Figure 9C:
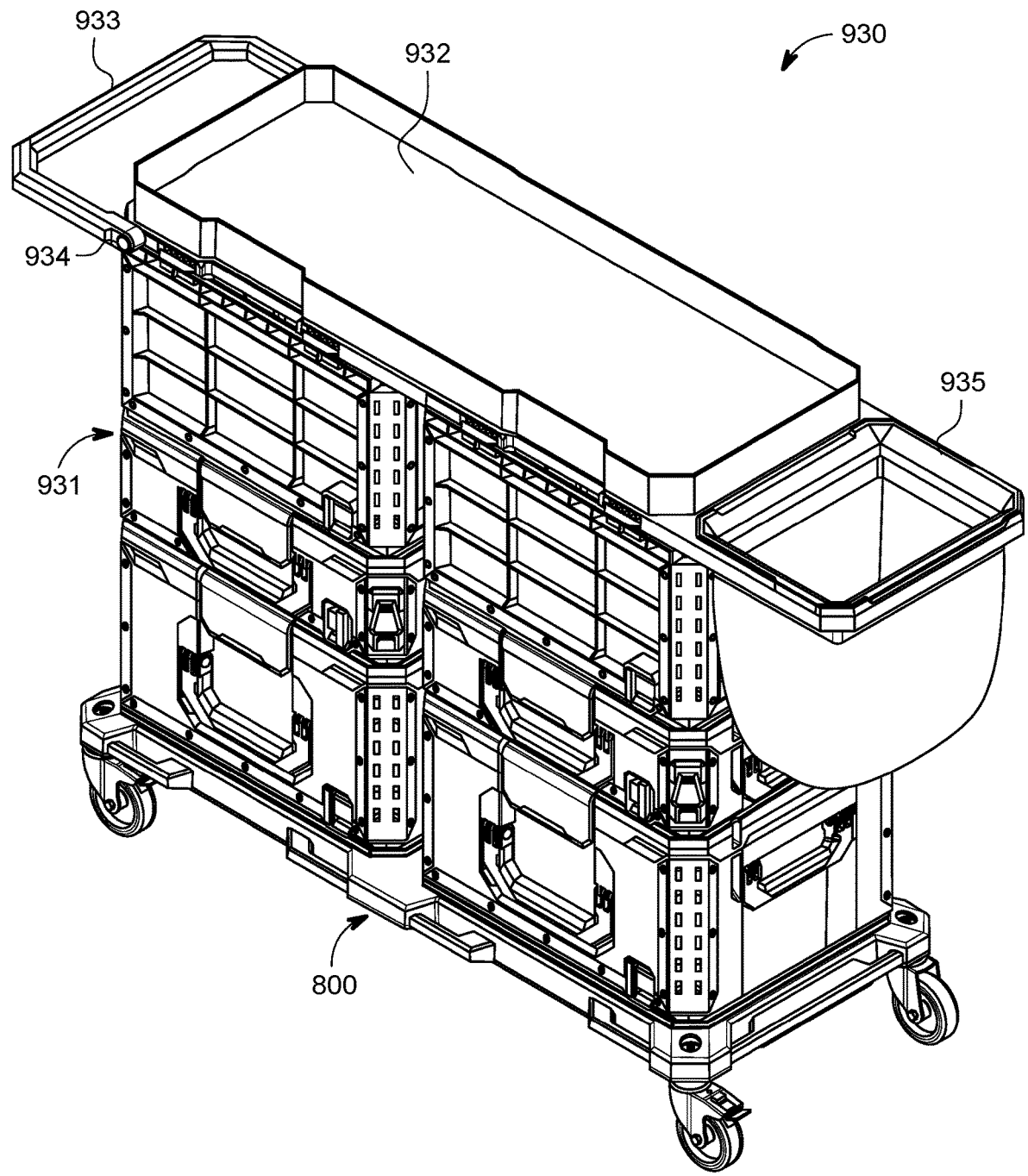
FIG. 9C shows an example double stack of storage boxes on a large base cart with a maintenance table at top.

FIG. 9C shows an example double stack of storage boxes on a large base cart with a maintenance table at top. In various embodiments, cart-based stack 930 includes stacked boxes 931, large cart 800, large maintenance table 932 with edges, cart handle 933, handle attachment point 934, and bag frame 935.

In various embodiments, maintenance table 932 is attached to uppermost stackable boxes on two stacks, with bag frame 935 hanging in front to carry or collect various items such as supplies or trash. Cart handle 933 may be attached to slot strips 834 and be moved up or down the stack to a convenient position based on a height of a user. Large maintenance table 932 may be used to carry various items such as tools, equipment, towels, supplies and other similar items.

In various embodiments, cart handle 933 may be an integral part of maintenance table 932, while in other embodiments, it may be an attachable handle separate from maintenance table 932. In some embodiments, cart handle 933 may be an articulating handle that can be swung or rotated up or down, pivoted about its point of attachment to maintenance table 932 or point of attachment to slot strip 834, to find a comfortable handling position.

Figure 9D:
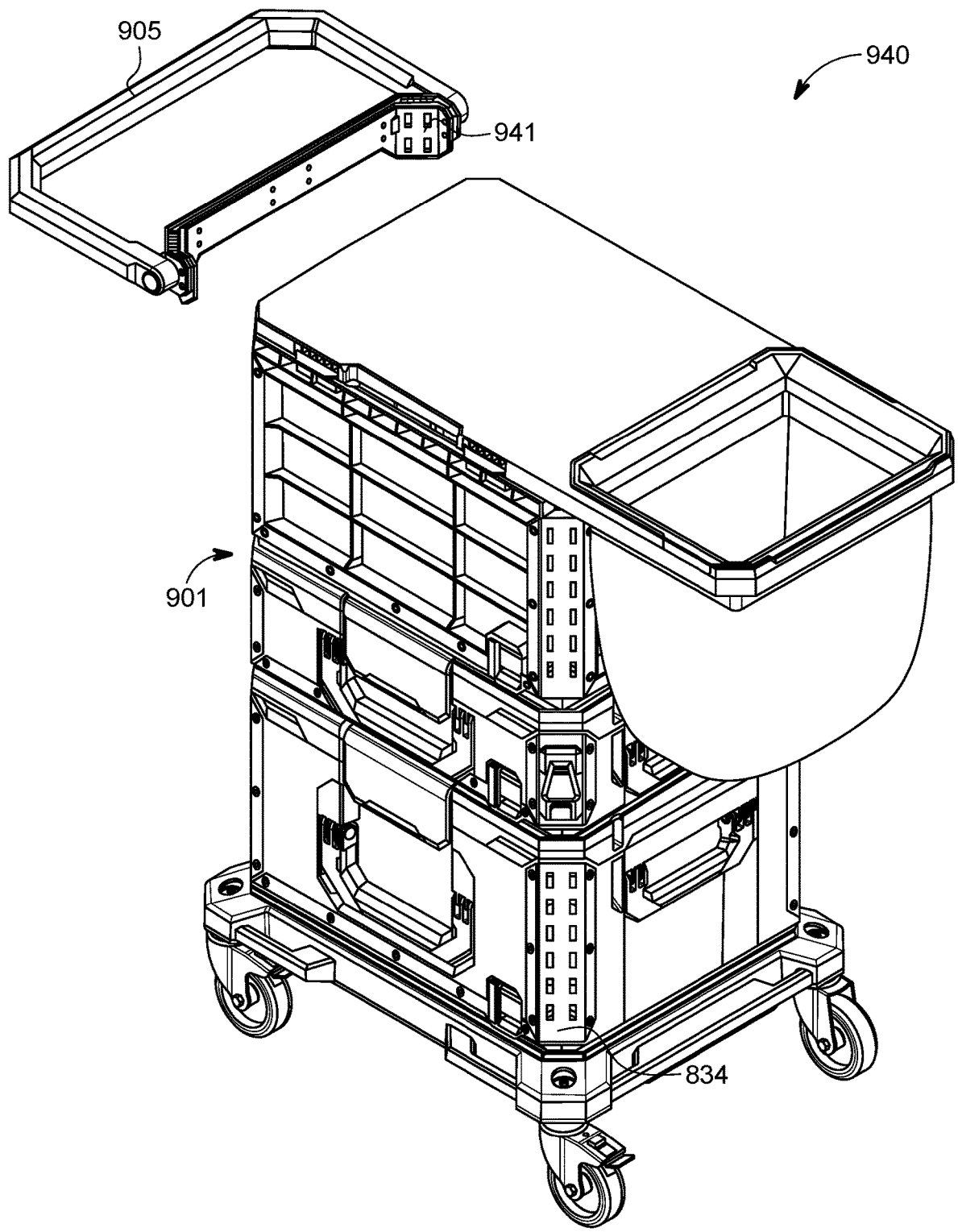
FIG. 9D shows an example stack of storage boxes with a detachable stack handle.

FIG. 9D shows an example stack of storage boxes with a detachable stack handle. In various embodiments, cart-based stack 940 includes stacked boxes 901, cart handle 905, and handle attachment point 934.

In various embodiments, cart handle 905 may be integrated with maintenance table 902 or be a separate part attached directly to one of the stacked boxes 901 that enables cart handle 905 to be moved up and down for convenience, control, or better stability during motion of the stacked cart. Handle attachment point 934 may include hooks to quickly attach and detach to slot strip 834.

IV. Quick Release Accessories

In a busy work environment, quick access to tools, supplies, and various items, while also keeping such tools and items organized and safe from loss or unavailability is highly desirable. Additionally, reconfigurability of access to various accessories, such as work lights and parts bins, is also desirable for convenience and flexibility of use. In busy work environments, it is desirable to quickly attach/detach tools without use of tools, such as screw drivers, wrenches, and the like, while also keeping the tools organized and secure, so a user can quickly take a tool from a portable storage stack, such as the stack of storage boxes with slot strip 834. It is also desirable to quickly relocate tools from one point to another, such as moving a light to a different point on the stacked boxes, for easier access in a changing work environment.

Below a number of common types of accessories that may be quickly attached/detached to/from slot strips 834 are described.

Figure 9E:
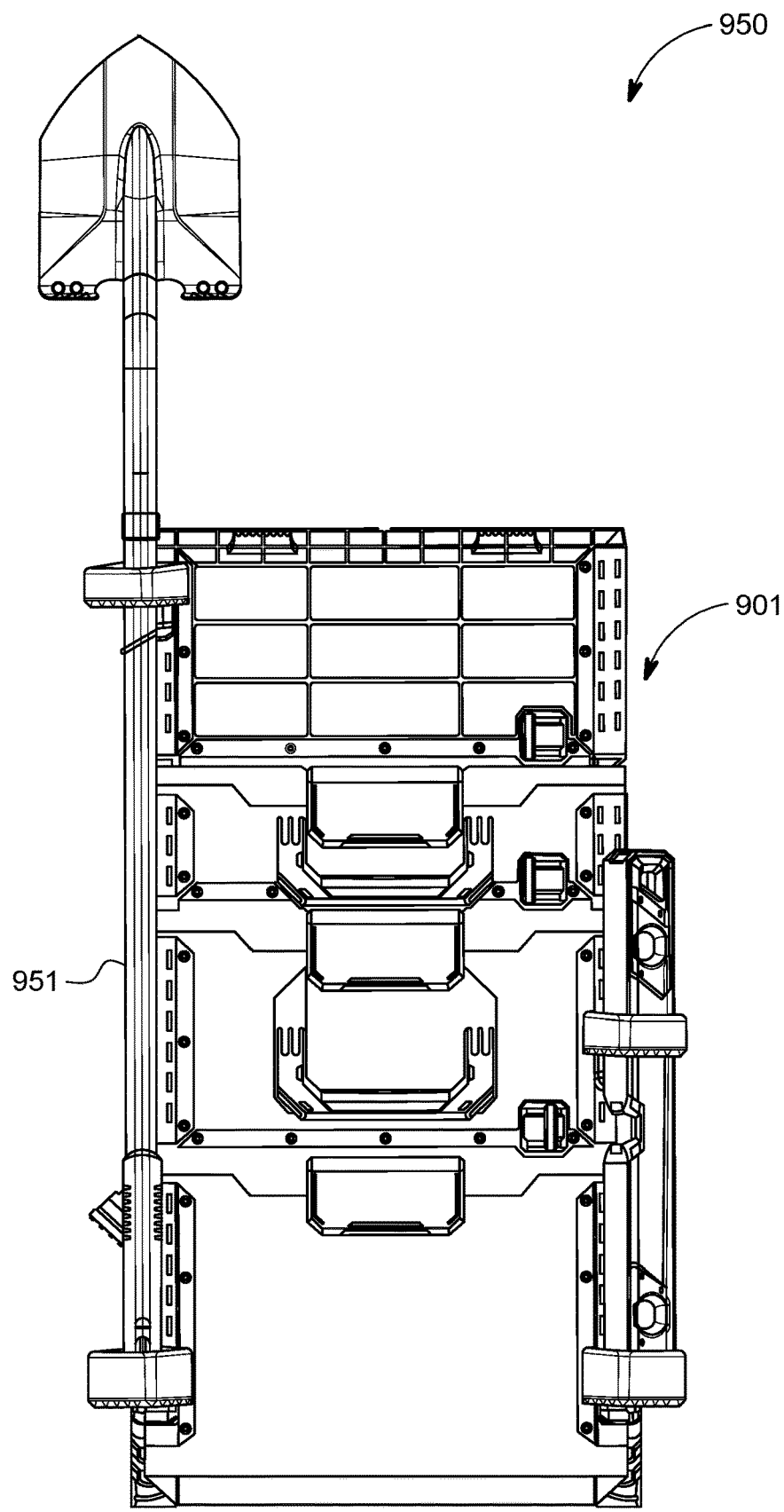
FIG. 9E shows an example stack of storage boxes with a long-handle tool attached.

FIG. 9E shows an example stack of storage boxes with a long-handle tool attached. In various embodiments, configuration 950 includes stackable boxes 901, and long-handle tools 951.

In various embodiments, long handle tools 951, such as shovels, brooms, umbrellas, some construction tools, and the like may be vertically attached to slot strips 834 (see FIG. 8C) for easy transport and temporary storage and also quick release and attachment to stackable boxes 901. The long-handle tools may also be quickly attached to any available slot strip 834 that provides convenient access to these and other tools.

Figure 10A:
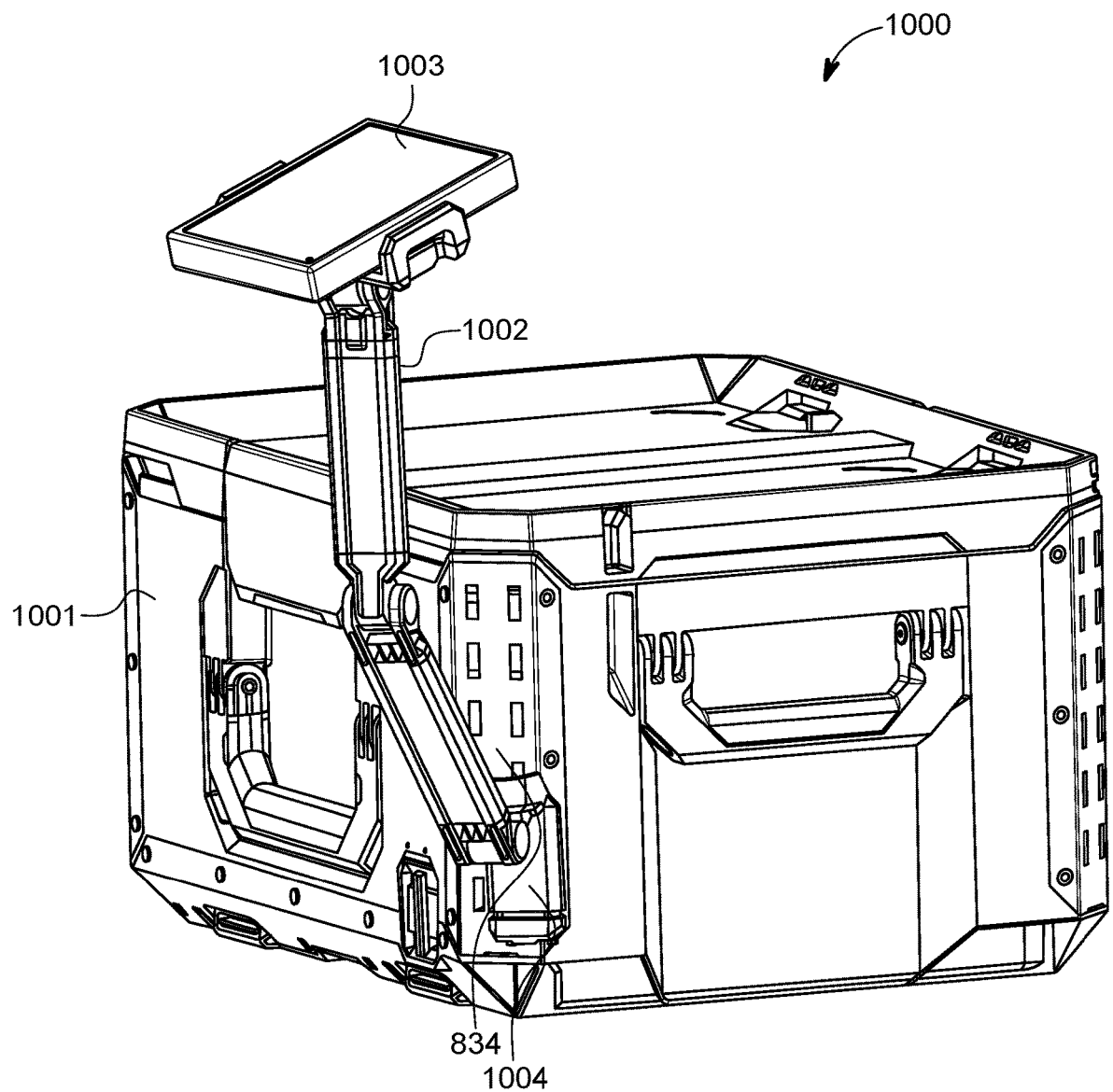
FIG. 10A shows an example storage box with a device holder attached to corner attachment slots.

FIG. 10A shows an example storage box with a device holder attached to corner attachment slots. In various embodiments, configuration 1000 includes slot strips 834, stackable box 1001, device holder 1002, device 1003, and holder base 1004.

In various embodiments, device holder 1002 may be an articulating arm that can be easily readjusted in three dimensions and quickly attached to and configured with slot strips 834 at different corners of stackable box 1001 and at different heights on a stack of boxes. Device 1003 may be a smartphone, an ammeter, a laser measurement device, an electronic thermometer, and other devices with similar sizes and form factors. Holder base 1004 may have hooks, pins, or other interface suitable for secure and quick attachment to slot strips 834.

Figure 10B:
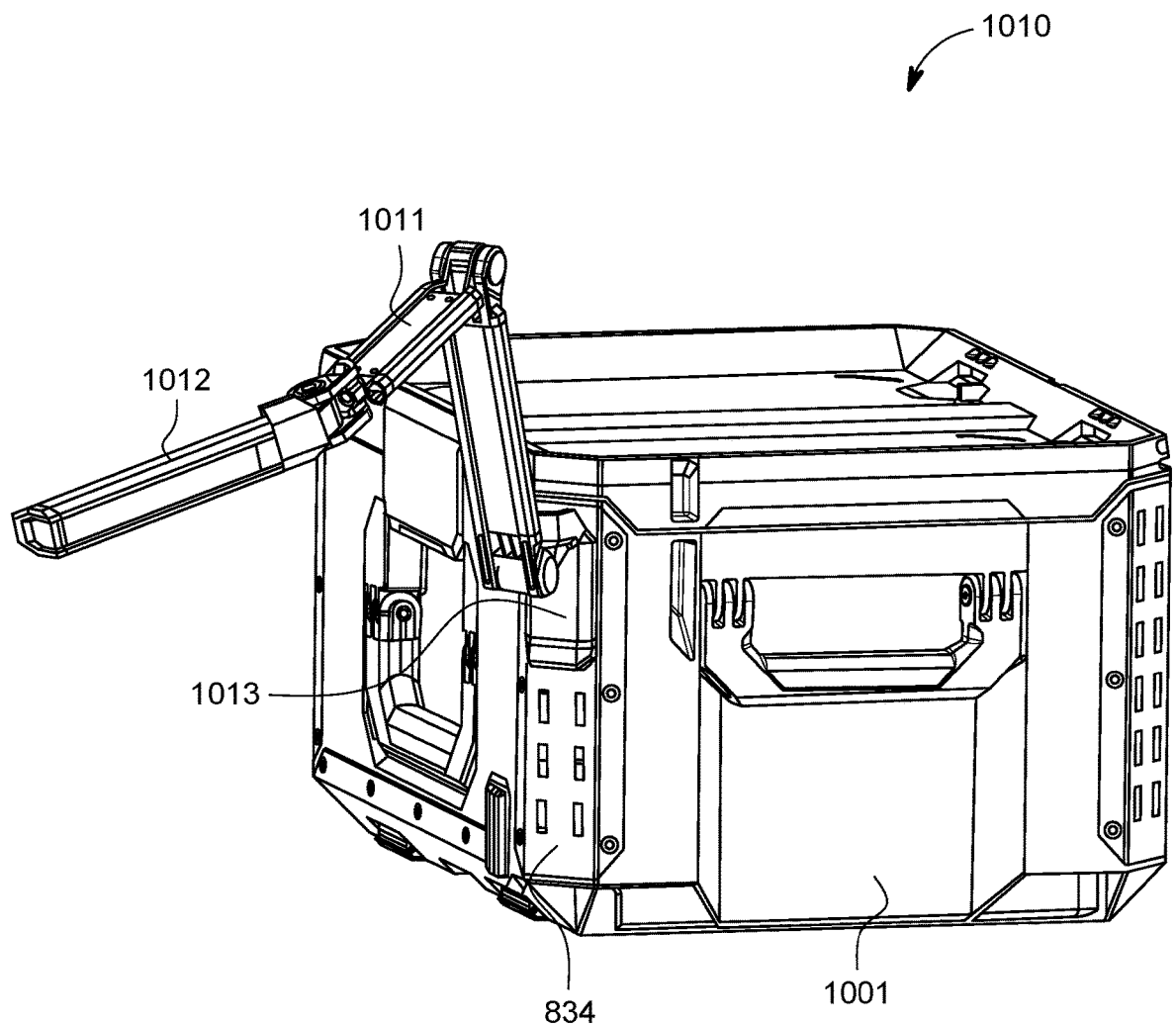
FIG. 10B shows an example storage box with a work light attached to corner attachment slots.

FIG. 10B shows an example storage box with a work light attached to corner attachment slots. In various embodiments, configuration 1010 includes slot strips 834, stackable box 1001, work light arm 1011, work light 1012, and arm base 1013.

In various embodiments, work light arm 1011 may be an articulating arm that can be easily readjusted in three dimensions and be quickly attached to and configured with slot strips 834 at different corners of stackable box 1001 and at different heights on a stack of boxes. Work light 1012 may be a light of various intensities, colors, and focus to allow a user to read, write, or view an item closely like working at a workbench. Work light arm 1011 may be an articulating arm that can be easily readjusted in three dimensions and also be quickly relocated around stackable box 1001 to illuminate areas most needed. Arm base 1023 may have hooks, pins, or other interface suitable for secure and quick attachment to slot strips 834.

Figure 10C:
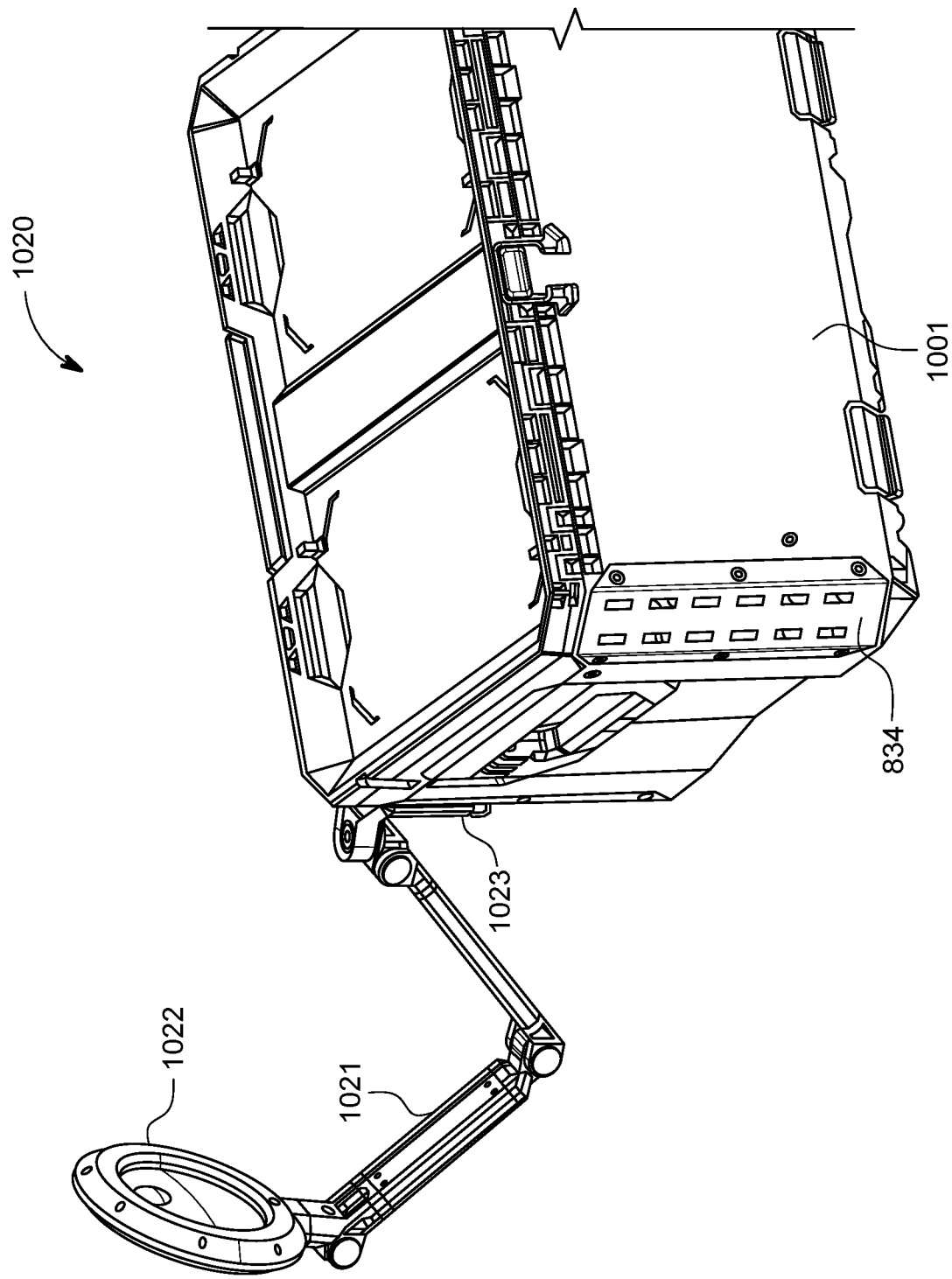
FIG. 10C shows an example storage box with a magnifying glass attached to corner attachment slots.

FIG. 10C shows an example storage box with a magnifying glass attached to corner attachment slots. In various embodiments, configuration 1020 includes slot strips 834, stackable box 1001, magnifier arm 1021, magnifier 1022, and arm base 1023.

In various embodiments, magnifier arm 1021 may be quickly attached to and configured with slot strips 834 at different corners of stackable box 1001 and at different heights on a stack of boxes. Magnifier 1022 may be a magnifying glass with various magnifications at different parts and also have a local light for better illumination of a work piece under observation. Magnifier arm 1021 may be quickly relocated around stackable box 1001 to use where most needed. Arm base 1023 may have hooks, pins, or other interface suitable for secure and quick attachment to slot strips 834.

Figure 10D:
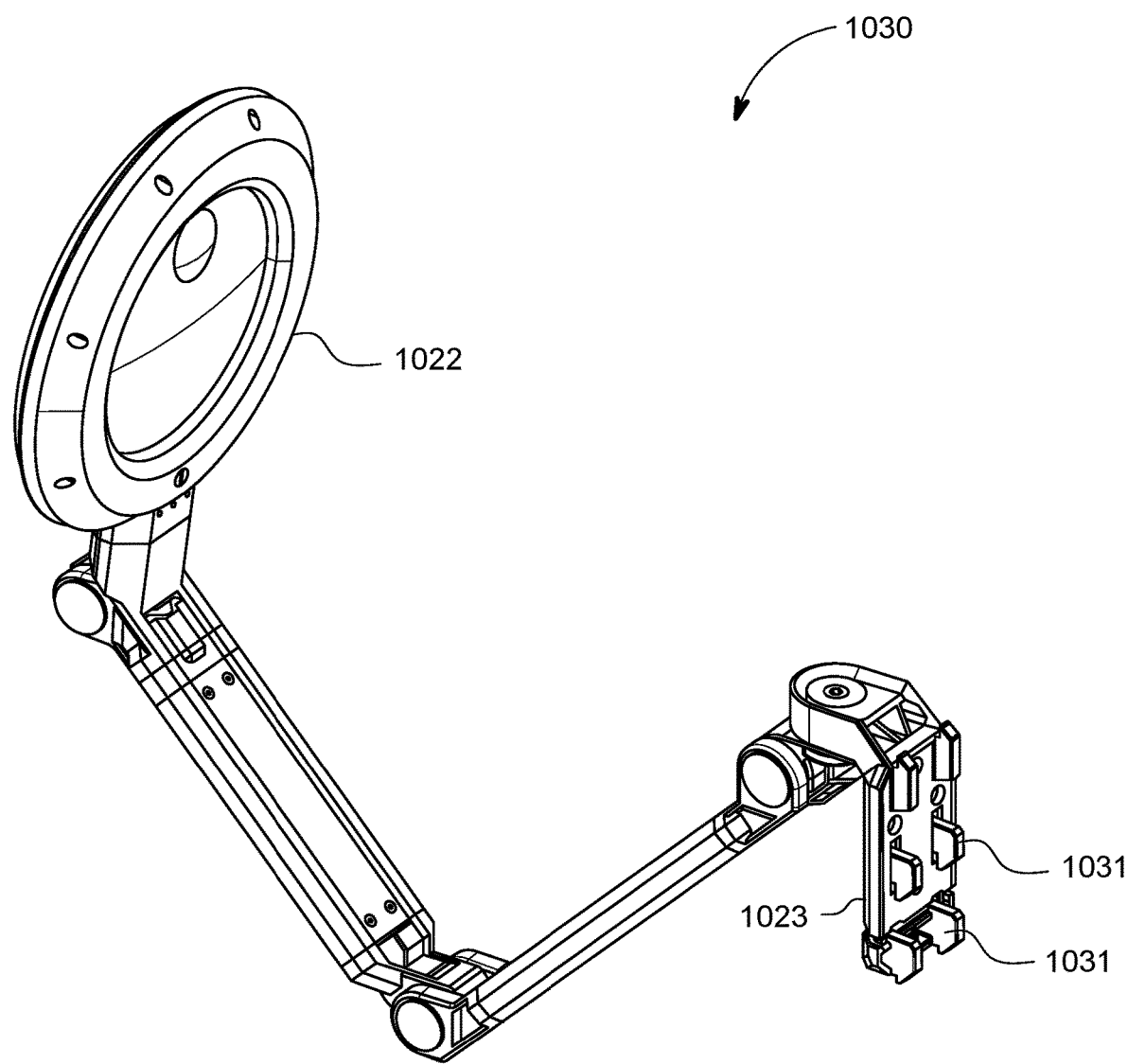
FIG. 10D shows an example magnifying glass attachable to corner attachment slots.

FIG. 10D shows an example magnifying glass attachable to corner attachment slots. Magnifier assembly 1030 includes magnifier 1022, arm base 1023, and attachment hooks 1031.

In various embodiments, arm base 1023 may be quicky attached to and released from slot strips 834 via attachment hooks 1031 inserted into slots 835 (see FIG. 8C). Like other attachments to slot strips 834, attachment hooks 1031 fit within the hook gap or space between slot strips 834 and corner wall 841.

Figure 11C:
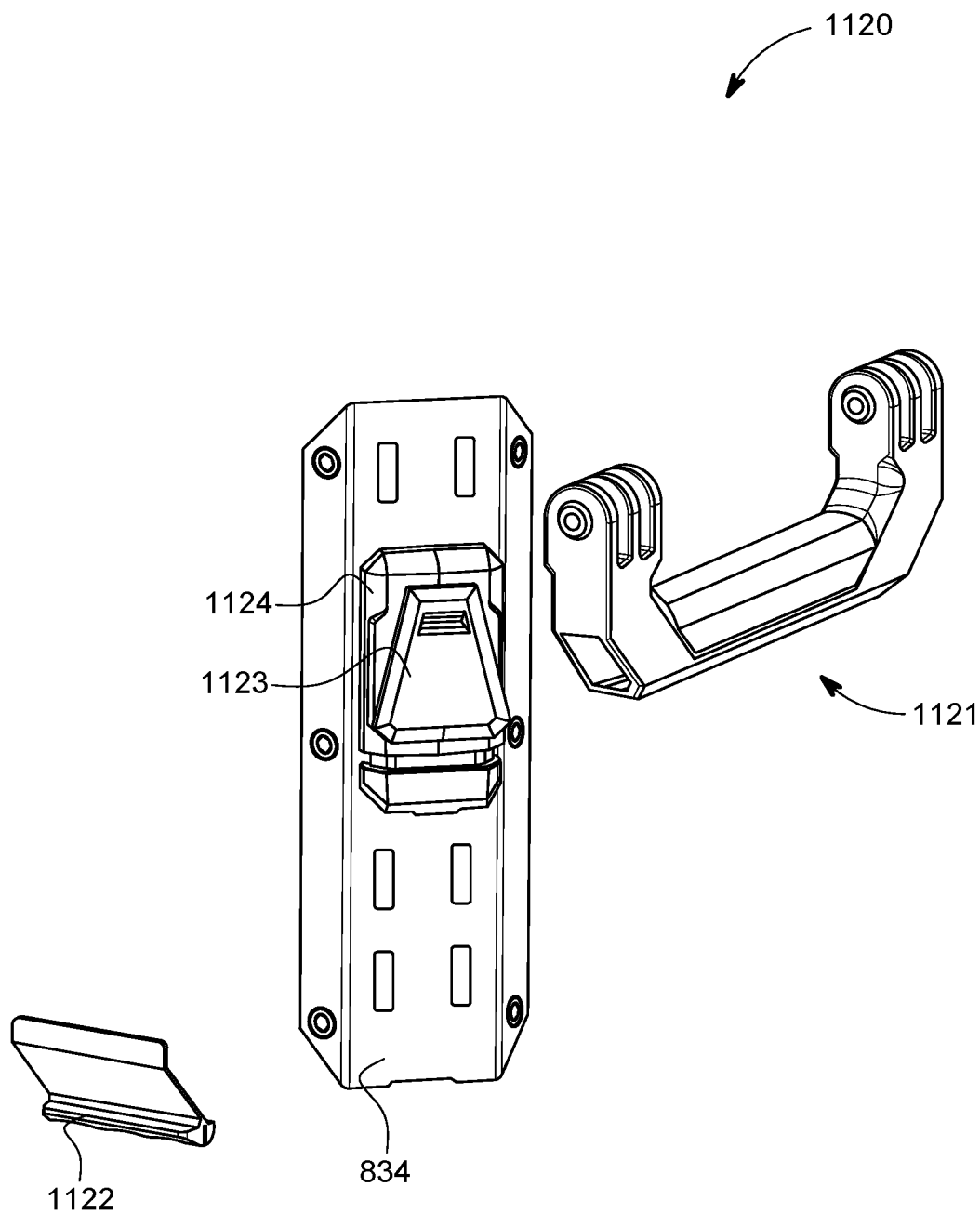
FIG. 11C shows an example hook attached to corner attachment slots.

FIG. 11C shows an example hook attached to corner attachment slots. In various embodiments, configuration 1120 includes slot strips 834, stackable box 1121, cleat 1122, hook 1123, and hook base 1124.

In various embodiments, hook base 1124 may have hooks, pins, or other interface suitable for secure and quick attachment to slot strips 834. Hook 1123 is a wide hook suitable for hanging various items such as articles of clothing like jackets, cords, loops attached to devices such as flashlights, power tools, and the like.

Figure 11D:
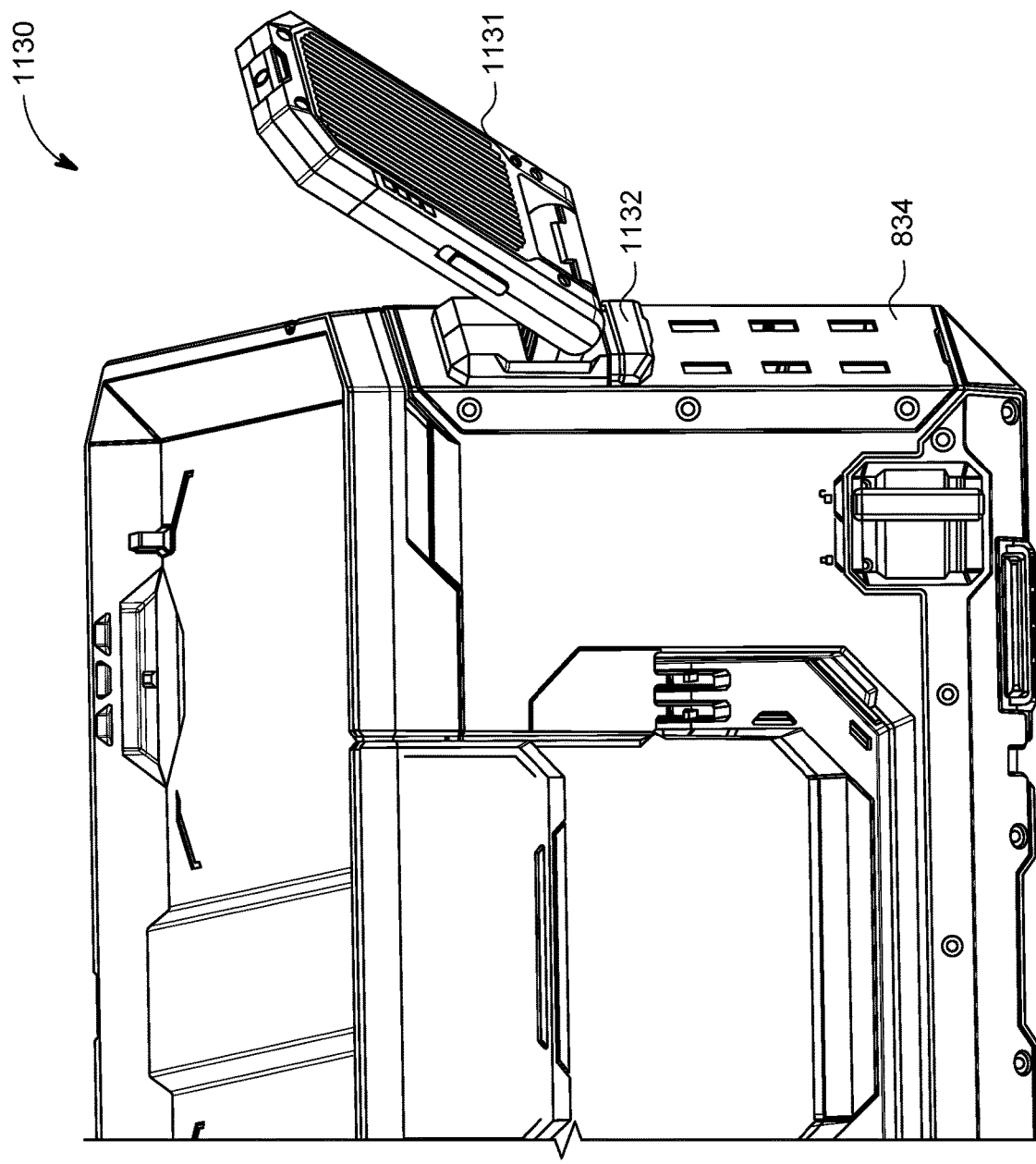
FIG. 11D shows an example storage box with a flood light attached to corner attachment slots.

FIG. 11D shows an example storage box with a flood light attached to corner attachment slots. In various embodiments, configuration 1130 includes slot strips 834, flood light 1131, and light base 1132.

In various embodiments, flood light 1131 may be a compact light source that illuminates the work area and may be moved around the stackable boxes to illuminate the desired areas around the stack of boxes. Light base 1132 may have hooks, pins, or other interface suitable for secure and quick attachment to slot strips 834.

Figure 11E:
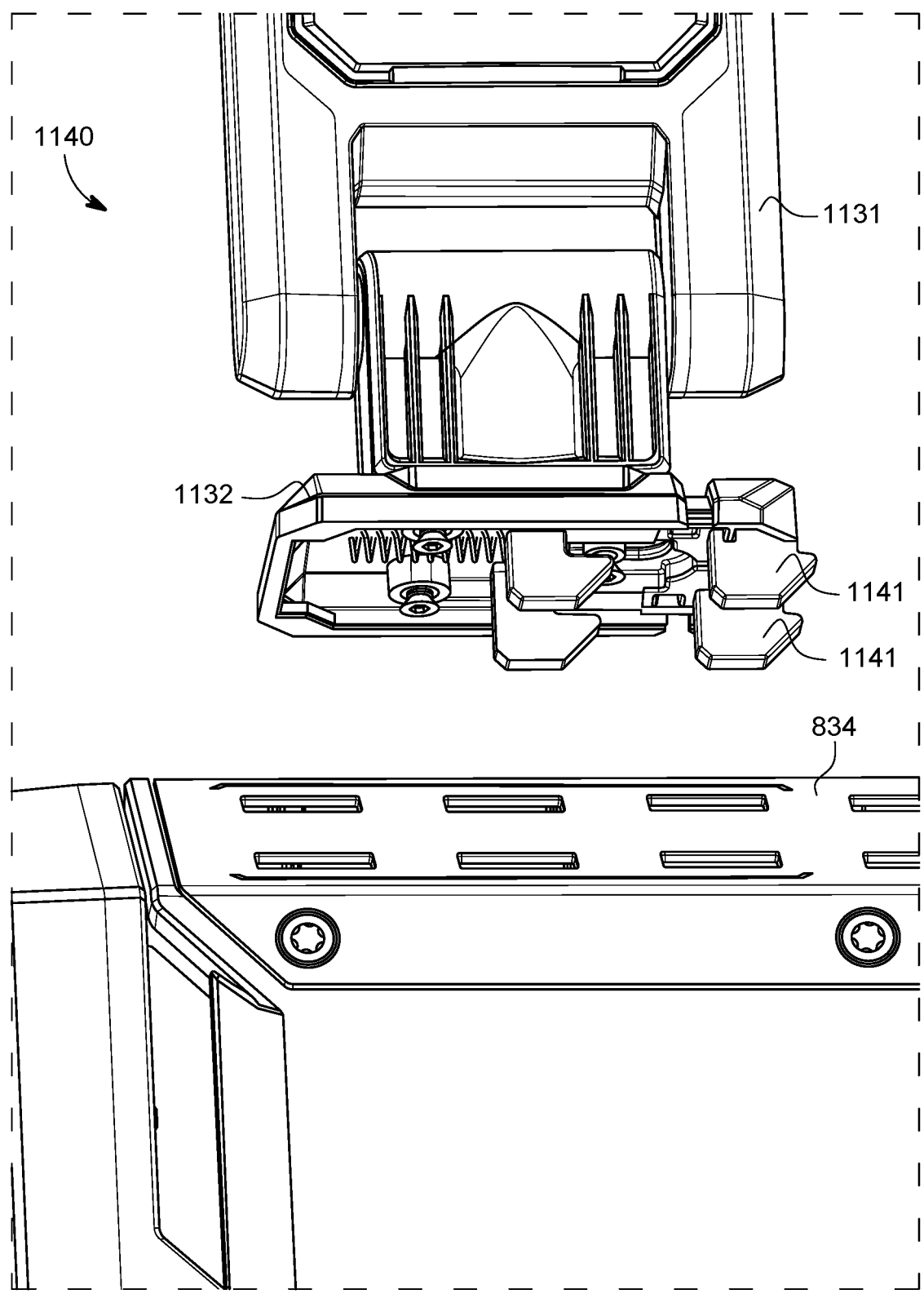
FIG. 11E shows an example flood light base attachable to corner attachment slots.

FIG. 11E shows an example flood light base attachable to corner attachment slots. In various embodiments, arrangement 1140 includes slot strip 834, flood light 1131, light base 1132, and attachment hooks 1141.

In various embodiments, light base 1132 may be quicky attached to and released from slot strips 834 via attachment hooks 1141 inserted into slots 835 (see FIG. 8C). Like other attachments to slot strips 834, attachment hooks 1141 fit within the hook gap or space between slot strips 834 and corner wall 841.

Figure 15:
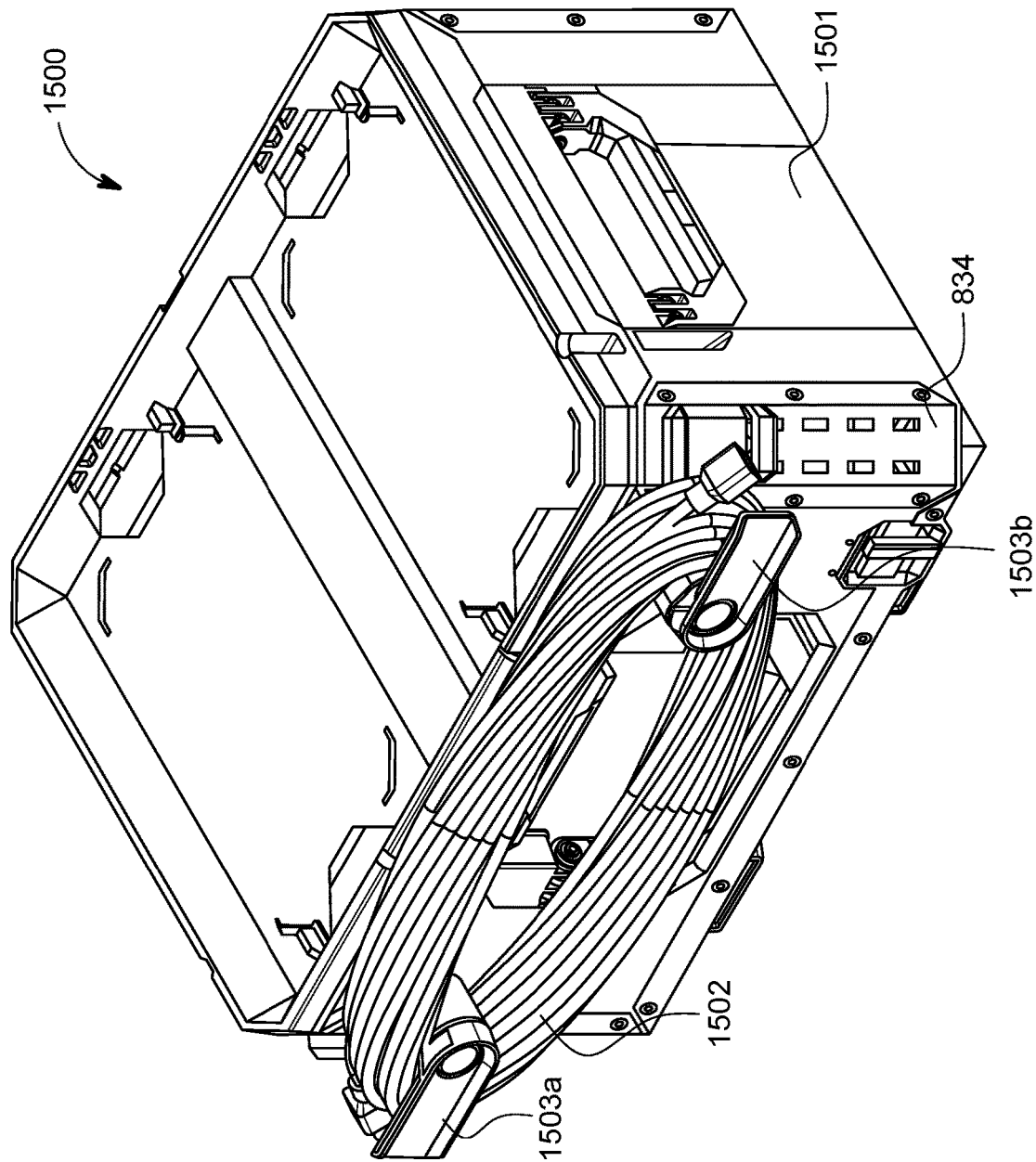
FIG. 15 shows an example detached cord holder set attached to corner attachment slots.

FIG. 15 shows an example detached cord holder set attached to corner attachment slots. In various embodiments, configuration 1500 includes stackable box 1501, slot strip 834, cord hooks 1503a and 1503b, and cord 1502.

In various embodiments, cord hooks 1503a and 1503b may be physically separate, while in other embodiments, cord hooks 1503a and 1503b are attached or coupled together via a strip or bar extended across from one hook to the other. Each of the cord hooks 1503a and 1503b may be attached to a different, and usually adjacent, slot strips 834. In this configuration, cord hooks 1503a and 1503b form a spool on which cord 1502 may be wrapped around, as shown in the figure.

In various embodiments, cord 1502 may be an electrical cord, wires, ropes, or other similar flexible items.

It will be understood that each step of the processes described above, and combinations of steps, may be implemented by computer program instructions. These program instructions may be provided to a processor to produce a machine, such that the instructions, which execute on the processor, enable implementing the actions specified. The computer program instructions may be executed by a processor to cause a series of operational steps to be performed by the processor to produce a computer implemented process such that the instructions, which execute on the processor to provide steps for implementing the actions. The computer program instructions may also cause at least some of the operational steps to be performed in parallel. Moreover, some of the steps may also be performed across more than one processor, such as might arise in a multi-processor computer system. In addition, one or more steps or combinations of steps described may also be performed concurrently with other steps or combinations of steps, or even in a different sequence than described without departing from the scope or spirit of the disclosure.

Accordingly, steps of processes or methods described support combinations of techniques for performing the specified actions, combinations of steps for performing the specified actions and program instruction for performing the specified actions. It will also be understood that each step, and combinations of steps described, can be implemented by special purpose hardware based systems which perform the specified actions or steps, or combinations of special purpose hardware and computer instructions.

It will be further understood that unless explicitly stated or specified, the steps described in a process are not ordered and may not necessarily be performed or occur in the order described or depicted. For example, a step A in a process described prior to a step B in the same process, may actually be performed after step B. In other words, a collection of steps in a process for achieving an end-result may occur in any order unless otherwise stated.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms.

For example, the phrase "A or B" will be understood to include the possibilities of "A" or "B" or "A and B." It is further understood that any phrase of the form "A/B" shall mean any one of "A", "B", "A or B", or "A and B". This construct includes the phrase "and/or" itself.

The above specification, examples, and data provide a complete description of the manufacture and use of the claimed invention. Since many embodiments of the claimed invention can be made without departing from the spirit and scope of the disclosure, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

What is claimed is:

1. A portable storage system comprising:
    a base cart to receive stackable boxes, wherein stackable boxes automatically and removably lock to e ach other when stacked, and a lowermost stackable box automatically and removably locks to the base cart;
    at least one stackable box, stacked on top of the base cart, wherein the at least one stackable box is adapted to attach to a removable and relocatable handle; and
    a maintenance table stacked and automatically and removably attached and locked directly on top of an uppermost one of the stackable boxes.

2. The portable storage system of claim 1, further comprising a locking system on the base cart.

3. The portable storage system of claim 1, further comprising a locking system on the at least one stackable box.

4. The portable storage system of claim 3, wherein the locking system on the at least one stackable box includes a lock status indicator.

5. The portable storage system of claim 1, wherein the base cart includes a frame and four wheels.

6. The portable storage system of claim 1, wherein the at least one stackable box is lockable on the base cart.

7. The portable storage system of claim 1, wherein the maintenance table includes a bag to collect items.

8. The portable storage system of claim 1, wherein the portable storage system includes a relocatable handle to control movements of the portable storage system and wherein the relocatable handle attaches to a slot strip positioned at a corner of side walls of the at least one stackable box.

9. A maintenance cart comprising:
    a base cart;
    multiple stackable containers stacked on top of the base cart, wherein stackable containers automatically and removably lock to each other when stacked, and a lowermost stackable container automatically and removably locks to the base cart;
    a maintenance table stacked and automatically and removably attached on top of an uppermost one of the multiple stackable containers; and
    a handle removably attached to one of the multiple stackable containers, wherein the stackable containers are designed to receive the removable and relocatable handle.

10. The maintenance cart of claim 9, further comprising a lock mechanism assembly on each one of the multiple stackable containers to lock stacked containers together.

11. The maintenance cart of claim 9, further comprising four wheels on the base cart and slot strips to attach to the handle.

12. The maintenance cart of claim 9, wherein the base cart is one of a small cart and a large cart.

13. The maintenance cart of claim 12, wherein the small cart is to carry a single stack of stackable containers and the large cart is to carry a double stack of stackable containers.

14. The maintenance cart of claim 9, wherein the maintenance table includes an integrated bag to collect items.

15. A maintenance cart comprising:
    a wheeled base cart that can receive and automatically and removably lock to stackable containers, wherein the stackable containers also automatically and removably lock to each other when stacked;
    at least one stackable container locked on the wheeled base cart, wherein the at least one stackable container is adapted to receive a removable handle; and
    a maintenance table stacked and automatically and removably locked directly on top of an uppermost one of the stackable containers.

16. The maintenance cart of claim 15, further comprising a relocatable handle to move the maintenance cart.

17. The maintenance cart of claim 16, further comprising a slot strip attached to a corner of the at least one stackable container.

18. The maintenance cart of claim 17, wherein the relocatable handle is attached to the slot strip.

19. The maintenance cart of claim 15, further comprising a bag attached to the maintenance table to collect items.

20. The maintenance cart of claim 15, wherein the wheeled base cart is one of a small cart and a large cart.

* * * * *